(12) United States Patent
Nakamura et al.

(10) Patent No.: US 7,156,886 B2
(45) Date of Patent: Jan. 2, 2007

(54) REFORMING APPARATUS

(75) Inventors: Toru Nakamura, Moriguchi (JP); Susumu Kobayashi, Nishinomiya (JP); Hitoshi Kudo, Hirakata (JP); Mikio Sei, Neyagawa (JP); Yuichiro Yasuda, Hikone (JP); Zhongmin Fei, Hirakata (JP)

(73) Assignee: Matsushita Electric Works, Ltd., Kadoma (JP)

( * ) Notice: Subject to any disclaimer, the term of this patent is extended or adjusted under 35 U.S.C. 154(b) by 661 days.

(21) Appl. No.: 10/387,570

(22) Filed: Mar. 14, 2003

(65) Prior Publication Data

US 2004/0068933 A1    Apr. 15, 2004

(30) Foreign Application Priority Data

Mar. 15, 2002   (JP) ............... 2002-072946

(51) Int. Cl.
*B01J 8/00* (2006.01)
*B01J 8/04* (2006.01)
*B01J 10/00* (2006.01)
*C01B 3/32* (2006.01)
*C10J 3/84* (2006.01)

(52) U.S. Cl. .................. 48/127.9; 48/197; 48/61; 48/128; 48/198.7; 422/188; 422/189; 422/211; 422/198

(58) Field of Classification Search .......... 48/61
See application file for complete search history.

(56) References Cited

U.S. PATENT DOCUMENTS 4,489,480 A    12/1984   Martin et al.

FOREIGN PATENT DOCUMENTS

DE    93 20 711 U1    1/1995

(Continued)

OTHER PUBLICATIONS

Olsen, John C., Unit Processes and Principles of Chemical Engineering, Jul. 5, 1932, D. Van Nostrand Company Inc., Chapter I, pp. 1-3.*

*Primary Examiner*—Alexa Neckel
*Assistant Examiner*—Kaity Handal
(74) *Attorney, Agent, or Firm*—Oblon, Spivak, McClelland, Maier & Neustadt, P.C.

(57) ABSTRACT

A reforming apparatus for producing a reformed gas from a fuel gas and steam, including a reformed gas-producing passage and a combustion gas passage, the reformed gas-producing passage having reforming catalyst, shift catalyst, and CO-selective oxidizing catalyst sections along a flowing direction of the reformed gas, the reformed gas-producing passage having a first passage adjacent to the combustion gas passage and including the reforming catalyst section and a second passage adjacent to the first passage, the second passage including a first heat-recovering section adjacent to the reforming catalyst section, and the first passage having a second heat-recovering section adjacent to one of the shift catalyst and CO-selective oxidizing catalyst sections, the first heat-recovering section located on an upstream side along the flow direction of the reformed gas relative to the reforming catalyst section.

20 Claims, 27 Drawing Sheets

FOREIGN PATENT DOCUMENTS

| | | |
|---|---|---|
| EP | 0 092 266 A | 10/1983 |
| EP | 0 922 666 | 6/1999 |
| EP | 1 094 031 | 4/2001 |
| EP | 1 394 103 A | 3/2004 |
| JP | 2001-180911 | 7/2001 |
| JP | 2002-356306 | 12/2002 |
| WO | WO 98/00361 | 1/1998 |
| WO | WO 00/63114 | 10/2000 |
| WO | WO 02/098790 | 12/2002 |

* cited by examiner

REFORMING APPARATUS

FIELD OF THE INVENTION

The present invention relates to a reforming apparatus which steam-reforms a fuel gas to produce a hydrogen-rich reformed gas and which simultaneously reduces a concentration of carbon monoxide in the reformed gas.

BACKGROUND ART

In the field of fuel cell generation systems, there are used reforming apparatuses which produce reformed gases containing hydrogen as a main component by steam-reforming a fuel gas as a raw material (e.g. alcohols such as methanol etc., hydrocarbons such as methane, buthane, etc., fossil fuels such as naphtha, LNG, etc.).

FIG. 20 shows one of the reforming apparatuses disclosed in Japanese Patent Kokai Publication No. 2001-180911. This reforming apparatus comprises a reforming reactor (46) charged with a reforming catalyst (45), a shift rector (48) charged with a shift catalyst (47), and a CO-selective oxidizing reactor (50) charged with a CO-selective oxidizing catalyst (49), which are arranged separately from one another. When a fuel gas and steam are fed to the reforming reactor (46), a hydrogen-rich reformed gas is produced from the fuel gas through the steam-reforming reaction. Since this reforming reaction is an endothermic reaction, a burner (51) for heating the reforming reactor (46) to a temperature suitable for the reforming reaction is installed. The shift reactor (48) converts the carbon monoxide in the reformed gas produced by the reforming reactor (46) to obtain hydrogen through a water gas shift reaction, to thereby reduce an amount of carbon monoxide. Since this shift reaction is an exothermic reaction, heating is unnecessary during the steady state operation, however, a burner (52) is arranged to heat the reactor to a temperature suitable for the shift reaction at the time of starting the operation. The CO-selective oxidizing reactor (50) oxidizes the carbon monoxide in the reformed gas having undergone the shift reaction into carbon dioxide through a CO-selective oxidizing reaction, and thus, an amount of carbon monoxide in the reformed gas is further reduced. By doing so, the reformed gas which is rich in hydrogen is obtained as a final product. Since the CO-selective oxidizing reaction is an exothermic reaction, heating is unnecessary during the steady operation, however, a burner (53) is arranged to heat the reactor to a temperature suitable for the CO-selective oxidizing reaction at the time of starting the operation. Further, cooling water passages (55, 56) are arranged in the shift reactor (48) and the CO-selective oxidizing reactor (50) so as to properly control the temperatures thereof.

According the reforming apparatus shown in FIG. 20, it is possible to properly control the temperatures of the respective reactors (46, 48, 50), and to produce reformed gases suitable from a variety of fuel gases for polymer electrolyte fuel cells.

However, the reforming apparatus shown in FIG. 20 has the following problems, since the reforming reactor (46), the shift reactor (48) and the CO-selective oxidizing reactor (50) are arranged separately from one another: heat release from the reactors (46, 48, 50) leads to larger heat loss, resulting in a poor heat efficiency; because of the above separate arrangement, the heating burners (51, 52, 53) must be provided on the reactors (46, 48, 50), respectively, which results in a complicated apparatus, and also requires a larger amount of energy to start the operation of the apparatus, which results in a poor starting performance.

FIG. 21 shows one of the reforming apparatuses disclosed in International Publication No. WO 00/63114. This reforming apparatus has a multi-cylindrical structure which comprises an outer cylinder (58), a group of intermediate cylinders (59) (59a to 59g) which are arranged concentrically inside the outer cylinder (58), and an inner cylinder (60) which is arranged concentrically inside the group of the intermediate cylinders (59). A reforming catalyst layer (61) fills an annular space formed between the inner cylinder (60) and the innermost intermediate cylinder (59g); a shift catalytic layer (62) fills an annular space formed between the intermediate cylinder (59d) and the intermediate cylinder (59e); and a CO-selective oxidizing catalytic layer (63) fills an annular space formed between the outermost intermediate cylinder (59a) and the intermediate cylinder (59b) on its inner side. Further, a heat-transfer partition wall (a heat-radiation cylinder) (64) is arranged concentrically inside the inner cylinder (60), and a heating burner (66) is mounted on a burner mount (65) inside the heat-transfer partition wall (64).

According to the reforming apparatus shown in FIG. 21, the heat-transfer partition wall (64) and the inner cylinder (60) which are heated by a combustion gas from the heating burner (66), the reforming catalytic layer (61) through which a fuel gas and a gas having undergone the reforming reaction are allowed to pass, and the shift catalytic layer (62) and the CO-selective oxidizing catalytic layer (63) are arranged concentric as a multi-cylindrical structure. Therefore, heat releases only from the outer cylinder (58), which results in a smaller heat loss. Thus, advantageously, the reforming apparatus can be made compact with a higher efficiency. In addition, since the reforming catalytic layer (61), the shift catalytic layer (62) and the CO-selective oxidizing catalytic layer (63) can be heated by one burner (66), the operation-starting performance of the apparatus is excellent.

However, the reforming apparatus shown in FIG. 21 has a problem in its complicated structure because of the multi-cylindrical structure comprising a number of cylinders.

FIG. 22 shows one of the reforming apparatuses disclosed in International Publication No. WO 98/00361. This reforming apparatus comprises an inner cylindrical body (70) disposed around a combustion gas passage (69) through which a combustion gas from a burner (68) passes, and an outer cylindrical body (71) disposed outside the inner cylindrical body (70), wherein the upper ends of the inner cylindrical body (70) and the outer cylindrical body (71) are communicated with each other. The inner cylinder (70) is charged with a reforming catalyst to form a reforming reaction section (72) therein, and the outer cylinder (71) is charged with a shift catalyst and a CO-selective oxidizing catalyst to form therein a shift reaction section (73) and a CO-selective oxidizing reaction section (74), respectively.

According to the reforming apparatus shown in FIG. 22, the combustion gas passage (69) through which the combustion gas from the heating burner (68) passes, and the inner cylindrical body (70) and the outer cylindrical body (71) through which a reformed gas produced by reforming a fuel gas passes are arranged concentrically, and therefore, heat is released only from the outer cylindrical body (71) to thereby lessen the heat release loss. Thus, the reforming apparatus can be made compact with a higher efficiency. In addition, the operation-starting performance of the apparatus is high because the reforming reaction section (72), the shift reaction section (73) and the CO-selective oxidizing reaction section (74) can be heated by one burner (68). Further, the apparatus is constructed by a less number of cylindrical bodies, and thus simple in its structure.

However, the reforming apparatus shown in FIG. 22 has a problem in its poor heat efficiency as follows: The relatively high temperature of the reforming reaction section (72), and the relatively low temperatures of the shift reaction section (73) and the selective oxidizing section (74) are suitably controlled, respectively, by disposing a partition portion (75) between the inner cylinder (70) and the outer cylinder (71) so as to control a quantity of transferred heat. Therefore, quantities of heat of the reformed gases in the inner cylinder (70) and the outer cylinder (71) are not sufficiently recovered and used, which results in a poor heat efficiency.

DISCLOSURE OF THE INVENTION

The present invention has been developed in order to overcome the foregoing problems. Objects of the present invention are therefore to provide a reforming apparatus which can show a high efficiency and an excellent operation-starting performance, in spite of its compact and simple configuration, and to provide a method of operating the reforming apparatus, by which the operation of the reforming apparatus can be appropriately started and the purging of a combustible gas can be fully done at the time of stopping the operation.

The first aspect of the present invention provides a reforming apparatus comprising a reformed gas-producing passage for producing a reformed gas from a fuel gas and steam and a combustion gas passage, which apparatus is characterized in that the reformed gas-producing passage comprises (1) a reforming catalyst section, (2) a shift catalyst section and (3) a CO-selective oxidizing catalyst section, which are arranged as thus listed from an upstream side to a downstream side of a flow direction of the reformed gas;

that an amount of heat of the reformed gas flowing out of the reforming catalyst section is used in the reforming catalyst section by heat transfer;

that preferably, an amount of heat of the reformed gas flowing out of the shift catalyst section and an amount of heat generated in the shift catalyst section are used for the fuel gas to be reformed and the steam fed to the reforming catalyst section by heat transfer; and that more preferably, an amount of heat generated in the CO-selective oxidizing catalyst section is used for the fuel gas to be reformed and the steam which are fed to the reforming catalyst section by heat transfer.

It is noted that an air is fed to the CO-selective oxidizing catalyst section from the outside of the reforming apparatus so as to be used for the selective oxidization of carbon monoxide.

The term "combustion gas passage" referred to herein means a passage for a combustion gas, i.e., a high temperature gas for use in heating, which gas is produced by burning a fuel for use in heating (usually, a fuel gas) with a burner, a catalyst or the like, and this combustion gas is used to heat mainly the reforming catalyst section, and, if needed, to heat other object such as water which is supplied as a starting material for the steam, a heat-radiant transferring member or the like, as will be described later.

The reforming catalyst section is a reaction section which contains a reforming catalyst and produces a reformed gas containing hydrogen as a main component by steam-reforming the fuel gas and the steam as the raw materials fed to the reforming apparatus.

The term "reformed gas" referred to in the present specification means a gas mixture comprising hydrogen and carbon monoxide, which mixture is produced through the steam-reforming reaction of the fuel gas and the steam in the reforming catalyst section. The reformed gas may further contain other substances which are unavoidably present (for example, other substances derived from the fuel gas and the steam fed as the raw materials (e.g. impurities contained therein, unreacted fuel gas and steam), a byproduct formed by the reaction, and air fed for the selective oxidization of carbon monoxide (and thus nitrogen, oxygen, etc.).

The shift catalyst section is a reaction section which contains a water gas shift reaction catalyst and reduces an amount of carbon monoxide in the reformed gas flowing out of the reforming catalyst section through the water gas shift reaction. In the present specification, the gas mixture flowing out of the shift catalyst section is also referred to as "reformed gas", but this reformed gas contains a decreased amount of carbon monoxide due to the water gas shift reaction, as compared with the reformed gas flowing out of the reforming catalyst section. The reformed gas flowing out of the shift catalyst section may contain the above other substances, amounts of which may be changed, and further may contain a newly produced substance.

The CO-selective oxidizing catalyst section is a reaction section which contains a CO-selective oxidizing catalyst and reduces an amount of the carbon monoxide in the reformed gas from the shift catalyst section through a reaction with oxygen (fed in the form of, for example, air from the outside the reforming apparatus). In the present specification, the gas mixture flowing out of the CO-selective oxidizing catalyst section is also referred to as "reformed gas", but this reformed gas contains a decreased amount of carbon monoxide due to the CO-selective oxidizing reaction, as compared with the reformed gas from the shift catalyst section. The reformed gas from the CO-selective oxidizing catalyst section may contain the above other substances, amounts of which may be changed, and further may contain a newly produced substance. This reformed gas contains substances derived from the air for feeding oxygen. In the reforming apparatus of the present invention, the reformed gas from the CO-selective oxidizing catalyst section is a hydrogen-rich reformed gas as a final product. If needed, the reformed gas as the final product may be further purified by an appropriate method.

The reforming catalyst section, the shift catalyst section and the CO-selective oxidizing catalyst section as mentioned above have been already known, and also, "the reformed gas" from the respective catalyst sections has been already known. In the reforming apparatus of the present invention, it is possible to use the known catalysts in the respective catalyst sections.

The term "reformed gas-producing passage" means a passage through which the reformed gas flows in the above described various states so as to produce the reformed gas as a final product which is rich in hydrogen and contains a decreased amount of carbon monoxide. Since a passage through which a mixed gas containing the fuel gas and the steam (optionally, water may be included) as the raw materials flows is used for producing the reformed gas, this passage also forms a part of the "reformed gas-producing passage".

The second aspect of the present invention provides a method of operating the reforming apparatus according to the first aspect of the present invention (including the reforming apparatuses according to the first to the thirty-sixth embodiments which will be described later).

BRIEF DESCRIPTION OF THE DRAWINGS

FIG. 10 schematically shows an example of the embodiments of the present invention, in which FIG. 10(a) is a sectional view thereof, and FIG. 10(b) is a perspective view of a water evaporator.

FIG. 13 schematically shows an example of the embodiments of the present invention, in which FIG. 13(a) is a sectional view thereof, and FIG. 13(b) is an enlarged sectional view of a second water passage.

FIG. 17 schematically shows an example of the embodiments of the present invention, in which FIG. 17(a) is a sectional view thereof, and FIG. 17(b) is a bottom view of an air-feeding passage.

FIG. 18 schematically shows an example of the embodiments of the present invention, in which FIG. 18(a) is a sectional view thereof; FIG. 18(b) is a plan view of a passage-limiting plate; and FIG. 18(c) is a plan view of the passage-limiting plate.

Figure 1:
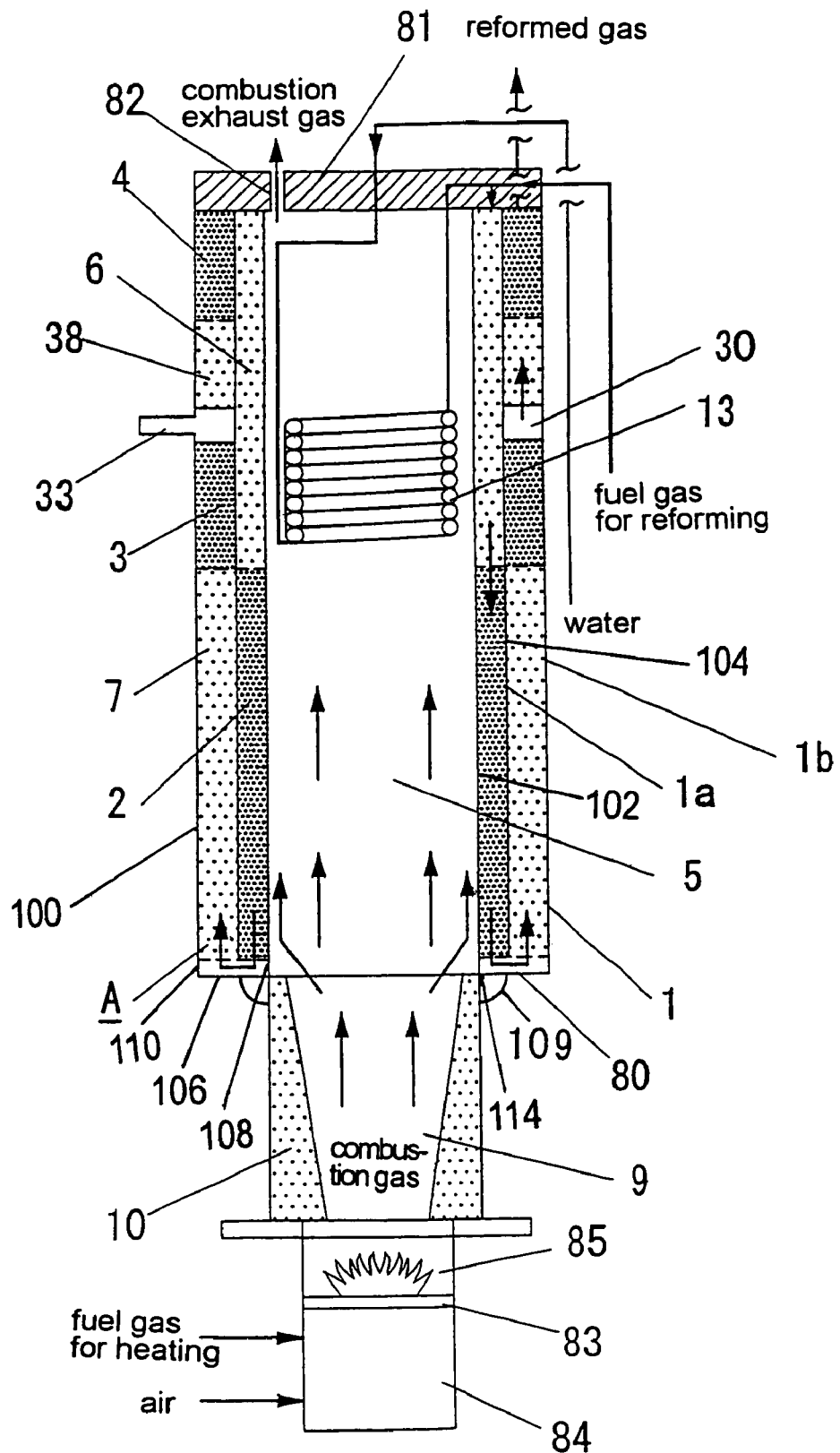
FIG. 1 is a schematic sectional view of an example of the embodiments of the present invention.

In the drawings, the respective reference numeral denotes the following:

1 . . . reformed gas-producing passage, 1a . . . first passage, 1b . . . second passage, 2 . . . reforming catalyst section,
3 . . . shift catalyst section,
4 . . . CO-selective oxidizing catalyst section,
5 . . . combustion gas passage,
6 . . . second heat-recovering section,
7 . . . first heat-recovering section,
8 . . . heat radiant transmitting member,
9 . . . combustion gas-introducing passage,
10 . . . incombustible cylindrical body,
11 . . . degassing hole, 12 . . . through hole,
13 . . . water evaporator, 14 . . . water droplet-receiving member,
15 . . . cylindrical portion, 16 . . . bottom portion,
17 . . . heat-exchanging passage,
18 . . . passage-throttling plate, 19 . . . through hole,
20 . . . water passage, 21 . . . temperature sensor,
22 . . . temperature sensor, 23 . . . second water passage,
24 . . . heat-transfer resistant layer, 25 . . . temperature sensor,
26 . . . shut-off valve, 27 . . . flow rate-control valve,
28 . . . third water passage, 29 . . . air-feeding passage,
30 . . . gas-mixing chamber, 31 . . . tubular body,
32 . . . air-injecting hole, 33 . . . air-feeding port,
34 . . . passage-limiting plate, 35 . . . gas-passing hole,
36 . . . passage resistant member, 37 . . . second air-feeding port,
38 . . . third heat-recovering section,
80 . . . communicating portion, 100 . . . outer cylindrical body,
102 . . . inner cylindrical body,
104 . . . cylindrical partition wall, 106 . . . annular plate,
108 . . . end portion of the inner cylindrical body,
109 . . . welded portion,
110 . . . end portion of outer cylindrical body,
112 . . . end area, 114 . . . welded portion, 130, 132 . . . flange,
134 . . . bolt and nut, 140 . . . cylindrical member,
142 . . . outer surface area, 200 . . . innermost cylindrical body,
202 . . . outermost cylindrical body,
204, 206 . . . cylindrical partition wall, 208 . . . first path,
210 . . . second path, 212 . . . third path,
218 . . . communicating portion,
220 . . . fourth heat-recovering section.

DETAILED DESCRIPTION OF THE INVENTION

In the first embodiment, the reforming apparatus according to the first aspect of the present invention comprises a reformed gas-producing passage for producing a reformed gas from a fuel gas and steam, and a combustion gas passage, wherein the reformed gas-producing passage comprises (1) a reforming catalyst section, (2) a shift catalyst section and (3) a CO-selective oxidizing catalyst section, which are arranged as listed order from an upstream side to a downstream side of a flow direction of the reformed gas, the reformed gas-producing passage comprises (a) a first passage located adjacent to the combustion gas passage and including the reforming catalyst section, and (b) a second passage located adjacent to the first passage, the second passage comprises a first heat-recovering section located adjacent to the reforming catalyst section, and the first passage comprises a second heat-recovering section located adjacent to at least one of the shift catalyst section, a reformed gas having passed through the shift catalyst section and the CO-selective oxidizing catalyst section.

In this reforming apparatus, the reformed gas-producing passage comprises the second heat-recovering section, the reforming catalyst section, the first heat-recovering section, the shift catalyst section and the CO-selective oxidizing catalyst section, which are arranged in thus listed order from the upstream side to the downstream side along the reformed gas-flowing direction.

In the first embodiment, it is particularly preferable that the second passage further comprises the sift catalyst section, and it is the most preferable that the second passage further comprises the CO-selective oxidizing catalyst section in addition to the shift catalyst section.

In the first embodiment, it is the most preferable that the reformed gas-producing passage comprises:

(a) the first passage which includes the reforming catalyst section and is located adjacent to the combustion gas passage, and (b) the second passage which includes the shift catalyst section and the CO-selective oxidizing catalyst section and is located adjacent to the first passage, wherein the second passage includes the first heat-recovering section located which is adjacent to the reforming catalyst section, and the first passage includes the second heat-recovering section located which is adjacent to at least one of the shift catalyst section, the reformed gas having passed through the shift catalyst section and the CO-selective oxidizing catalyst section.

The term "heat-recovering section" referred to in the present specification means a unit for heat-exchanging, that is, a unit for transferring (or transmitting) heat from at least one object (e.g. a material or an element) to at least one different object (a material or an element). The "heat-recovering section" is a structural member which defines an internal space of the reformed gas-producing passage through which space a gas is allowed to pass in order to transfer heat, and this heat-recovering section is usually composed of a structural member which composes a part of the reformed gas-producing passage. In one example thereof, the heat-recovering section receives heat from an object located adjacent thereto, and supplies the heat to other object which is passing through the heat-recovering section (and thus uses the heat). As a result, the temperature of said other object rises while it is passing through the heat-recovering section. In other example, the heat-recovering section receives heat from an object which is passing through the heat-recovering section, and supplies the heat to another object located adjacent to the heat-recovering section (and thus uses the heat). As a result, the temperature of the object which is passing through the heat-recovering section decreases. Examples of the object which passes through the heat-recovering section include various reformed gases, fuel gases to be reformed, steam (which may include water), etc. Examples of the object located adjacent to the heat-recovering section include the reforming catalyst section, the shift catalyst section, the CO-selective oxidizing catalyst section, the combustion gas passage, other heat-recovering sections, etc.

The term "adjacent" means such a state that the structural member defining the heat-recovering section is in contact with the object so as to transfer heat therebetween. Such contact may be indirect contact or direct contact.

The increase or the decrease in the temperature of the object mentioned above is intended to mean a predetermined change in temperature. In this sense, the "heat-recovering section" is a device for intentionally changing the temperature of the object which passes through the heat recovering section, to a predetermined temperature by way of the heat transfer. In general, the "heat-recovering section" may be any of devices capable of functioning as heat exchangers.

In the second embodiment, the above reforming apparatus according to the first embodiment of the present invention further comprises a third heat-recovering section which is located adjacent to the second-heat recovering section and between the shift catalyst section and the CO-selective oxidizing catalyst section.

In the foregoing first aspect, the reforming apparatus of the present invention may comprise a heat-recovering section which is intended to supply heat to a specific object (e.g. a material or an element).

In the third embodiment, the reforming apparatus according to the first aspect of the present invention as described above comprises:

a reformed gas-producing passage which includes a reforming catalyst section for producing a reformed gas containing hydrogen as a main component by steam-reforming a fuel gas and steam, a shift catalyst section for reducing the CO in the reformed gas produced in the reforming catalyst section through a water gas shift reaction, and a CO-selective oxidizing catalyst section for further reducing the CO in the reformed gas having undergone the water gas shift reaction by reacting the CO in the reformed gas with oxygen, which sections are arranged in such listed order along the gas flow direction; and a combustion gas passage for heating the reforming catalyst section, and this reforming apparatus is characterized in that the reformed gas-producing passage comprises:

a first passage including the reforming catalyst section and a second heat-recovering section which recovers heat from at least one of the shift catalyst section, the gas having passed through the shift catalyst section and the CO-selective oxidizing catalyst section and supplies the heat to the fuel gas and the steam fed to the reforming catalyst section, and a second passage including a first heat-recovering section which recovers heat from the gas having passed through the reforming catalyst section and supplies the heat to the reforming catalyst section; and that the first passage is located adjacent to the above combustion gas passage, and the second passage is located adjacent to the first passage.

In the third embodiment, it is particularly preferable that the second passage further comprises a shift catalyst section, and it is the most preferable that the second passage comprises a CO-selective oxidizing catalyst section, in addition to the shift catalyst section.

Accordingly, the most preferable of the third embodiment is such that, in the above reforming apparatus, the above reformed gas-producing passage comprises the reforming catalyst section and the first passage which includes the second heat-recovering section which recovers heat from at least one of the shift catalyst section, the gas having passed through the shift catalyst section and the CO-selective oxidizing catalyst section and which supplies the heat to the fuel gas and the steam fed to the reforming catalyst section; and the second passage which includes the shift catalyst section, the CO-selective oxidizing section and the first heat-recovering section which recovers heat from the gas having passed through the reforming catalyst section and supplies the heat to the reforming catalyst section, and the first passage is located adjacent to the above combustion gas passage, and the second passage is located adjacent to the first passage. In this reforming apparatus, the reformed gas-producing passage comprises the second heat-recovering section, the reforming catalyst section, the first heat-recovering section, the shift catalyst section and the CO-selective oxidizing catalyst section, which are arranged in this order from the upstream side to the downstream side along the reformed gas flowing direction, as in the reforming apparatus according to the first embodiment.

In the text of the present specification, the term "passage" of "the first passage" and "the second passage" means a passage through which a reformed gas or a starting material gas therefor (which may optionally be of a liquid such as water) passes, and the form of the passage is not particularly limited. However, in the reforming apparatus of the present invention, a relatively narrow space which is formed between walls is used as a passage, and such passages are located adjacent to each other, so that these passages are in the form of a layer. In this sense, the above term "passage" may be also referred to as a "passage layer".

In the reforming apparatuses according to the first and third embodiments, the heat of the gas having passed through the reforming catalyst section is recovered in the first heat-recovering section for use; and at least one of the heat generated in the shift catalyst section, the heat generated in the CO-selective oxidizing catalyst section, the heat of the reformed gas having passed through the shift catalyst section and the heat of the gas having passed through the CO-selective oxidizing catalyst section is recovered in the second heat-recovering section for use. Further, the reforming apparatus can be composed of a small number of layers, i.e., the combustion gas passage, the first passage and the second passage. In addition, the reforming apparatus can be actuated by causing the combustion gas passage to heat the first passage and the second passage. Thus, the reforming apparatus can show a high efficiency and an excellent operation-starting performance, in spite of its compact body and simple structure.

In the fourth embodiment, the reforming apparatus according to the third embodiment is characterized in that the second passage includes a third heat-recovering section which is between the shift catalyst section and the CO-selective oxidizing catalyst section and which recovers heat from the gas having passed through the shift catalyst section and supplies the heat to the second heat-recovering section.

It is noted that in each of the third embodiment and the fourth embodiment, the heat-recovering section may supply the heat to not only an intended specific object, but also other object, and such is rather usual.

In the reforming apparatus according to the second embodiment and the fourth embodiment, it is possible to make use of heat which the third heat-recovering section recovers from the gas having passed through the shift catalyst section, and thus, the efficiency of the apparatus can be further improved.

In any of the first aspect, the second aspect and the first to the fourth embodiments, it is preferable that at least one, and preferably all of the heat-recovering sections include heat-transfer accelerating elements therein. As the heat-transfer accelerating elements, a variety of regular or irregular fillers can be used. For example, granular particle elements (e.g. particles of ceramics such as alumina, zirconia, etc.), fibers (e.g. glass wool, etc.) and the like can be used. The reforming apparatus according to the first aspect, the method of operating the reforming apparatus according to the second aspect, and the reforming apparatuses according to the first to the fourth embodiments, which will be referred to in the following description, includes an embodiment in which such heat-transfer accelerating elements are used. Those elements disturb flows of the reformed gases in the various conditions or the starting material gases therefor passing through the heat-recovering sections and thereby accelerate the heat transfer.

In the fifth embodiment, the reforming apparatus according to any one of the first to the fourth embodiments is characterized in that the reformed gas-producing passage is formed as a multi-cylindrical structure by disposing the first cylindrical passage around the outer periphery of the combustion gas passage, and disposing the second cylindrical passage around the outer periphery of the first cylindrical passage. In the reforming apparatus according to the fifth embodiment, the reforming apparatus can be composed of a small number of the cylindrical layers, and thus, made compact with a simple structure.

In the sixth embodiment, the reforming apparatus according to any of the first to the fifth embodiments is characterized in that the combustion gas flowing direction in the combustion gas passage is opposed to the gas flow direction in the first passage in the reformed gas-producing passage (i.e. these flowing directions are in the counter-current mode). In the reforming apparatus according to the sixth embodiment, the efficiency of the combustion gas' heating of the reformed gas which is produced from the fuel gas to be reformed can be improved.

In the seventh embodiment, the reforming apparatus according to any of the first to the sixth embodiments is characterized in that a heat radiant transmitter which opposes to at least a part of the reforming catalyst section is disposed in the combustion gas passage. In the reforming apparatus according to the seventh embodiment, the combustion gas flowing in the combustion gas passage passes through a space between the heat radiant transmitter and the reforming catalyst section, while heating the reforming catalyst section, and simultaneously the radiation heat from the surface of the heat radiant transmitter heated by the combustion gas also heats the reforming catalyst section. Thus, the heating of the reforming catalyst section can be efficiently carried out.

In the eighth embodiment, the reforming apparatus according to the seventh embodiment is characterized in that an inner diameter of an upper end of an incombustible inner cylindrical body which forms a passage for introducing the combustion gas into the combustion gas passage is smaller than an inner diameter of the combustion gas passage, and that the heat radiant transmitter is disposed in the combustion gas passage while it is supported by the incombustible cylinder. In the reforming apparatus according to the eighth embodiment, the incombustible cylindrical body having the combustion gas-introducing passage formed therein can be used to support the heat radiant transmitter, and thus the structure of the apparatus can be simplified.

In the ninth embodiment, the reforming apparatus according to the seventh or eighth embodiment is characterized in that the heat radiant transmitter which is formed as a cylindrical hollow body is opened at an end portion of its upstream side along the combustion gas flow and is closed at the other end of its downstream side along the combustion gas flow. In the embodiment according to the ninth embodiment, the heat radiated and transmitted from the heat radiant transmitter to the burner is reduced, and thus back-fire and deterioration of the material of the burner for producing the combustion gas is prevented.

In the tenth embodiment, the reforming apparatus according to the ninth embodiment is characterized in that a degassing hole is formed at a part of the closed end surface of the cylindrical heat radiant transmitter on the downstream side along the combustion gas flow. In the reforming apparatus according to the tenth embodiment, it is possible to prevent a combustible gas from remaining in the heat radiant transmitter, so that the occurrence of explosive burning is prevented.

In the eleventh embodiment, the reforming apparatus according to the ninth or tenth embodiment is characterized in that at least one through hole for injecting the combustion gas is formed in a side wall of the cylindrical heat radiant transmitter. In the reforming apparatus according to the eleventh embodiment, the reforming catalyst section is heated by injecting the high temperature combustion gas from the through hole which flows in the heat radiant transmitter, and thus the efficiency of heating the reforming catalyst can be improved.

In the twelfth embodiment, the reforming apparatus according to the eleventh embodiment is characterized in that a plurality of the through holes are formed in the side wall of the cylindrical heat radiant transmitter (8), and that the distribution density of the through holes becomes thinner toward the downstream side along the combustion gas flow. In the reforming apparatus according to the twelfth embodiment, the portion of the reforming catalyst section on the downstream side along the flow of the fuel gas for reforming is heated to a higher temperature by a larger amount of the combustion gas injected from the through holes. Thus, the reforming catalyst section can be efficiently heated.

In the thirteenth embodiment, the reforming apparatus according to any of the first to the twelfth embodiments is characterized in that a water evaporator for evaporating water and introducing the formed steam into the second heat-recovering section is disposed in the combustion gas passage so as to oppose to the shift catalyst section (3) (through the second heat-recovering section). In the reforming apparatus according to the thirteenth embodiment, the heat of the combustion gas can be effectively used to evaporate the water, and also, a portion of the second heat-recovering section which portion is adjacent to the shift catalyst section is cooled by the evaporator. Thus, the temperature of the shift catalyst section can be maintained within the suitable temperature range.

In the fourteenth embodiment, the reforming apparatus according to the thirteenth embodiment is characterized in that the water evaporator is disposed in the combustion gas passage such that it opposes to the shift catalyst section and the CO-selective oxidizing catalyst section. In the reforming apparatus according to the fourteenth embodiment, a portion of the second heat-recovering section which is adjacent to the shift catalyst section and the CO-selective oxidizing catalyst section is cooled by the evaporator. Thus, it becomes easy to maintain the temperatures of the shift catalyst section and the CO-selective oxidizing catalyst section within the suitable temperature ranges, respectively.

In the fifteenth embodiment, the reforming apparatus according to the thirteenth or fourteenth embodiment is characterized in that a water droplet-receiving member which receives water droplets from the steam introduced from the evaporator into the second heat-recovering section is provided in the second heat-recovering section. The water droplet-receiving member may be any member which captures and holds the water droplets introduced together with the steam. In the reforming apparatus according to the fifteenth embodiment, it is possible to prevent the water from passing through the second heat-recovering section and reaching the reforming catalyst section, and thus it is possible to prevent the temperature decrease of the reforming catalyst section.

In the sixteenth embodiment, the reforming apparatus according to any one of the thirteenth to the fifteenth embodiments is characterized in that the second heat-recovering section contains water-absorbing particles. In the reforming apparatus according to the sixteenth embodiment, the water-absorbing particles (e.g. porous ceramic particles) absorb the water in the steam entrained from the evaporator into the second heat-recovering section, thereby preventing the water from passing through the second heat-recovering section and reaching the reforming catalyst section. As a result, it is possible to prevent the temperature decrease of the reforming catalyst section.

In the seventeenth embodiment, the reforming apparatus according to any one of the thirteenth to the sixteenth embodiments is characterized in that the water evaporator is formed as a cylindrical body which allows the water and/or the steam to spirally pass therethrough and of which open end on the downstream side along the combustion gas flowing direction is closed. In the reforming apparatus according to the seventeenth embodiment, it is possible to inhibit the combustion gas to pass through the interior of the cylindrical evaporator and to cause the combustion gas to pass through a space between the evaporator and the second heat-recovering section so as to improve the efficiency of heating the evaporator and the second heat-recovering section.

In the eighteenth embodiment, the reforming apparatus according to any one of the thirteenth to the sixteenth embodiments is characterized in that the water evaporator is formed as a bottomed cylindrical body by closing one of the openings of the cylindrical body with a bottom member; that the interior of the cylindrical portion and the interior of the bottom portion together form a heat-exchanging passage through which the water or the steam passes; that the evaporator is disposed in the combustion gas passage with its bottom portion facing to the upstream side along the combustion gas flowing direction; that a passage throttling plate (or a baffle plate) is so disposed in the combustion gas passage as to oppose to the bottom portion of the evaporator; and that a through hole for allowing the combustion gas to pass therethrough is formed at such a position on the passage throttling plate that opposes to the central portion of the bottom portion of the evaporator. In the reforming apparatus according to the eighteenth embodiment, it becomes possible to allow the combustion gas to flow over a whole of the underside of the bottom portion and a whole of the peripheral wall of the cylindrical portion of the evaporator. As a result, the water can be efficiently heated in the evaporator to form the steam.

In the nineteenth embodiment, the reforming apparatus according to any one of the first to the eighteenth embodiments is characterized in that a water passage (or a first water passage) for allowing water necessary for the steam reforming reaction to pass therethrough is disposed on a part of the outer peripheral portion of the second passage such that the part opposes to the CO-selective oxidizing catalyst section. It is preferable to spirally form this water passage of a coil-like wound tube (in this regard, a second water passage and a third water passage are formed in the same manner, as will be described later). In the reforming apparatus according to the nineteenth embodiment, it is possible to cool the CO-selective oxidizing catalyst section with the water passage, so that the temperature of the CO-selective oxidizing catalyst section is readily maintained within the suitable temperature range.

In the twentieth embodiment, the reforming apparatus according to the nineteenth embodiment is characterized in that the water having passed through the water passage is fed to the water evaporator. In the reforming apparatus according to the twentieth embodiment, the water passing through the water passage is heated by the CO-selective oxidizing catalyst section, so that the temperature of the water is raised. As a result, such heated water can be efficiently evaporated in the evaporator.

In the twenty-first embodiment, the reforming apparatus according to any one of the first to the twentieth embodiments is characterized in that temperature sensors for measuring the temperatures of the reforming catalyst section and the shift catalyst section, respectively are provided; and that an air-fuel ratio (a ratio of supplied air and supplied fuel gas) for producing the combustion gas, an amount of the fuel gas for use in heating and/or an amount of the air for use in heating are controlled based on the measured temperatures. In the reforming apparatus according to the twenty-first embodiment, by controlling the air-fuel ratio, the amount of the fuel gas for use in heating and/or the amount of the air for use in heating in accordance with the temperatures of the reforming catalyst section and the shift catalyst section, the temperature and/or a quantity of heat of the combustion gas can be controlled. As a result, the temperatures of the reforming catalyst section and the shift catalyst section can be maintained within the suitable temperature ranges.

In the twenty-second embodiment, the reforming apparatus according to any one of the first to the twenty-first embodiments is characterized in that a second water passage for allowing the water necessary for the steam reforming reaction to pass therethrough is disposed on the outer peripheral portion of the second passage near the shift catalyst section. In the reforming apparatus according to the twenty-second embodiment, the water passing through the second water passage cools the shift catalyst section. As a result, the temperature of the shift catalyst section can be maintained within the suitable temperature range.

In the twenty-third embodiment, the reforming apparatus according to the twenty-second embodiment is characterized in that the second water passage is disposed on the outer peripheral portion of the second passage through a heat-transfer resistant layer. This heat-transfer resistant layer permits gentle heat transfer between the shift catalyst section and the second water passage so as to enlarge the temperature gradient therebetween. The heat-transfer resistant layer is formed of, for example, a heat-insulation material having a low thermal conductivity. In the reforming apparatus according to the twenty-third embodiment, even if the temperature of the water passing through the second water passage changes, the heat-transfer resistant layer prevents direct transmission of such temperature change to the shift catalyst section. As a result, it becomes easy to maintain the temperature of the shift catalyst section within the suitable temperature range.

In the twenty-fourth embodiment, the reforming apparatus according to the twenty-second or twenty-third embodiment is characterized in that the second water passage is disposed on the outer peripheral portion of the second passage near the shift catalyst section in such a manner that the second water passage is densely disposed (for example, the turn number of the coil-like winding of the water passage tube is increased) on the upstream side along the flow of the reformed gas which passes through the shift catalyst section. In the reforming apparatus according to the twenty-fourth embodiment, it is possible to efficiently cool the inlet portion of the shift catalyst section with the water which passes through the second water passage. As a result, it becomes easy to maintain the temperature of the shift catalyst section within the suitable temperature range.

In the twenty-fifth embodiment, the reforming apparatus according to any one of the first to the twenty-first embodiments is characterized in that the second water passage for allowing water necessary for the steam reforming reaction to pass therethrough is disposed such that it opposes to an intermediate portion between the first heat-recovering section and the shift catalyst section (i.e., an interface portion therebetween) in the second passage. In the reforming apparatus according to the twenty-fifth embodiment, it is possible to efficiently cool the inlet portion of the shift catalyst section with the water which passes through the second water passage. As a result, it becomes easy to maintain the temperature of the shift catalyst section within the suitable temperature range.

In the twenty-sixth embodiment, the reforming apparatus according to any one of the twenty-second to the twenty-fifth embodiments is characterized in that a means for controlling a flowing rate of the water which passes through the second water passage is provided, that a temperature sensor for measuring the temperature of the shift catalyst section is provided and that the flowing rate of the water is controlled based on the measured temperature. In the reforming apparatus according to the twenty-sixth embodiment, it is possible to control the cooling of the shift catalyst section with the second water passage by controlling the flowing rate of the water supplied to the second water passage in accordance with the temperature of the shift catalyst section. As a result, the temperature of the shift catalyst section can be maintained within the suitable temperature range.

In the twenty-seventh embodiment, the reforming apparatus according to the twenty-sixth embodiment is characterized in that a shut-off valve is used as a means for controlling the flowing rate of the water, and that the shut-off valve is controlled by opening or closing it in accordance with the temperature of the shift catalyst section. In the reforming apparatus according to the twenty-seventh embodiment, it is possible to control the flowing rate of the water supplied to the second water passage in accordance with the temperature of the shift catalyst section to thereby control the cooling of the shift catalyst section with the second water passage. As a result, the temperature of the shift catalyst section can be maintained within the suitable temperature range.

In the twenty-eighth embodiment, the reforming apparatus according to the twenty-sixth embodiment is characterized in that a flowing rate control valve is used as the means for controlling the flowing rate of the water, and that the water flowing rate is controlled in accordance with the temperature of the shift catalyst section (3). In the reforming apparatus according to the twenty-eighth embodiment, it is possible to control the flowing rate of the water supplied to the second water passage in accordance with the temperature of the shift catalyst section to thereby control the cooling of the shift catalyst section with the second water passage. As a result, the temperature of the shift catalyst section can be maintained within the suitable temperature range.

In the twenty-ninth embodiment, the reforming apparatus according to any one of the twenty-second to the twenty-eighth embodiments is characterized in that the above described first water passage on the outer peripheral portion of the CO-selective oxidizing catalyst section is connected to the above described second water passage on the outer peripheral portion of the shift catalyst section so that the water having passed through the first water passage can pass through the second water passage. In the reforming apparatus according to the twenty-ninth embodiment, the water is heated firstly in the first water passage by the CO-selective oxidizing catalyst section which is at a lower temperature, and then is heated in the second water passage by the shift catalyst section which is at a higher temperature. Thus, the temperature of the water can be raised by efficiently heating the water.

In the thirtieth embodiment, the reforming apparatus according to any one of the twenty-second to the twenty-ninth embodiments is characterized in that a third water passage is disposed on the outer peripheral portion of the combustion gas-introducing passage for introducing the combustion gas into the combustion gas passage, and that the water having passed through the third water passage is allowed to pass through either of the first passage on the outer peripheral portion of the CO-selective oxidizing catalyst section and the second water passage on the outer peripheral portion of the shift catalyst section. Alternatively, in this embodiment, the water having passed through the third water passage may be allowed to pass through both of the second water passage and the first water passage. In the reforming apparatus according to the thirtieth embodiment, it is possible to preheat the water in the third water passage by the heat of the combustion gas which passes through the combustion gas-introducing passage. Thus, the temperature of the water fed to the water passage on the outer peripheral portion of the CO-selective oxidizing catalyst section and the second water passage on the outer peripheral portion of the shift catalyst section can be stabilized. As a result, it becomes easy to maintain the temperatures of the shift catalyst section and the CO-selective oxidizing catalyst section within the suitable temperature ranges.

In the thirty-first embodiment, the reforming apparatus according to any one of the first to the thirtieth embodiments is characterized in that an air-feeding passage for feeding air from the outside to the second passage and a gas-mixing chamber (30) for mixing the air fed through the air-feeding passage and the reformed gas having left the shift catalyst section are disposed between the shift catalyst section and the CO-selective oxidizing catalyst section in the second passage. In the reforming apparatus according to the thirty-first embodiment, when the gas-mixing chamber is located on the upstream side relative to the third heat-recovering section, mixing of the air and the reformed gas in the gas-mixing chamber can be accelerated by a pressure loss which occurs due to the relatively large resistance in the passage of the third heat-recovering section, and mixing of the reformed gas and the air mixed in the gas-mixing chamber is further accelerated while passing through the third heat-recovering section. As a result, the reformed gas and the air can be more homogeneously mixed.

In the thirty-second embodiment, the reforming apparatus according to the thirty-first embodiment is characterized in that the air-feeding passage is composed of a ring-shaped hollow tube having a plurality of air-ejecting holes formed thereon, and that an air-feeding port is connected to the air-feeding passage so as to supply air to the passage. In the reforming apparatus according to the thirty-second embodiment, it is possible to uniformly feed the air from the air-feeding passage to the gas-mixing chamber. Thus, the reformed gas and the air can be homogeneously mixed.

In the thirty-third embodiment, the reforming apparatus according to the thirty-second embodiment is characterized in that the air-ejecting holes are formed in the hollow tube such that the air-ejecting direction is opposite to the flowing direction of the reformed gas in the second passage. In the reforming apparatus according to the thirty-third embodiment, the mixing of the reformed gas and the air in the gas-mixing chamber can be accelerated, which results in homogeneous mixture.

In the thirty-fourth embodiment, the reforming apparatus according to the thirty-first embodiment is characterized in that a passage-limiting plate for narrowing the passage for the reformed gas (which has been mixed with the air) is disposed within the gas-mixing chamber, and that the air-feeding port is connected to the gas-mixing chamber on the upstream side along the flowing of the reformed gas, relative to the passage-limiting plate. In the reforming apparatus according to the thirty-fourth embodiment, the air and the reformed gas which has passed through the shift catalyst section and flowed into the gas-mixing chamber are allowed to pass through the passage narrowed by the passage-limiting plate and then flow while spreading. As a result, the mixing of the reformed gas and the air is accelerated by narrowing and spreading thereafter of the reformed gas and the air.

In the thirty-fifth embodiment, the reforming apparatus according to the thirty-fourth embodiment is characterized in that a gas-passing hole for allowing a gas to pass therethrough is formed at a position on the passage-limiting plate, and that the air-feeding port is connected to the gas-mixing chamber at a position which is the farthest from the gas-passing hole. In the reforming apparatus according to the thirty-fifth embodiment, the reformed gas well mixed with the air in the space under the passage-limiting plate converges toward the gas-passing hole in the passage-limiting plate and passes through the gas-passing hole while the reformed gas and the air is being further mixed. As a result, the reformed gas and the air can be more homogeneously mixed.

In the thirty-sixth embodiment, the reforming apparatus according to any one of the thirty-first to the thirty-fifth embodiments is characterized in that a passage resistant member with a pressure loss ratio of 20 or more is disposed between the gas-mixing chamber and the CO-selective oxidizing catalyst section in the second passage. In this regard, the pressure loss ratio means a ratio of a pressure loss in case where such a resistant member is disposed to a pressure loss in case where no resistant member is disposed. The passage resistant member is composed of, for example, a porous material, an orifice or the like. In the reforming apparatus according to the thirty-sixth embodiment, the reformed gas and the air can be uniformly distributed over a whole of the length of the gas-mixing chamber. Thus, the reformed gas and the air can be homogeneously mixed.

In the thirty-seventh embodiment, the method of operating the reforming apparatus according to the second aspect of the present invention is characterized in that for the purpose of the operation of the reforming apparatus according to any one of the first to the thirty-sixth embodiments, outside air is fed from the second air-feeding port disposed between the reforming catalyst section and the shift catalyst section upon starting the operation. In the operating method according to the thirty-seventh embodiment, when air is supplied to the shift catalyst section at the start of the operation, the air and the reformed gas react with each other to generate heat in the shift catalyst section, and the generated heat can be used to raise the temperature of the shift catalyst section to a suitable temperature in a short time. Thus, the operation of the reforming apparatus can be quickly started.

In the thirty-eighth embodiment, the method of operating the reforming apparatus according to the second aspect of the present invention is characterized in that in the operation of the reforming apparatus according to any one of the first to the thirty-sixth embodiments, the water evaporator is heated to 100° C. or higher to form the steam upon the time of stopping the operation and thus formed steam is used to purge the reformed gas in the reformed gas-producing passage. In the operating method according to the thirty-eighth embodiment, it is possible to purge the reformed gas by using the steam formed in the water evaporator, and therefore it becomes unnecessary to install a bomb or the like which is needed in case where an inert gas such as a nitrogen gas is used as a purging gas.

In the thirty-ninth embodiment, the method of operating the reforming apparatus according to the second aspect of the present invention is characterized in that for the purpose of the operation of the reforming apparatus according to any one of the first to the thirty-sixth embodiments, water in a liquid phase is fed to the reforming catalyst section before supplying the fuel gas into the reformed gas-producing passage upon the time of starting the operation; the water in the reforming catalyst section is heated by the heat of the combustion gas from the combustion gas passage to form steam; and the resultant steam is used to heat the shift catalyst section and the CO-selective oxidizing catalyst section. In the operating method according the thirty-ninth embodiment, the water fed to the reforming catalyst section is directly heated and vaporized in the reforming catalyst section by the combustion gas, and the resultant steam is fed to the shift catalyst section and the CO-selective oxidizing catalyst section, so that the steam having large latent heat can heat the shift catalyst section and the CO-selective oxidizing catalyst section in a short time. Therefore, the temperatures of these catalyst sections can be raised to the suitable temperatures in a short time. As a result, the operation of the reforming apparatus can be quickly started.

EMBODIMENTS FOR CARRYING OUT THE INVENTION

Hereinafter, the present invention will be illustrated in more detail by way of embodiments thereof with reference to the accompanying drawings.

FIG. 1 shows the schematic diagram of an example of reforming apparatuses according to the first to the sixth embodiments of the present invention. The reformed gas-producing passage (1) is for use in carrying out a reaction for producing a reformed gas containing hydrogen as a main component, from steam and a fuel gas as a raw material, such as alchols (e.g. methanol, etc.), hydrocarbons (e.g. methane, butane, etc.), and fossil fuels (e.g. naphtha, LNG, etc.). The reformed gas-producing passage (1) comprises a first passage (1a) and a second passage (1b) as a double structure as seen in FIG. 1. The first passage (1a) and the second passage (1b) may be formed flat and superposed on each other for forming a reformed gas-producing passage (1). However, in the embodiment shown in FIG. 1, the reformed gas-producing passage (1) is composed of a concentric multi-cylindrical body A by disposing a first cylindrical passage (1a) around the outer periphery of a vertically extending combustion gas passage (5), and disposing a second cylindrical passage (1b) around the outer periphery of the fist passage (1a). As is well understood from the drawing, these passages are layer-like formed between each of the cylindrical walls. In this regard, these passages may be formed not only cylindrically but also prismatically.

The first passage (1a) and the second passage (1b) of the cylindrical body A are defined by the walls as the structural members made of metals with high heat conductivity. The first passage (1a) located inside is communicated with the second passage (1b) located outside through a communicating portion (80) at their lower ends. A second heat-recovering section (6) is formed in substantially the upper half of the first passage (1a), and a reforming catalyst is charged in the lower half of the first passage (1a) to form a reforming catalyst section (2) therein. A first heat-recovering section (7) is formed in substantially the lower half of the second passage (1b), and a shift catalyst is charged in the upper side of the first heat-recovering section (7) in the second passage (1b) to thereby form a shift catalyst section (3). A third heat-recovering section (38) is formed in the upper side of the shift catalyst section (3) in the second passage (1b). A CO-selective oxidizing catalyst is charged in the second passage (1b) and on the upper side of the third heat-recovering section (38) to thereby form a CO-selective oxidizing catalyst section (4). The reforming catalyst section (2) in the first passage (1a) is located adjacent to the first heat-recovering section (7) in the second passage (1b), and the second heat-recovering section (6) in the first passage (1a) is located adjacent to the shift catalyst section (3), the third heat-recovering section (38) and the CO-selective oxidizing catalyst section (4) in the second passage (1b). Although not shown herein, an heat-insulating material covers the outer periphery of the second passage (1b) to prevent the release of heat to an external.

The first heat-recovering section (7), the second heat-recovering section (6) and the third heat-recovering section (38) may be formed simply as spaces. However, it is preferable that these heat-recovering sections are charged with heat-transfer-accelerating elements such as heat-transfer-accelerating particles so as to improve the heat-transfer efficiency and thereby improve the heat-exchanging efficiency. It is preferable that the heat-transfer accelerating particles are made of a material which is highly resistant to heat and chemically stable without reacting with any of a fuel gas, a reformed gas, water and steam and which does not release various ions. Examples of such a material are the particles of ceramics (e.g. alumina, zirconia, etc.). Examples of the heat-transfer accelerating element are made of for example copper and iron which themselves have high heat conductivity.

In the second passage (1b), a gas-mixing chamber (30) is formed between the shift catalyst section (3) and the third heat-recovering section (38). The gas-mixing chamber (30) is formed annular, extending around the whole circumference of the second cylindrical passage (1b). The upper face of the gas-mixing chamber (30) in contact with the shift catalyst section (3) and the lower face thereof in contact with the third heat-recovering section (38) are formed of metallic meshes or punched metals which permit a gas to easily pass therethrough. A portion of the gas-mixing chamber (30) is connected to an air-feeding port (33) at the outer periphery of the second passage (1b). In this connection, air-feeding ports may be provided in a plurality of portions of the gas-mixing chamber.

The cylindrically formed interior surface of the first passage (1a) defines a combustion gas passage (5) of which opening at the upper end thereof is closed with a lid plate (81). An exhaust opening (82) is formed at a part of the lid plate (81). A water evaporator (13) is disposed in the upper portion of the combustion gas passage (5). The evaporator (13) is cylindrically formed by coil-like winding a pipe which allows water to pass therethrough, and it is arranged concentric with the inner peripheral surface of the first passage (1a).

An incombustible cylindrical body (10) having a combustion gas-introducing passage (9) therein is fitted in and fixed to the opening at the lower end of the cylindrical body A which forms the reformed gas-producing passage (1), by means of welding or the like. The combustion gas-introducing passage (9) is formed as a taper hole (or an inverted truncated cone-shaped hole) of which the inner diameter is gradually increased toward the combustion gas passage (5), and the opening at the upper end of the combustion gas-introducing passage (9) is communicated with the opening at the lower end of the combustion gas passage (5). Further, a burner (83) is disposed at the lower end of the incombustible cylindrical body (10). The burner (83) comprises a pre-mixing chamber (84) and a combustion chamber (85), wherein a heating fuel gas and an air are mixed in the pre-mixing chamber (84), and then burnt in the combustion chamber (85). A combustion gas produced by burning with the burner (83) passes through the combustion gas-introducing passage (9) and enters the combustion gas passage (5). The combustion gas having passed through the combustion gas passage (5) is discharged as an exhaust gas from the exhaust opening (82). For example, a temperature of this combustion gas is about 1,000 to about 1,200° C. when entering the combustion gas passage (5), and about 90 to about 100° C. when discharged as the exhaust gas. The burner is not limited to the pre-mixing type as described above, and it may be of a diffusion burning type which diffuses and burns a fuel without pre-mixing an air and the fuel.

In the reforming apparatus arranged as described above, a fuel gas as a raw material for the reformed gas is introduced from the upper end of the first passage (1a) into the second heat-recovering section (6) as indicated by the arrow notation in FIG. 1. Water necessary for a steam reforming reaction is introduced into the evaporator (13) from the lower end thereof as indicated by another arrow notation in FIG. 1. On the other hand, while the combustion gas from the burner (83) is passing through the combustion gas passage (5) as indicated by other arrow notation in FIG. 1, the water flowing through the evaporator (13) is heated by this combustion gas to form steam in the evaporator (13). This steam is introduced from the upper end of the first passage (1a) into the second heat-recovering section (6). By this way, the fuel gas to be reformed and the steam are fed into the second heat-recovering section (6). In this regard, the burner may be arranged on the upper side on the drawing, so that the flow of the combustion gas and the flows of the fuel gas and the steam may be directed in the same way. Also, like the burner described in International Publication No. WO 00/63114, a heat-transferring partition wall (a radiation cylinder) may be arranged concentric with the interior of the combustion gas passage (5), and a burner may be disposed inside the heat-transferring partition wall.

In the second heat-recovering section (6), heat is recovered from the shift catalyst section (3), the reformed gas which has passed through the shift catalyst section (3) and/or the CO-selective oxidizing catalyst section (4), by way of heat transfer. Thus recovered heat may be used to heat the fuel gas and the steam which are passing through the second heat-recovering section (6). The second heat-recovering section (6) is directly heated by the combustion gas which flows in the combustion gas passage (5) adjacent to the second heat-recovering section (6), and the fuel gas and the steam are also heated by the heat of this combustion gas. The fuel gas and the steam thus heated and having elevated temperatures further flow into the reforming catalyst section (2) as indicated by further arrow notation.

The reforming catalyst section (2) is directly heated by the combustion gas which flows in the combustion gas passage (5), and also heated by the first heat-recovering section (7) which recovers heat from the gas having passed through the reforming catalyst section (2), as will be described later. As a result, the reforming catalyst section (2) is maintained at a temperature suitable for the steam reforming reaction. In the meantime, in some cases, the fuel gas to be reformed, kept at a lower temperature, contacts the reforming catalyst to deposit carbon. However, as mentioned above, the fuel gas is heated while passing through the second heat-recovering section (6), and therefore, this problem can be avoided. Thus, while the fuel gas and the steam are passing through the reforming catalyst section (2), a reformed gas is produced through the steam reforming reaction by the action of the catalyst contained in the reforming catalyst section (2). The temperature suitable for the steam reforming reaction varies depending on the type of the catalyst, the type of the fuel gas, etc. For example, in case of a methane gas, propane gas, butane gas or the like, the exit temperature of the reforming catalyst section (2) is preferably from about 600 to about 700° C.

The reformed gas produced in the reforming catalyst section (2) passes through the communicating portion (80) at the lower end thereof, and transfers from the first passage (1a) to the second passage (1b), and passes through the first heat-recovering section (7). While the reformed gas with a high temperature is passing through the first heat-recovering section (7), the heat of the reformed gas is recovered in the first hear-recovering section (7), and the recovered heat is used to heat the reforming catalyst section (2) as described above. The reformed gas flowing out of the reforming catalyst section (2) as above described passes through the first heat-recovering section (7) and then flows into the shift catalyst section (3). The temperature suitable for the water gas shift reaction in the shift catalyst section (3) depends on the type of the catalyst, the composition of the reformed gas and the like, and it is usually from about 200 to about 350° C. The reformed gas immediately after passing through the reforming catalyst section (2) is at a high temperature. However, the temperature of the reformed gas is gradually lowered while the heat of the reformed gas is being recovered in the first heat-recovering section (7). Therefore, the temperature at the inlet of the shift catalyst section (3) can be maintained at a temperature suitable for the water gas shift reaction. Then, while the reformed gas is passing through the shift catalyst section (3), an amount of carbon monoxide present in the reformed gas is decreased by the water gas shift reaction due to the action of the catalyst in the shift catalyst section, and on the contrary, an amount of hydrogen in the reformed gas is increased. The shift reaction is an exothermic reaction, but the heat generated is recovered by the second heat-recovering section (6) in the first passage (1a) adjacent to the shift catalyst section (3). As a result, an increase in temperature due to the exothermic reaction is prevented, and thus, a whole of the shift catalyst section (3) can be maintained at a suitable temperature.

The reformed gas, which has passed through the shift catalyst section (3) and undergone the shift reaction as described above, passes through the gas-mixing chamber (30) and then flows into the third heat-recovering section (38). An air is fed to the gas-mixing chamber (30) through the air-feeding port (33), and an air necessary for the CO-selective oxidizing reaction is mixed into the reformed gas which is passing through the gas-mixing chamber (30). The reformed gas mixed with this air passes through the third heat-recovering section (38) and then flows into the CO-selective oxidizing catalyst section (4). The reformed gas is CO-selectively oxidized by the action of the catalyst in the CO-selective oxidizing catalyst section (4), so that the concentration of the carbon monoxide in the reformed gas is further lowered. The temperature suitable for the CO-selective oxidization depends on the type of the catalyst, the composition of the reformed gas, etc., and it is normally from about 120 to about 200° C. The heat of the reformed gas which has been subjected to the shift reaction in the shift catalyst section (3) is recovered while passing through the third heat-recovering section (38), and is radiated to the second heat-recovering section (6), so that the temperature of the reformed gas lowers. Therefore, the temperature of the inlet of the CO-selective oxidizing catalyst section (4) can be maintained at a temperature suitable for the CO-selective oxidizing reaction. This CO-selective oxidizing reaction is exothermic, and the generated heat is recovered by the second heat-recovering section (6) in the first passage (1a) disposed adjacent to the CO-selective oxidizing catalyst section (4). Therefore, an increase in temperature due to the exothermic reaction is prevented, and the temperature of a whole of the CO-selective oxidizing catalyst section (4) can be maintained at a suitable temperature.

Figure 2:
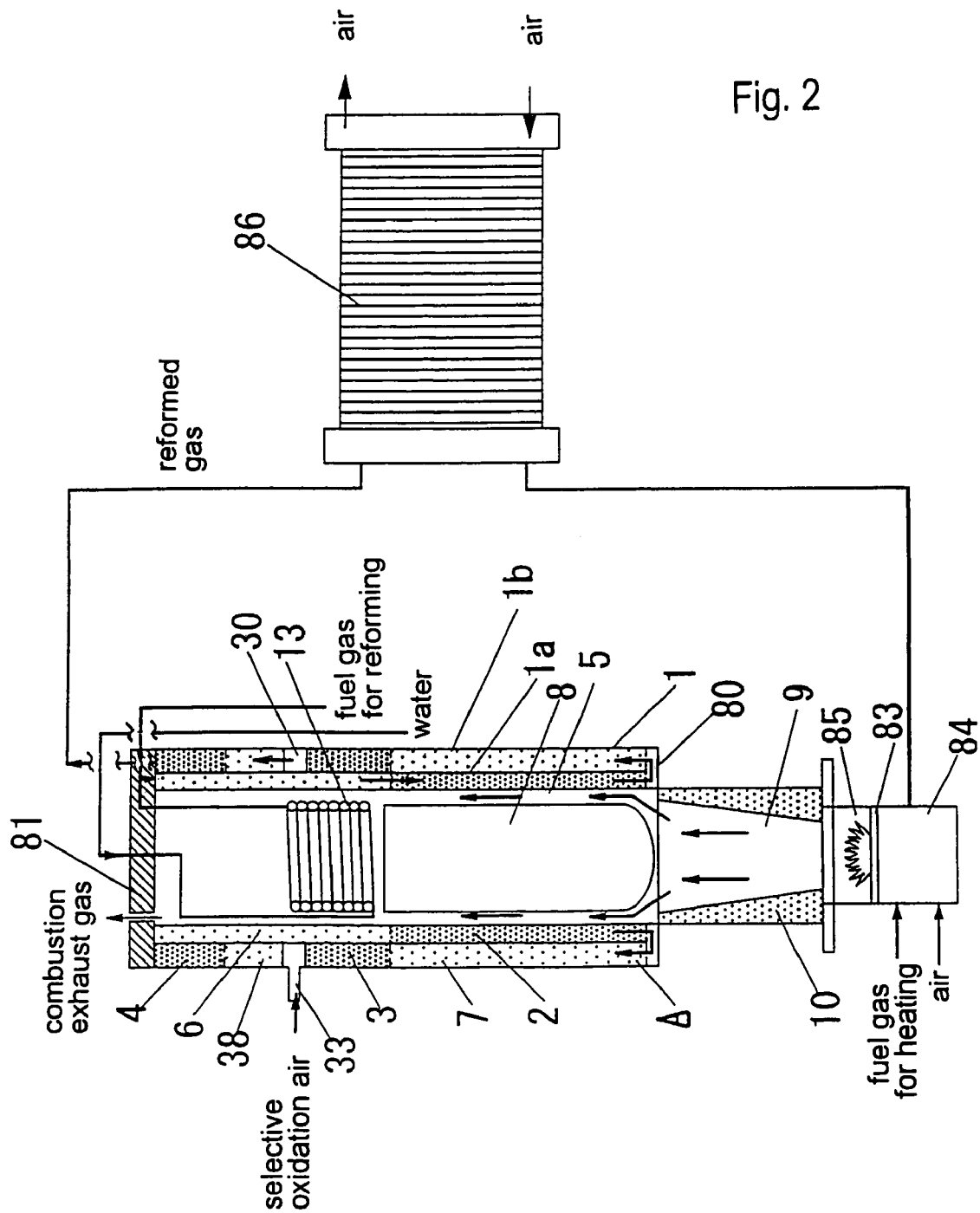
FIG. 2 is a schematic sectional view of an example of the embodiments of the present invention.

The hydrogen-rich reformed gas as a final product, produced by the reforming reaction, the water gas shift reaction and the CO-selective oxidizing reaction in the reforming catalyst section (2), the shift catalyst section (3) and the CO-selective oxidizing catalyst section (4), respectively, is discharged from the upper end of the second passage (1b), as indicated by the arrow notation in FIG. 1. The reforming apparatus according to the present invention is connected to, for example, a stack of a fuel cell for use. The reformed gas is fed to the stack of a fuel cell (86) as shown in FIG. 2. The hydrogen in the reformed gas fed to the stack of the fuel cell (86) is reacted with the oxygen in the air and consumed for the generation of power. The remaining reformed gas which has not been consumed for the power generation is fed to the burner (83) and is used as a part of the fuel gas for use in heating.

In the reforming apparatus according to the first embodiment or the third embodiment, the heat of the reformed gas having passed through the shift catalyst section (3) and the heat of the reformed gas having passed through the CO-selective oxidizing catalyst section (4) are recovered by the second heat-recovering section (6) and are consumed for heating the fuel gas and the steam fed to the reforming catalyst section (2). The heat of the reformed gas flowing out of the reforming catalyst section (2) is recovered by the first heat-recovering section (7) and is consumed for heating the reforming catalyst section (2). In this way, the heat of the high temperature reformed gas can be recovered and effectively used. Thus, the apparatus can achieve a high heat efficiency. In this regard, it is necessary that the second heat-recovering section (6) should be disposed adjacent to the shift catalyst section (3) and the CO-selective oxidizing catalyst section (4). Since the reforming reaction in the reforming catalyst section (2) is carried out at a temperature of at least 400° C., the shift catalyst section (3) of which the optimal temperature is about 200 to about 350° C., and the CO-selective oxidizing catalyst section (4) of which the optimal temperature is about 120 to about 200° C. are not located adjacent to the reforming catalyst section (2) but are located adjacent to the second heat-recovering section (6). Thus, the respective catalysts can be adjusted to temperatures at which their reaction efficiencies are high, and the amounts of the catalysts can be reduced.

In a reforming apparatus according to the second embodiment or the fourth embodiment, the third heat-recovering section (38) is provided between the shift catalyst section (3) and the CO-selective oxidizing catalyst section (4) so as to recover heat from the reformed gas which has passed through the shift catalyst section (3). As mentioned above, the temperatures suitable for the reactions in the shift catalyst section (3) (about 200 to about 350° C.) and the CO-selective oxidizing catalyst section (4) (about 120 to about 200° C.) are different from each other. As the temperature lowers, the reactivity of the shift catalyst becomes lower to decrease the CO-converting efficiency. As the temperature rises, the CO-selective oxidizing catalyst causes not only the CO-selective oxidization but also methanation. In such a case, there is a danger that the hydrogen generated in the reforming reaction may be used to form methane. To overcome this problem, in the reforming apparatus according to the second embodiment or the fourth embodiment, the heat of the reformed gas having passed through the shift catalyst section (3) is recovered in the third heat-recovering section (38), and the recovered heat is applied to the second heat-recovering section (6), so that the temperature of the CO-selective oxidizing catalyst section (4) is lowered as compared with that of the shift catalyst section (3), so as to readily maintain the shift catalyst section (3) and the CO-selective oxidizing catalyst section (4) at appropriate temperatures, respectively.

There is no particular limit in the shape of the reformed gas-producing passage (1). However, according to the fifth embodiment, a compact reforming apparatus with a decreased number of layers and not so complicated structure can be provided by cylindrically forming a first passage (1a) and a second passage (1b), thereby forming a reformed gas-producing passage (1) in the shape of a concentric double cylindrical body. The second outer passage (1b) includes a first heat-recovering section (7), a shift catalyst section (3), a third heat-recovering section (38) and a CO-selective oxidizing catalyst section (4) which require relatively low temperatures. With this arrangement, the loss of heat release to the outer peripheral area is reduced, so that the apparatus can achieve a high heat efficiency.

A reforming apparatus according to the sixth embodiment is such that the flowing direction of a combustion gas in a combustion gas passage (5) is opposed to the flowing directions of a fuel gas, steam and a reformed gas in a first passage (1a) (i.e., counter current flowing to each other). Such counter current flowing is effective to improve the efficiency of heating the fuel gas and steam by the use of the combustion gas and the efficiency of heating the reformed gas, and simultaneously to make it possible to absorb the heat of the combustion gas in the second heat-recovering section (6) in which a lower temperature fuel gas is flowing, and then to exhaust the combustion gas with a lower temperature from an exhaust opening (82).

Figure 3:
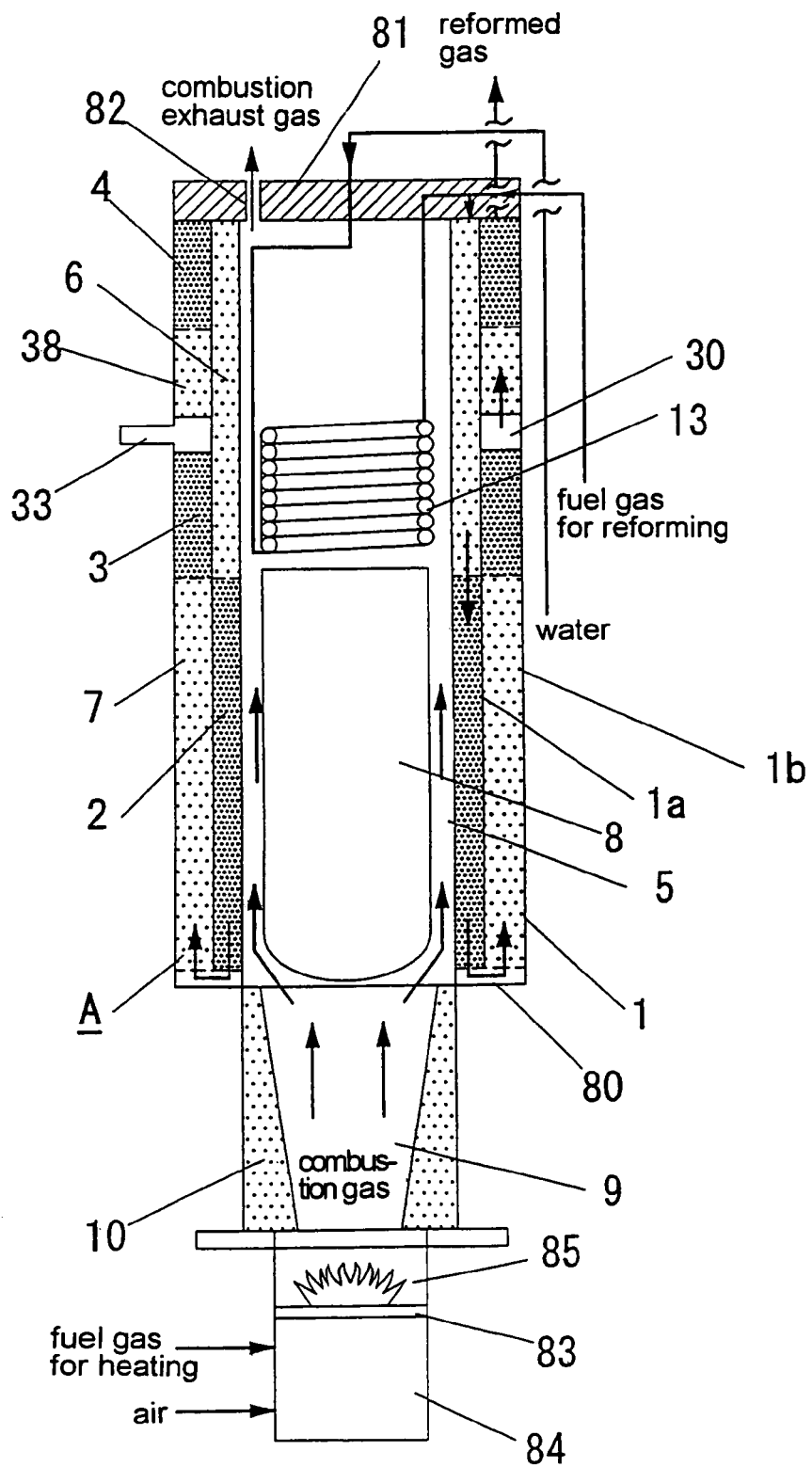
FIG. 3 is a schematic sectional view of an example of the embodiments of the present invention.

FIG. 3 shows an example of a reforming apparatus according to the seventh embodiment in which a heat radiant transmitter (8) is provided in a combustion gas passage (5). The heat radiant transmitter (8) is formed in the shape of a column having an outer diameter slightly smaller than the inner diameter of the combustion gas passage (5), and the lower end face thereof is formed curving (for example, a hemisphere). This heat radiant transmitter (8) is disposed concentric with the interior of the first passage (1a) so as to oppose the reforming catalyst section (2), and the inner periphery of the reforming catalyst section (2) in the first passage (1a) is opposed to the outer periphery of the heat radiant transmitter (8) through a narrow gap. As the material for the heat radiant transmitter (8), a stainless steel, ceramics or the like is preferable because of its resistance to the exposure to the high temperature combustion gas. Since such a heat radiant transmitter is heated by the combustion gas, it releases radiant heat. In the embodiment shown in FIG. 3, the heat radiant transmitter forms a closed hollow inside portion (which may contain a heat-resistant heat-insulating material), and this hollow portion may be opened at its lower end to an ambient atmosphere of the heat radiant transmitter, as will be described later. The features of this embodiment except for these points are the same as those shown in FIG. 1.

In the embodiment shown in FIG. 3, the combustion gas flows in the combustion gas passage (5), passing through the gap between the heat radiant transmitter (8) and the reforming catalyst section (2) in the first passage (1a), while the heat radiant transmitter (8) is being heated to a high temperature by the combustion gas. Accordingly, the reforming catalyst section (2) is heated directly by the combustion gas and also by the radiant heat from the surface of the heat radiant transmitter (8). Therefore, it becomes possible to efficiently heat the reforming catalyst section (2). In this regard, the shift catalyst section (3) and the CO-selective oxidizing catalyst section (4) cause the exothermic reactions. Therefore, it is necessary that the second heat-recovering section (6) located adjacent to the shift catalyst section (3) and/or the CO-selective oxidizing catalyst section (4) should absorb the heats therefrom. Therefore, it is preferable to suppress heat transfer from the combustion gas to the second heat-recovering section (6) at and around the second heat-recovering section, and if possible, in some cases, it is preferable for the combustion gas to receive the heat from the second heat-recovering section (6) and keep the catalysts of those sections at low temperatures. On the other hand, the reforming catalyst section (2) causes the endothermic reaction, and its proper temperature is in a higher temperature range. Therefore, the heat radiant transmitter (8) is used to efficiently heat the reforming catalyst section (2) to the high temperature. In addition, the combustion gas uniformly flows through the gap between the heat radiant transmitter (8) and the reforming catalyst section (2), and also flows at a higher rate since the area of the passage becomes narrower, so that not only the heat-radiation effect but also the heat-transfer effect can be improved. Thus, the heat transfer-accelerating effect is increased.

Figure 4:
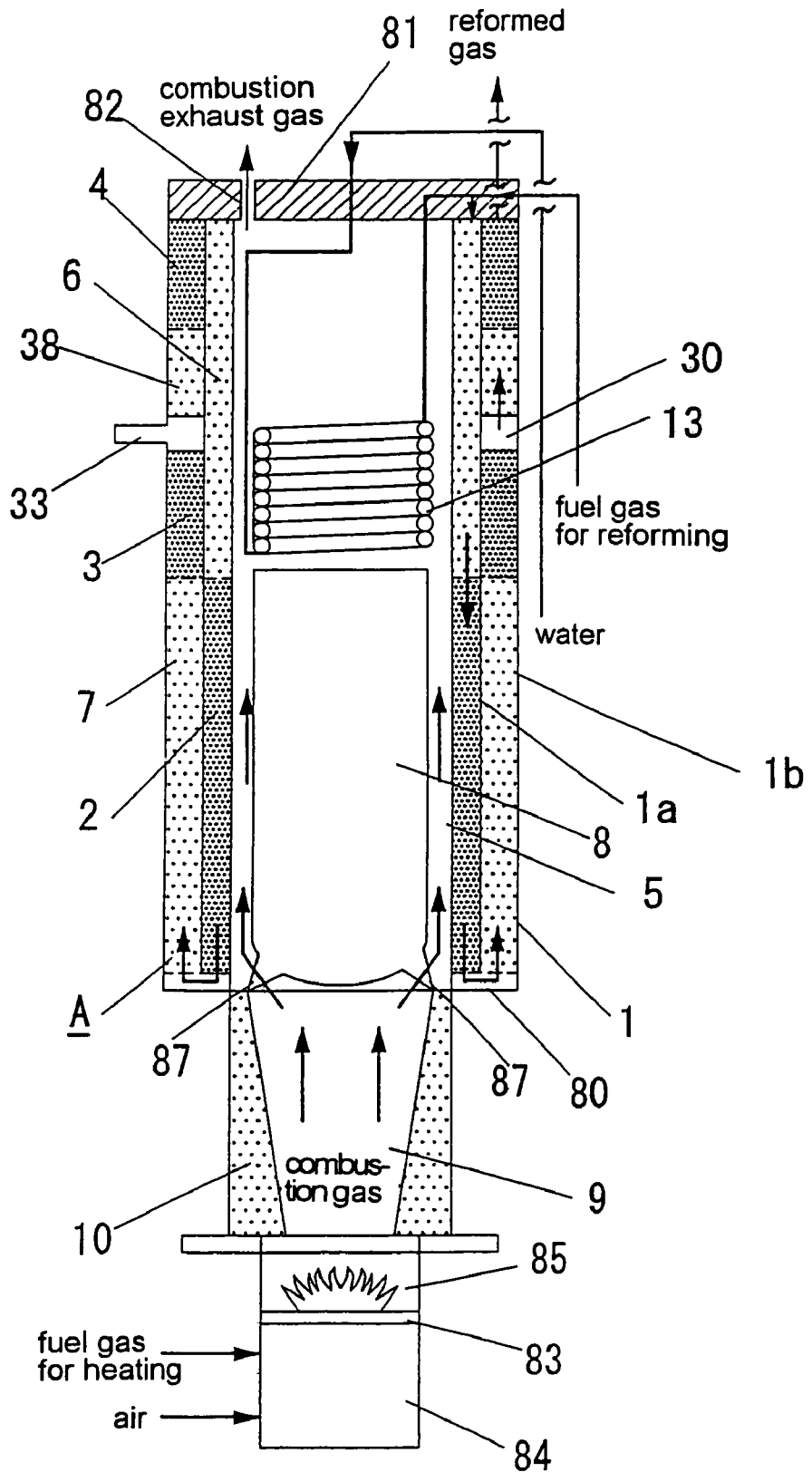
FIG. 4 is a schematic sectional view of an example of the embodiments of the present invention.

FIG. 4 shows an example of a reforming apparatus according to the eighth embodiment, in which the diameter of the opening of the upper end face of the combustion gas-introducing passage (9) defined by the interior surface of the incombustible cylindrical body (10) is smaller than the inner diameter of the lower end of the combustion gas passage (5) (similarly shown smaller also in FIGS. 1 to 19). Therefore, the upper end face of this incombustible cylindrical body (10) can be used to support the heat radiant transmitter (8). As a result, there is no need to weld the heat radiant transmitter (8) to the cylindrical body A so as to support the heat radiant transmitter (8) in the combustion gas passage (5). Thus, the structure of the reforming apparatus can be simplified. For example, a plurality of leg-like projections (87) are formed on the lower end of the heat radiant transmitter (8), and the leg-like projections (87) are placed on the upper end face of the incombustible cylindrical body (10) to thereby support the heat radiant transmitter (8). In this case, since the combustion gas can flow through the spaces between the leg-like projections, the passage for the combustion gas can be ensured. The features of this embodiment except for these points are the same as those shown in FIG. 3.

Figure 5:
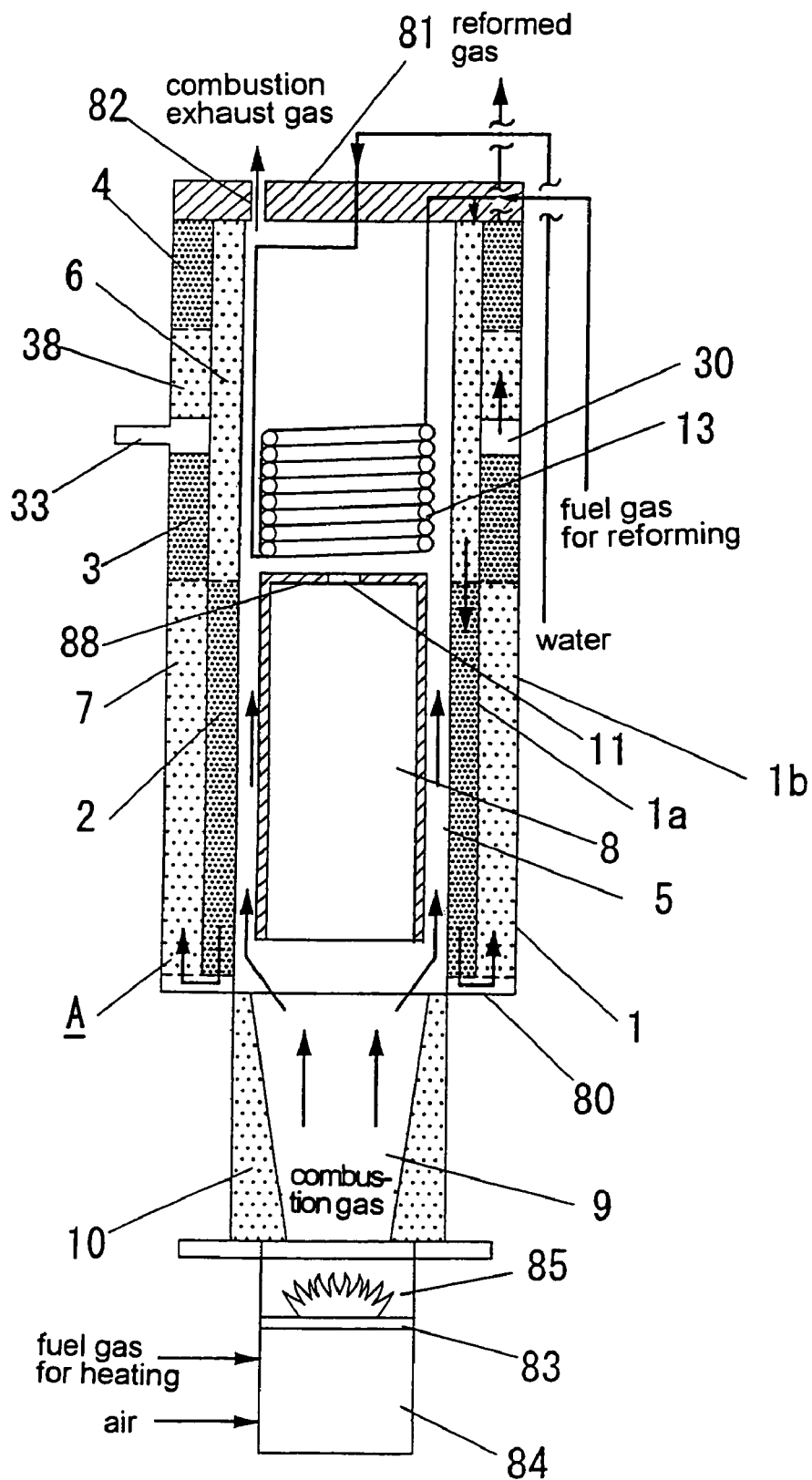
FIG. 5 is a schematic sectional view of an example of the embodiments of the present invention.

FIG. 5 shows an example of a reforming apparatus according to the ninth embodiment, in which a heat radiant transmitter (8) is formed in the shape of a cylinder which is hollow inside having an opening at its lower end. The upper end of the heat radiant transmitter (8) is closed with an end plate (88). That is, the opening of this heat radiant transmitter (8) is directed toward the upstream side of the flow of the combustion gas, in other words, the heat radiant transmitter (8) is opened downward in the combustion gas passage (5). The features of this embodiment except for these points are the same as those shown in FIG. 3.

In this regard, when the heat radiant transmitter (8) is formed in the column form, that is, when it is formed having a closed lower end as shown in FIG. 3, the surface of the heat radiant transmitter (8) directing the upstream side of the combustion gas flow, that is, the lower end face of the heat radiant transmitter (8) acts as a heat-radiating face. Accordingly, the burner (83) is heated by the radiant heat from the lower end face of the heat radiant transmitter (8), with the result that there is a danger of a back fire or a danger of deteriorating the material of the burner (83). To overcome this problem, in the reforming apparatus according to the ninth embodiment, the heat radiant transmitter (8) is formed in the shape of a cylinder having an opening directed to the upstream side of the combustion gas flow, and thus, the transmission of the radiant heat from the heat radiant transmitter (8) to the burner (83) is reduced, and the back fire and the deterioration of the material of the burner (83) can be prevented.

In the meantime, when the operation of a fuel cell system is stopped, an inert gas such as a nitrogen gas or the like is charged in the reforming apparatus or the fuel cell to thereby purge the combustible reformed gas rich in hydrogen from the reforming apparatus or the fuel cell. The reformed gas thus purged is fed to the burner (83) from the stack of fuel cell (86) as shown in FIG. 2, and is allowed to pass through the combustion gas passage (5) and exhausted into the air from the exhaust opening (82). In case where the reformed gas is exhausted through the combustion gas passage (5), there may be a danger of a combustible reformed gas resides inside the heat radiant transmitter (8), if the heat radiant transmitter (8) is opened toward the side of the upstream side of the combustion gas flow, that is, if the lower end of the heat radiant transmitter (8) is opened. Such residence of the reformed gas inside the heat radiant transmitter (8) may induce an explosive burning of the combustible reformed gas, when the burner (83) is ignited to heat the heat radiant transmitter (8) so as to restart the operation.

To overcome this problem, in a reforming apparatus according to the tenth embodiment, a degassing through hole (11) is formed in the upper end plate (88) of the heat radiant transmitter (8) to thereby prevent the residence of the combustible reformed gas inside the heat radiant transmitter (8). Arranged thus, even if the heat radiant transmitter (8) is heated while the reformed gas is resident in the heat radiant transmitter (8), an explosive burning can be prevented by releasing the pressure therein from the degassing hole (11).

Figure 6:
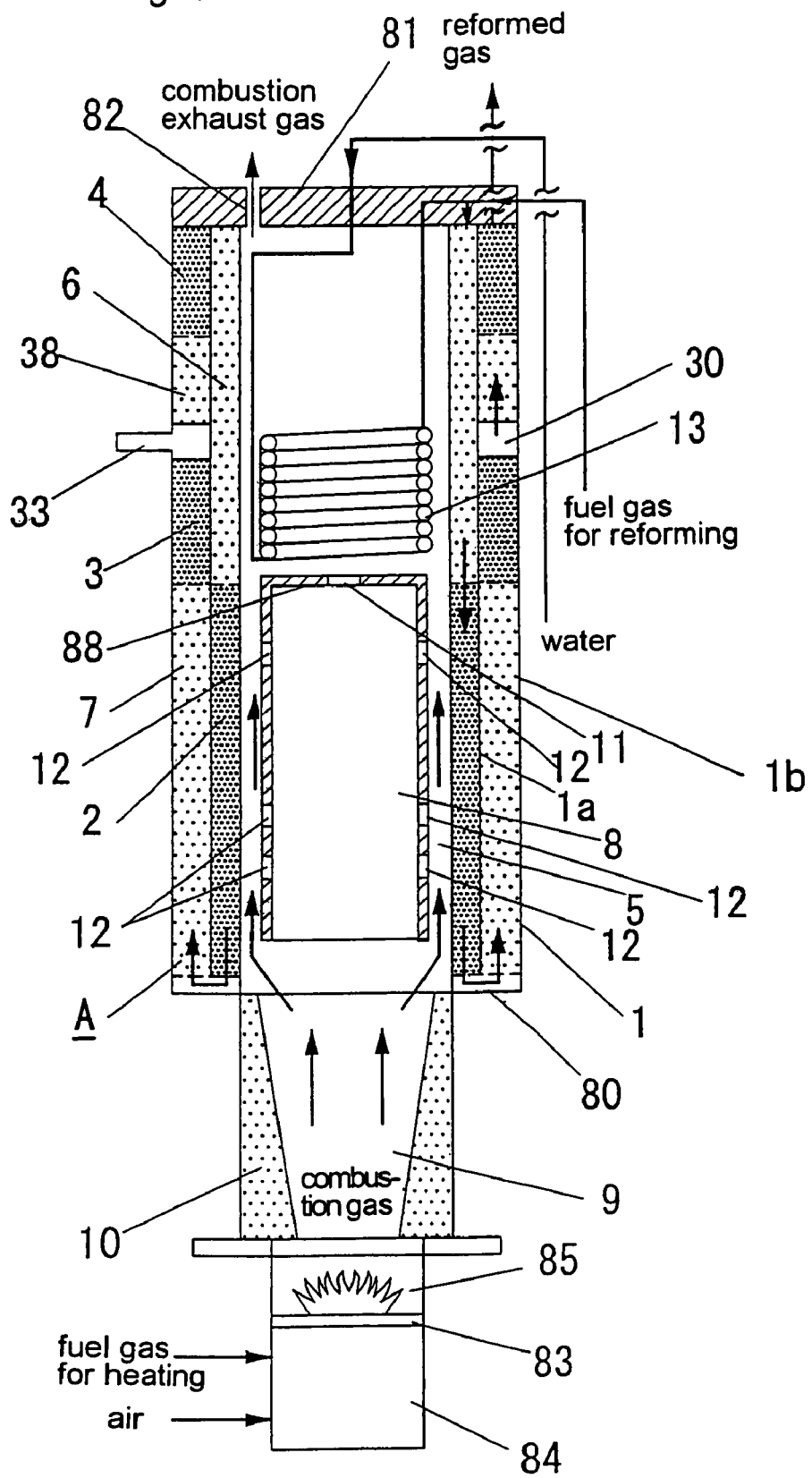
FIG. 6 is a schematic sectional view of an example of the embodiments of the present invention.

FIG. 6 shows an example of a reforming apparatus according to the eleventh embodiment, in which the heat radiant transmitter (8) is formed in the shape of a bottomed cylindrical body by closing the opening of one end (the upper end) of the heat radiant transmitter (8) with an end plate (88). This heat radiant transmitter (8) is arranged in the combustion gas passage (5) so that its opening is directed to the upstream side of the combustion gas flow. In addition, through holes (12) are formed on the side peripheral wall of the heat radiant transmitter (8). The features of this embodiment except for these points are the same as those shown in FIG. 5.

The combustion gas flows through a gap between the side wall of the heat radiant transmitter (8) and the reforming catalyst section (2) in the first passage (1a) as described above. As the combustion gas applies its heat to the reformed catalyst section (2), the temperature of the combustion gas lowers, with the result that the heat transfer may be poor. In such a case, the through holes (12) in the side peripheral wall of the heat radiant transmitter (8) as shown in FIG. 6 allow the high temperature combustion gas having flown into the heat radiant transmitter (8) to blow out therefrom, and the combustion gas blown out is used to heat the reforming catalyst section (2). Thus, the heat transfer efficiency can be improved.

In the condition as described above, the temperature of the reforming catalyst section (2) becomes higher and higher toward the downstream side of the flow of a fuel gas to be reformed, so that it is needed to increase an amount of heat to be applied for the reaction. To solve this problem, in a reforming apparatus according to the twelfth embodiment, a plurality of through holes (12) are formed in the side peripheral wall of the heat radiant transmitter (8) in such a distribution of the through holes that a density of the through holes (12) becomes smaller toward the downstream side of the heating combustion gas flow, and that the density of the through holes becomes larger toward the upstream side of the combustion gas flow. The formation of the through holes (12) in the above hole distribution makes it possible to eject out the combustion gas from a lot of the through holes (12) at the side of the upstream of the combustion gas flow, so that the downstream side of the reforming catalyst section (2) along the combustion gas flow can be heated to a higher temperature by the ejected out combustion gas. Thus, it is possible to efficiently heat the reforming catalyst (2).

In a reforming apparatus according to the thirteenth embodiment, the water evaporator (13) is located at such a level as to oppose the shift catalyst section (3), in the combustion gas passage (5), as seen in the embodiments shown in FIGS. 1 to 6. By arranging the evaporator (13) in the combustion gas passage (5) in such a manner, the heat of the combustion gas is effectively used to evaporate water, so that the resultant steam is fed to the second heat-recovering section (6). In the meantime, it is preferable that the shift catalyst section (3) is maintained at a temperature of about 200 to about 350° C. which is lower than the suitable temperature of the reforming catalyst section (2). Therefore, the temperature of the portion of the second heat-recovering section (6) located adjacent to the shift catalyst section (3) is needed to be lower than that of the reforming catalyst section (2). For this reason, in the reforming apparatus according to the thirteenth embodiment, the evaporator (13) is located at such a position as to oppose to the shift catalyst section (3), so that the portion of the second heat-recovering section (6) adjacent to the shift catalyst section (3) can be cooled by the evaporator (13). Thus, the temperature of the shift catalyst section (3) can be maintained at the above specified suitable temperature.

Figure 7:
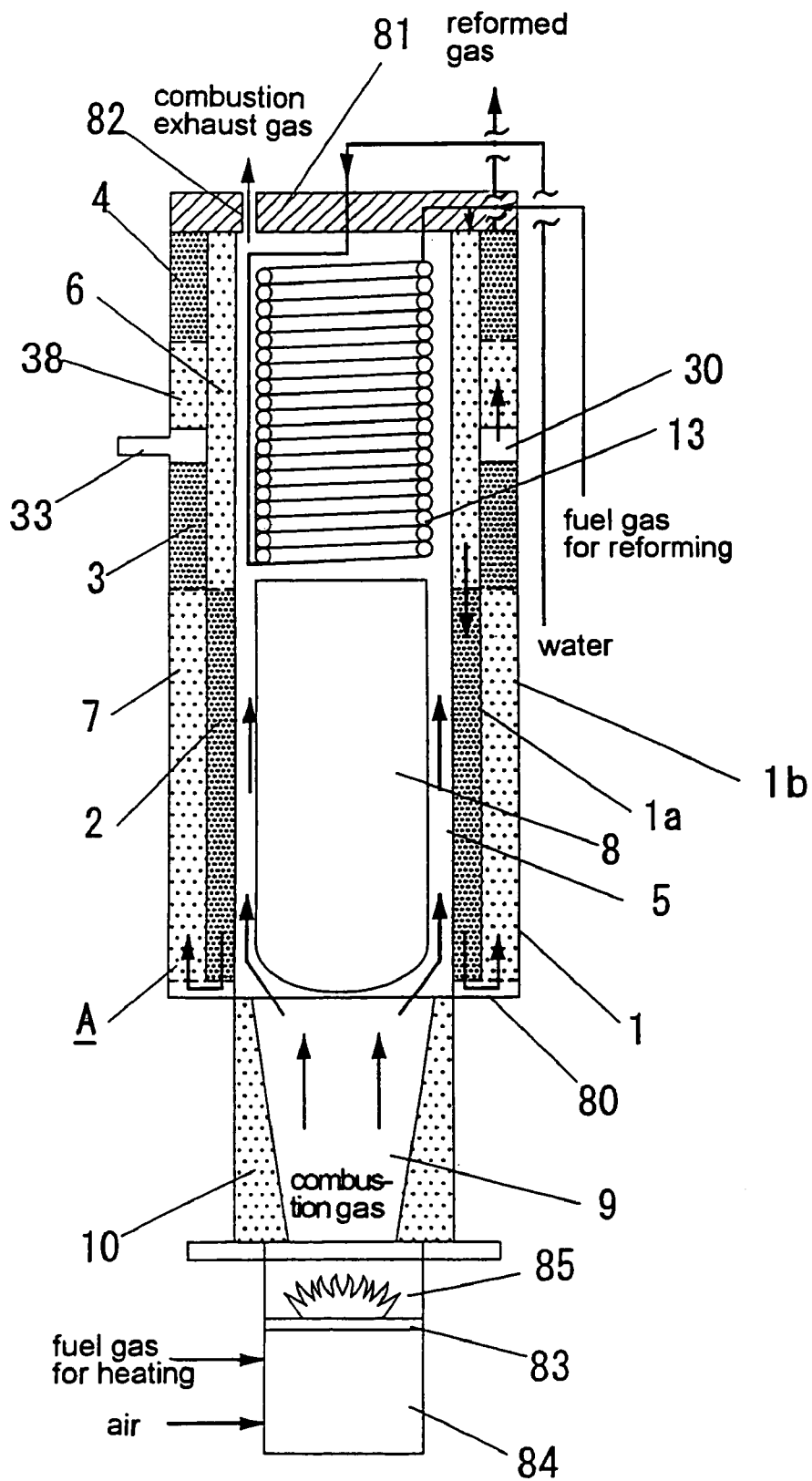
FIG. 7 is a schematic sectional view of an example of the embodiments of the present invention.

FIG. 7 shows an example of a reforming apparatus according to the fourteenth embodiment, in which the water evaporator (13) is arranged in the combustion gas passage (5) so that the evaporator (13) opposes to the shift catalyst section (3) and the CO-selective oxidizing catalyst section (4). In the embodiment shown in FIG. 7, the evaporator (13) is disposed within a region from the lower end of the shift catalyst section (3) to the upper end of the CO-selective oxidizing catalyst section (4). The features of this embodiment except for these points are the same as those shown in FIG. 3. In this regard, the appropriate temperature of the CO-selective oxidizing catalyst section (4) is from about 120 to about 200° C. which is further lower than that of the shift catalyst section (3). Thus, the portion of the second heat-recovering section (6) adjacent to the CO-selective oxidizing catalyst section (4) can be cooled by the evaporator (13), by arranging the evaporator (13) so as to oppose not only the shift catalyst section (3) but also the CO-selective oxidizing catalyst section (4). Thus, it is possible to readily maintain the temperature of the CO-selective oxidizing catalyst section (4) at the above specified suitable temperature.

Figure 8:
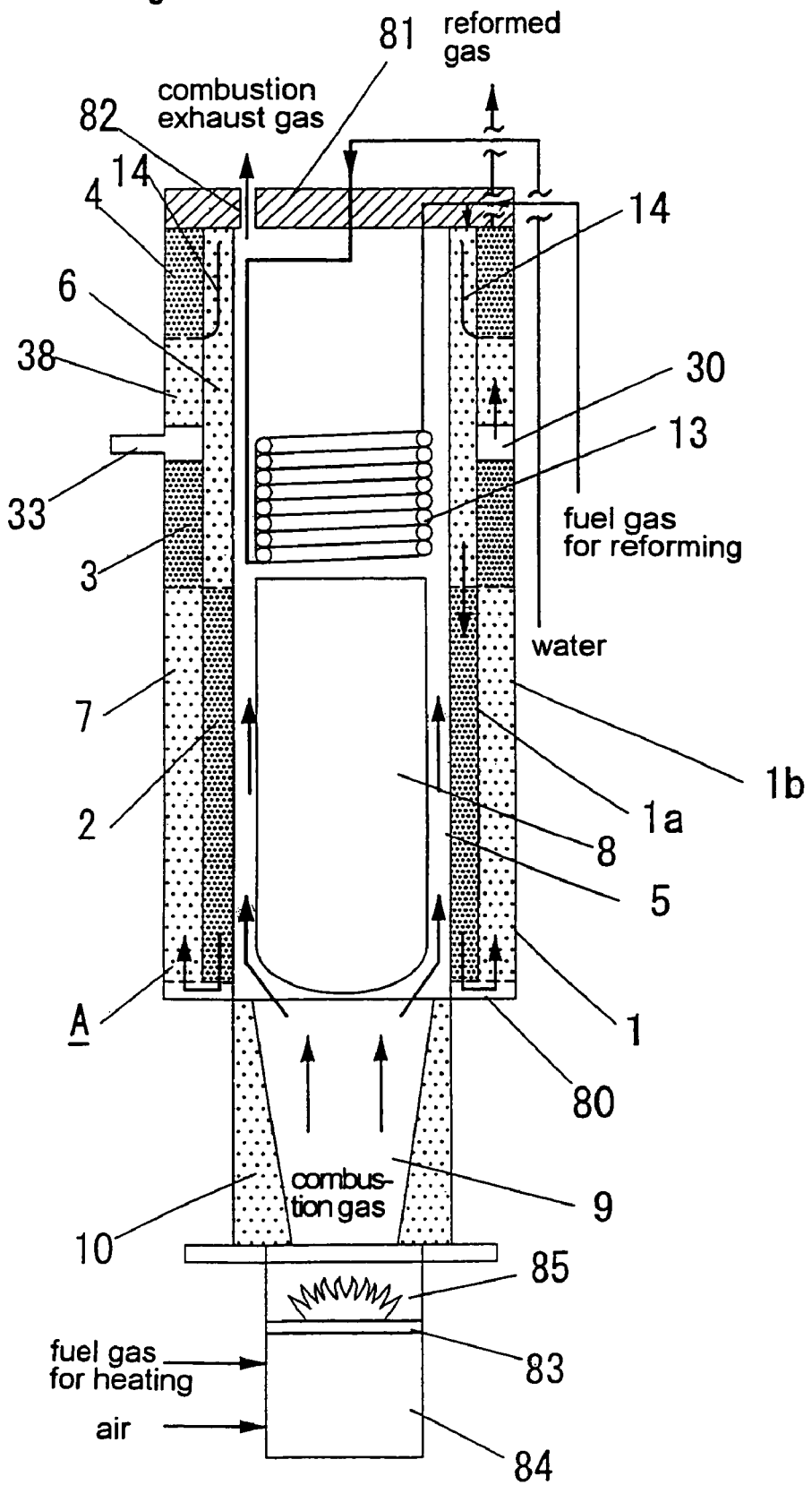
FIG. 8 is a schematic sectional view of an example of the embodiments of the present invention.

FIG. 8 shows an example of a reforming apparatus according to the fifteenth embodiment, in which a member for receiving water droplets from the steam introduced into the second heat-recovering section (6) from the water evaporator (13), i.e., a water droplet-receiving member (14), is provided. In the embodiment shown in FIG. 8, the water droplet-receiving member (14) formed in the form of a channel (or a pocket) opened at its upper end is provided on the upper end of the interior wall of the second heat-recovering section (6) adjacent to the CO-selective oxidizing catalyst section (4), just below a feeding portion at which the steam from the evaporator (13) is fed to the second heat-recovering section (6). This channel-like water-receiving member (14) is formed along the overall peripheral portion of the second heat-recovering section (6). The features of this embodiment except for these points are the same as those shown in FIG. 3 and so on.

When the steam from the evaporator (13) is fed to the second heat-recovering section (6), water droplets other than the steam sometimes enter the second heat-recovering section (6). If such water reaches the reforming catalyst section (2) through the second heat-recovering section (6), the temperature of the reforming catalyst section (2) lowers, and it becomes impossible to maintain the temperature suitable for the reforming reaction. To solve this problem, in the reforming apparatus according to the fifteenth embodiment, the water droplet-receiving member (14) which receives the water droplets from the steam fed from the evaporator (13) is provided in the second heat-recovering section (6) so as to receive the water droplets to thereby prevent the water from reaching the reforming catalyst section (2). The water received in the water droplet-receiving member (14) is heated and evaporated by the combustion gas and also by the transfer of heat from the CO-selective oxidizing catalyst section (4). Thus, the water does not overflow from the water droplet-receiving member (14). While the suitable temperature of the CO-selective oxidizing catalyst section (4) is from about 120 to about 200° C. as mentioned above, the CO-selective oxidizing catalyst section (4) can be cooled by heat of vaporization required while the water in the water droplet-receiving member (14) is evaporating. As a result, the temperature of the CO-selective oxidizing catalyst section (4) can be maintained at a suitable temperature, since the water droplet-receiving member (14) is arranged adjacent to the CO-selective oxidizing catalyst section (4).

Further, in a reforming apparatus according to the ninth embodiment, water-absorbing particles are packed in the second heat-recovering section (6). Thus, the water-absorbing particles absorb water droplets which enter the second heat-recovering section (6) together with the steam, and prevent the water from reaching the reforming catalyst section (2). There is no particular limit in selection of the water-absorbing particles. For example, porous ceramics can be used for such particles. The water absorbed by the water-absorbing particles is heated and evaporated by the heat of the combustion gas and the heat transmitted from the CO-selective oxidizing catalyst section (4). In this regard, as mentioned above, the suitable temperature of the CO-selective oxidizing catalyst section (4) is from about 120 to about 200° C. The heat of vaporization required while the water is evaporating from the water-absorbing particles can cool the CO-selective oxidizing catalyst section (4), when the water-absorbing particles are present adjacent to the CO-selective oxidizing catalyst section (4). Thus, it is possible to maintain the temperature of the CO-selective oxidizing catalyst section (4) at the suitable temperature.

Figure 9:
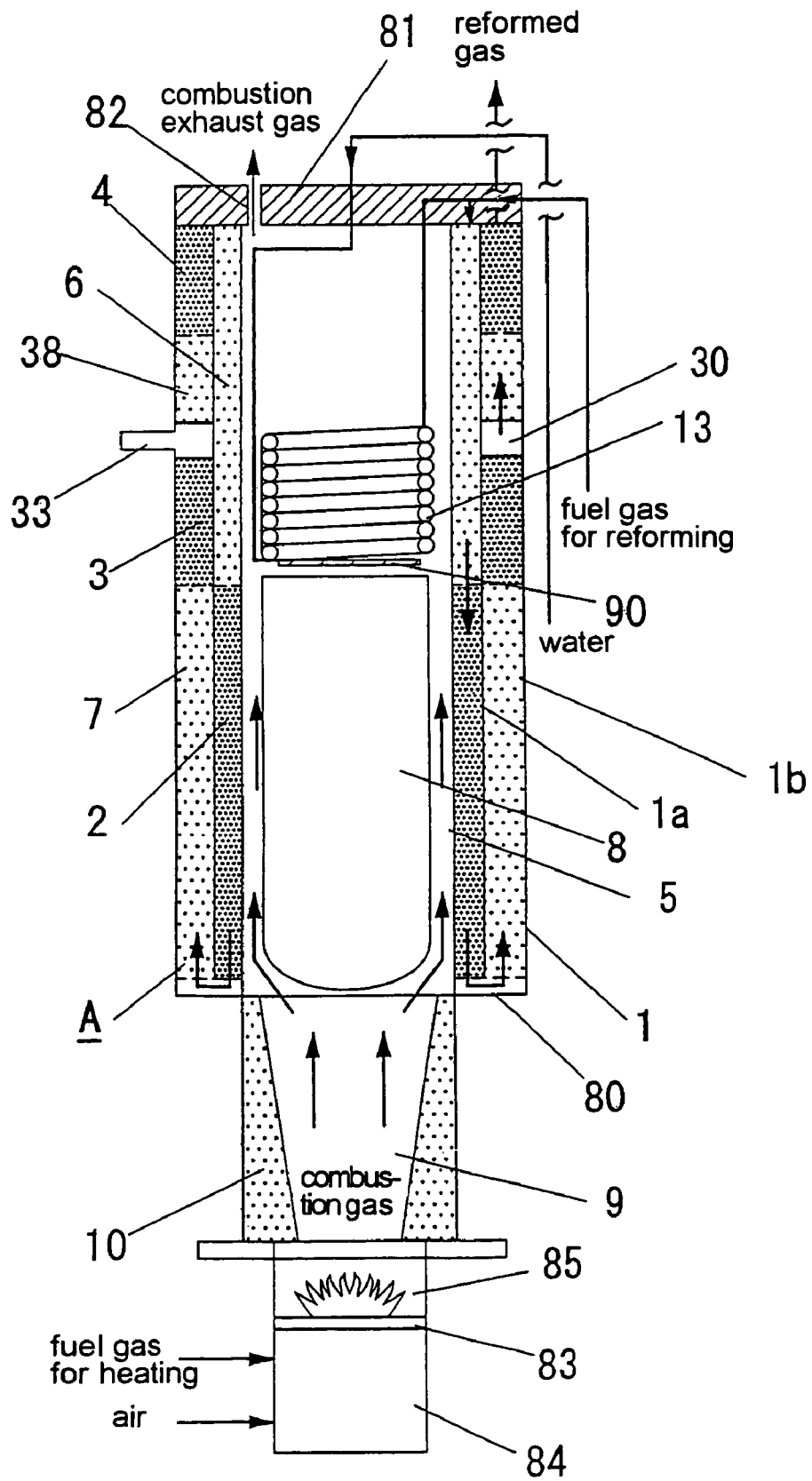
FIG. 9 is a schematic sectional view of an example of the embodiments of the present invention.

FIG. 9 shows an example of a reforming apparatus according to the seventeenth embodiment, in which the evaporator (13) is made of a pipe for allowing water to flow therethrough, a multi-layered cylindrical tubes, or a pipe equipped with heat-radiation fins, or any of other various forms. In view of heat-exchanging efficiency, for example, it is preferable that a pipe for allowing water to pass therethrough is coil-like (spirally) wound to form a cylindrical body or a multi-layered cylindrical pipe body, as in the foregoing embodiments. When the evaporator (13) is formed in a cylindrical body through which water and steam pass along the peripheral portion thereof, and is arranged in the combustion gas passage (5), most of the combustion gas passes through the inner space of the cylindrical body of the evaporator (13), so that an amount of the combustion gas which flows through a space between the evaporator (13) and the second heat-recovering section (6) becomes smaller. As a result, the efficiency of heating the evaporator (13) and the second heat-recovering section (6) becomes poor.

To overcome this problem, in the reforming apparatus according to the seventeenth embodiment, the cylindrical inner surface of the evaporator (13) is closed against the combustion gas flow, to thereby prevent the combustion gas from flowing through the inside of the cylindrical body of the evaporator (13) and to cause the combustion gas to uniformly flow in the gap between the evaporator (13) and the second heat-recovering section (6). In the embodiment shown in FIG. 9, the opening at the lower end of the cylindrical body of the evaporator (13) is closed with a lid plate (90), and thus, the lid plate (90) hinders the combustion gas from passing through the inside of the cylindrical body of the evaporator (13). The features of this embodiment except for these points are the same as those shown in FIG. 3 and so on.

Figure 10:
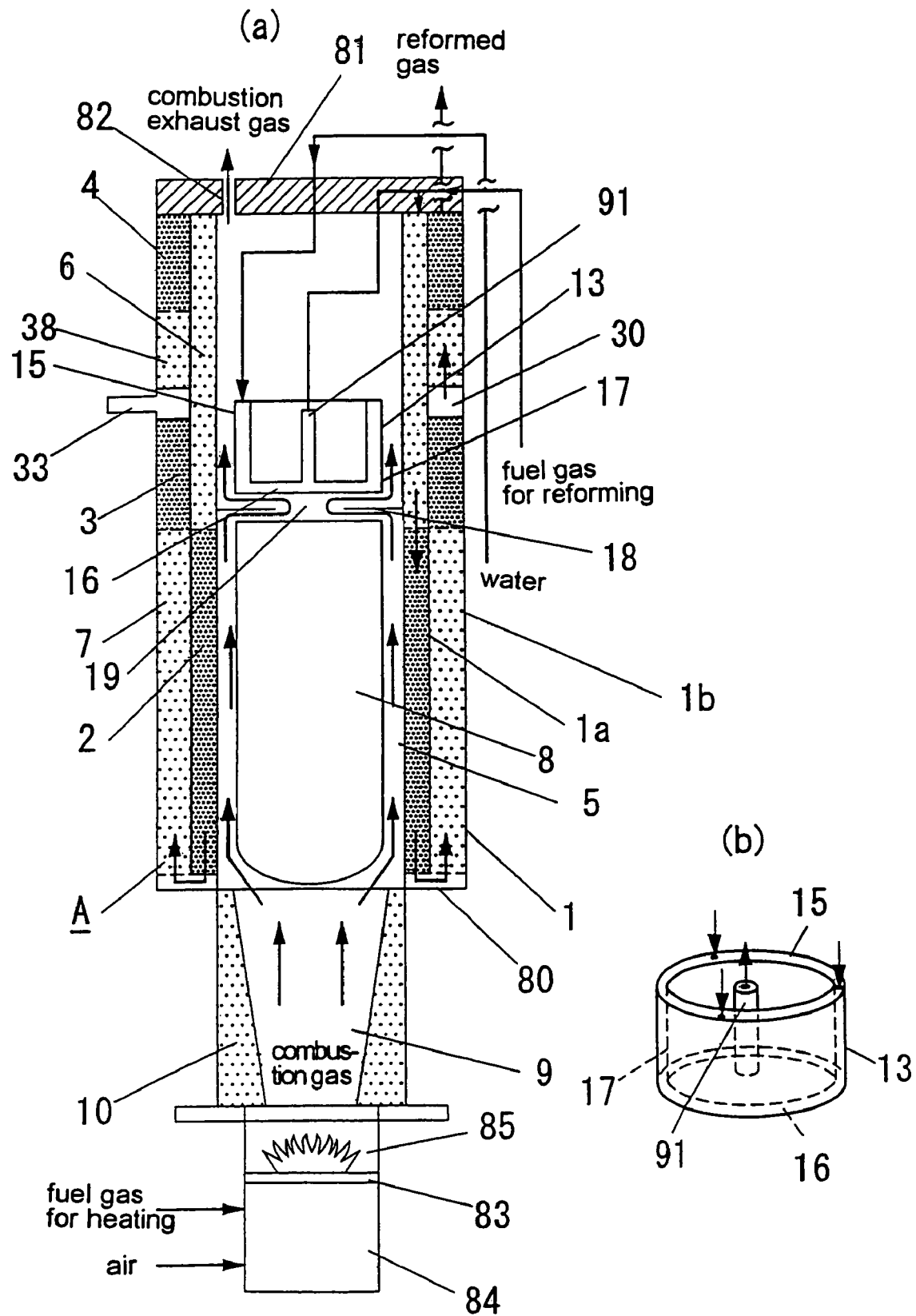

FIG. 10 shows an example of a reforming apparatus according to the eighteenth embodiment, in which the evaporator (13) is formed as a bottomed cylindrical body composed of a cylindrical portion (15) which is hollow inside and a bottom portion (16) which is also hollow inside which closes the opening at the lower end of the cylindrical portion (15). A column like portion (91) which is hollow inside is positioned at the center of the upper surface of the bottom portion (16). The interior of the cylindrical portion (15), the interior of the bottom portion (16) and the interior of the column like portion (91) are integrated together and are communicated with one another to thereby form a heat-exchanging passage (17) through which water and steam are allowed to pass. The evaporator (13) is arranged in the upper side of the combustion gas passage (5) such that the bottom portion (16) of the evaporator (13) is faced to the flowing direction of the combustion gas flow, in other words, that the bottom portion (16) thereof is set down, as shown in FIG. 10. Water is fed into the heat-exchanging passage (17) from a single point or a plurality of points on the upper end of the cylindrical portion (15), as indicated by the arrow notations in FIG. 10(b), and the water fed is heated and evaporated to form steam. The resultant steam leaves from the upper end of the column like portion (91) and is introduced into the second heat-recovering section (6). Further, a passage throttle plate or a baffle plate (18) is arranged under the bottom portion (16) of the evaporator (13) so as to partition the combustion gas passage (5) into the upper portion and the lower portion. A through hole (19) is formed at the central portion of the passage throttle plate (18) so as to generally oppose to the central portion of the bottom portion (16) of the evaporator (13). The features of this embodiment except for these points are the same as those shown in FIG. 3 and so on.

The combustion gas flows through the combustion gas passage (5), the gap between the heat radiant transmitter (8) and the reforming catalyst section (2) and then the through hole (19) of the passage throttle plate (18). The combustion gas then spreads along a lower surface of the bottom portion (16) of the evaporator (13) from the center thereof to the periphery of the surface, and further passes through the gap between the cylindrical portion (15) of the evaporator (13) and the second heat-recovering section (6). Accordingly, the combustion gas flows along a whole of the lower surface of the bottom portion (16) and a whole of the outer peripheral surface of the cylindrical portion (15). Thus, the water in the evaporator (13) can be efficiently heated and evaporated to form steam.

Figure 11:
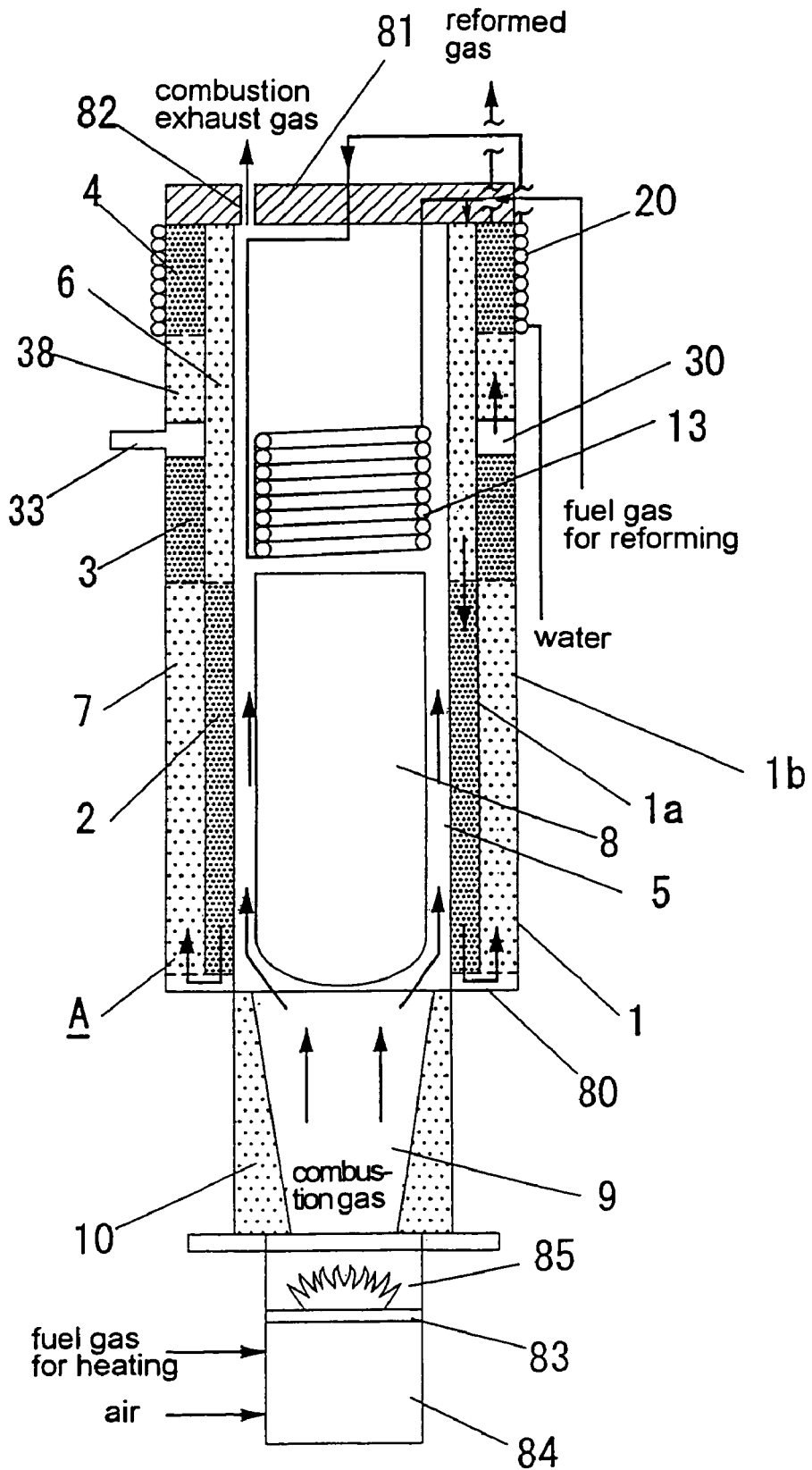
FIG. 11 is a schematic sectional view of an example of the embodiments of the present invention.

FIG. 11 shows an example of a reforming apparatus according to the nineteenth embodiment and the twentieth embodiment, in which a water passage (20) which allows water necessary for a steam reforming reaction to pass therethrough is arranged around the portion adjacent to the CO-selective oxidizing catalyst section (4) of the outer peripheral portion of the second passage (1b). In the embodiment shown in FIG. 11, the water passage (20) is formed by coil-like (or spirally) winding a pipe through which water flows around the outer peripheral portion of the CO-selective oxidizing catalyst section (4). The water is introduced into the water passage (20) from the lower end portion of the water passage. Water having passed through the water passage (20) is fed to the evaporator (13). The features of this embodiment except for these points are the same as those shown in FIG. 3 and so on.

Since the water passage (or the first water passage) (20) is arranged around the outer peripheral portion of the CO-selective oxidizing catalyst section (4) as described above, the CO-selective oxidizing catalyst section (4) can be cooled while the water is passing through the water passage (20). As mentioned above, the suitable temperature of the CO-selective oxidizing catalyst section (4) is from 120 to 200° C. The latent heat upon evaporation of water is large as compared with the sensible heat thereof, and therefore, the internal temperature of the water passage (20) is kept at a constant temperature of about 100° C. even after the water passage (20) has been heated by the reaction heat generated in the CO-selective oxidizing catalyst section (4). Therefore, it becomes easy to maintain the CO-selective oxidizing catalyst section (4) at the suitable temperature. In addition, water is heated to a higher temperature while passing through the water passage (20), and therefore, by feeding such water with the raised temperature to the evaporator (13), the water can be efficiently evaporated in the evaporator (13) to form steam. It is to be noted that the evaporator (13) is located in the combustion gas passage (5) so as to oppose to the shift catalyst section (3), and that the evaporator (13) is heated to a higher temperature than that of the water passage (20) around the outer peripheral portion of the CO-selective oxidizing catalyst section (4). Therefore, it is preferable that water is firstly heated in the water passage (20), and then fed to the evaporator (13) so as to form steam, because this method is effective to efficiently heat water.

Figure 12:
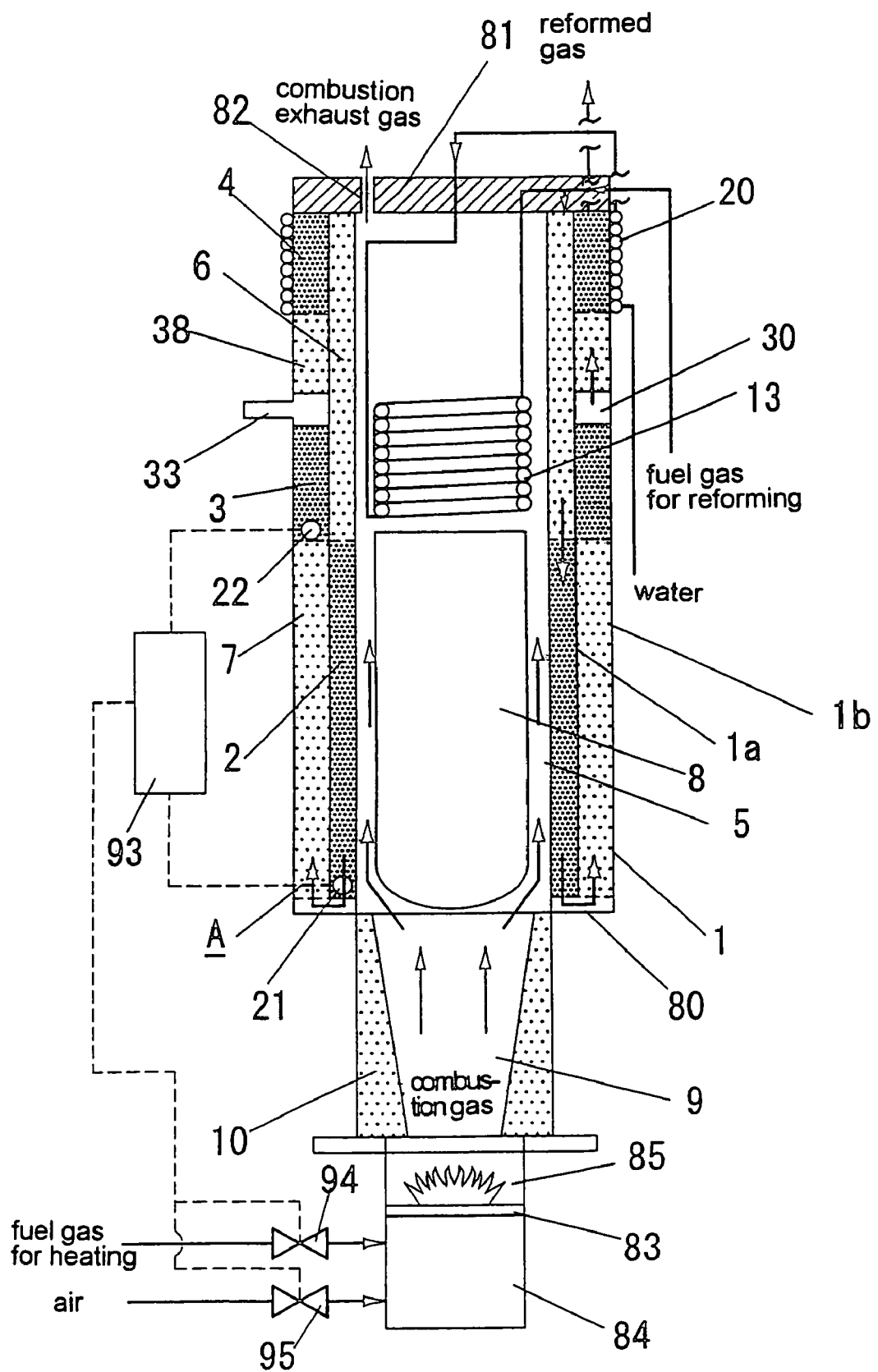
FIG. 12 is a schematic sectional view of an example of the embodiments of the present invention.

FIG. 12 shows an example of a reforming apparatus according to the twenty-first embodiment, in which temperature sensors (21, 22) for measuring the temperatures of the reforming catalyst section (2) and the shift catalyst section (3) are provided in the reforming catalyst section (2) and the shift catalyst section (3), respectively, and an air-fuel ratio for the combustion gas burnt by the burner (83), an amount of the fuel gas to be fed and/or an amount of an air to be fed are controlled based on the temperatures of the reforming catalyst section (2) and the shift catalyst section (3) measured with the temperature sensors (21) and (22). The temperature sensor (21) is disposed in an end portion on the outlet side of the reforming catalyst section (2), and the temperature sensor (22) is disposed in an end portion on the side of the inlet of the shift catalyst section (3). These temperature sensors (21) and (22) are electrically connected to a control circuit unit (93) comprising a CPU, etc., and signals representing the measured temperatures are fed to the control circuit unit. Further, electromagnetic flow rate-controlling valves (94) and (95) are provided in a path for feeding a fuel gas for use in heating to the pre-mixing chamber (84) of the burner (83) and in a path for feeding an air to the pre-mixing chamber (84), respectively. The valves (94) and (95) are electrically connected to the control circuit unit (93) respectively, and control signals are fed to the valves from the circuit unit. The features of this embodiment except for these points are the same as those shown in FIG. 11.

The data of the temperatures of the reforming catalyst section (2) and the shift catalyst section (3) measured with the temperature sensors (21) and (22) are inputted to the control circuit unit (93) of which the memory previously stores data of the suitable temperature ranges of the reforming catalyst section (2) and the shift catalyst section (3).

For example, in case where the temperature of the reforming catalysts section (2) is lower than the suitable temperature thereof and the temperature of the shift catalyst section (3) is higher than the suitable temperature thereof, the control circuit unit (93) controls the valve (94) to open, and simultaneously controls the valve (95) to throttle so as to lower the air-fuel ratio for the combustion gas, so that the temperature of the combustion gas is raised. On the contrary, in case where the temperature of the reforming catalyst section (2) is higher than the suitable temperature thereof and the temperature of the shift catalyst section (3) is lower than the suitable temperature thereof, the control circuit unit (93) controls the valve (94) to throttle and simultaneously controls the valve (95) to open so as to increase the air-fuel ratio for the combustion gas, so that the temperature of the combustion gas is lowered. In a further case where the temperature of the reforming catalyst section (2) is lower than the suitable temperature thereof and also the temperature of the shift catalyst section (3) is lower than the suitable temperature thereof, the control circuit unit (93) controls the valve (94) to open and simultaneously controls the valve (95) to open so as to increase the amount of the combustion gas. On the contrary, in case where the temperature of the reforming catalyst section (2) is higher than the suitable temperature thereof and also the temperature of the shift catalyst section (3) is higher than the suitable temperature thereof, the control circuit unit (93) controls the valve (94) to throttle and simultaneously controls the valve (95) to throttle so as to decrease the amount of the combustion gas.

As described above, the temperatures of the reforming catalyst section (2) and the shift catalyst section (3) are measured with the temperature sensors (21) and (22), and the air-fuel ratio for the combustion gas burnt by the burner (83) is controlled based on the measured temperatures. By doing so, the temperatures of the reforming catalyst section (2) and the shift catalyst section (3) can be maintained within their suitable temperature ranges, respectively.

Figure 13:
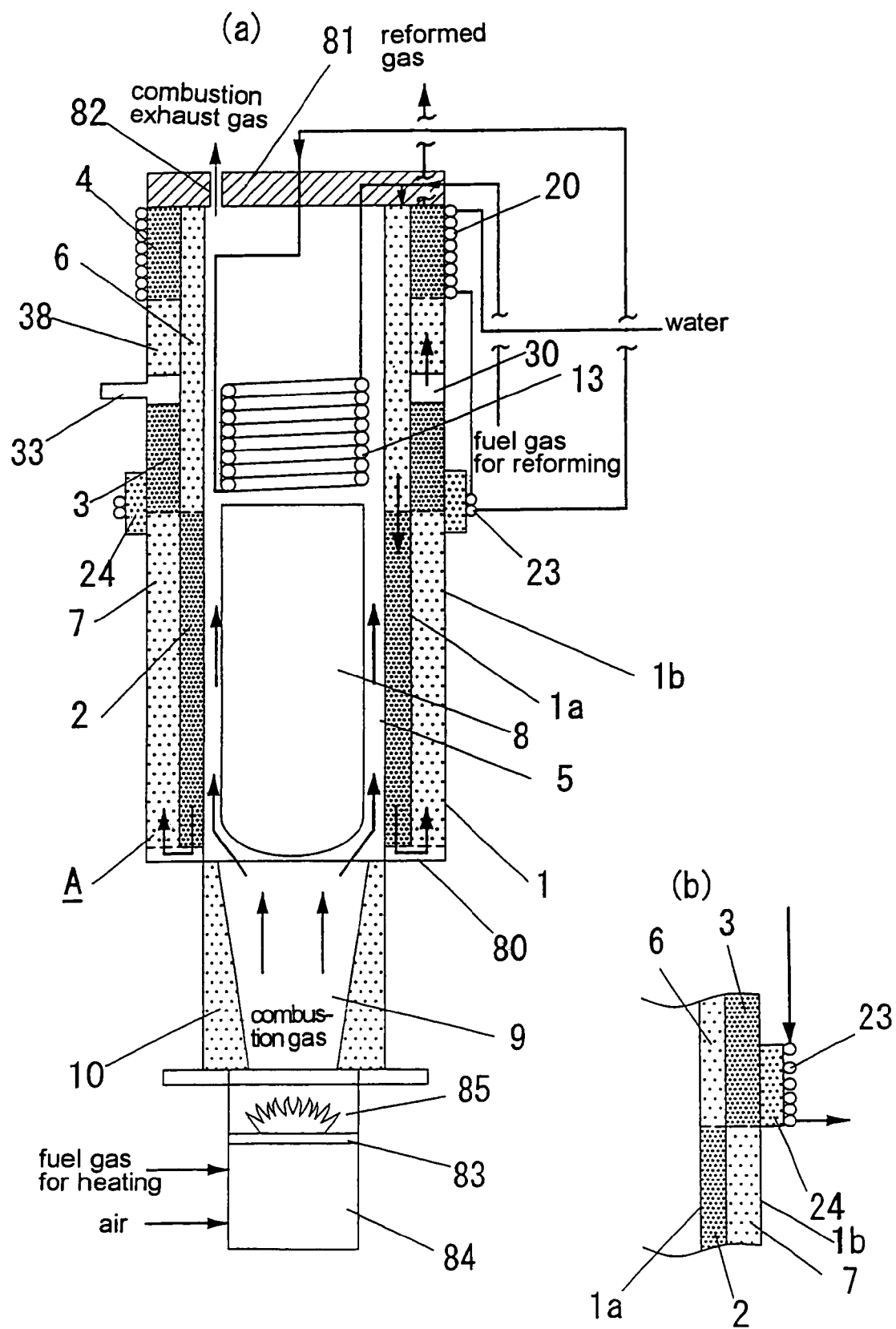

FIG. 13 shows an example of a reforming apparatus according to the twenty-second embodiment and the twenty-third embodiment, in which a second water passage (23) for allowing water necessary for the steam reforming reaction to pass therethrough is arranged on the outer peripheral portion of the shift catalyst section (3). In the embodiment shown in FIG. 13, the second passage (23) is formed by coil-like (or spirally) winding a pipe through which water passes, onto the outer peripheral portion of the shift catalyst section (3). The features of this embodiment except for these points are the same as those shown in FIG. 11.

As mentioned above, the suitable temperature range at the outlet of the reforming catalyst section (2) is from 650 to 750° C., while the suitable temperature range of the shift catalyst section (3) is from 200 to 350° C. Therefore, it is needed that the shift catalyst section (3) is maintained at a fairly low temperature. For the purpose of maintaining the temperatures, for example, it is contemplated that the following method can be considered: a length of the reforming catalyst section (2) and a length of the first heat-recovering section (7) are set longer, and thereby an amount of heat transferred from the first heat-restoring section (7) to the reforming catalyst section (2) is increased, so that the temperature of the reformed gas which passes through the first heat-recovering section (7) is largely lowered. However, this contemplation requires a large reforming apparatus. To overcome this problem, in a reforming apparatus according to the twenty-second embodiment, the second water passage (23) is arranged on the outer peripheral portion of the shift catalyst section (3), and the shift catalyst section (3) is cooled by water which is passing through the second water passage (23), to thereby maintain the temperature of the shift catalyst section (3) within the lower suitable temperature range. This embodiment does not require to make the reforming apparatus larger, and the reforming apparatus can be made compact.

In case where the shift catalyst section (3) is cooled by water which is passing through the second water passage (23) as described above, the difference in temperature between the shift catalyst section and water is too large, considering that the suitable temperature of the shift catalyst section is 200 to 350° C. while the temperature of water is of 100° C. or less. Under such a situation, for example, there is a danger of excessive cooling of the shift catalyst section (3) when the temperature of water passing through the second water passage (23) changes. To solve this problem, in the reforming apparatus according to the twenty-third embodiment, a heat-transfer resistant layer (or a heat-insulating layer) (24) is provided on the outer peripheral portion of the shift catalyst section (3), and the second water passage (23) is wound onto this heat-transfer resistant layer (24). Accordingly, the second water passage (23) is disposed on the outer peripheral portion of the shift catalyst section (3) through the heat-transfer resistant layer (24). By doing so, even if the temperature of water passing through the second water passage (23) changes, the heat insulating layer (24) prevents the direct transfer of a change in the water temperature to the shift catalyst section (3). Therefore, the cooling rate of the shift catalyst section (3) does not sharply change, and the temperature of the shift catalyst section (3) can be maintained within the suitable temperature range.

As mentioned above, the temperature at the outlet of the reforming catalyst section (2) is from 650 to 750° C., while the suitable temperature range of the shift catalyst section (3) is from 200 to 350° C. To maintain such a large difference in temperature, it is needed to efficiently cool the inlet portion of the shift catalyst section (3). For the purpose of efficiently cooling, in the reforming apparatus according to the twenty-fourth embodiment, the second water passage (23) is arranged as follows: as shown in FIG. 13(b), the second water passage (23) is spirally wound onto the outer peripheral portion of the shift catalyst section (3) so that the winding of the second water passage becomes denser on the upstream side along the flow of the gas passing through the shift catalyst section (3), i.e., on the inlet side of the shift catalyst section (3), in other words, that the number of winding turns becomes larger on the inlet side thereof. By doing so, it is possible to efficiently cool the inlet portion of the shift catalyst section (3) with water passing through the second water passage (23), and it becomes easy to maintain the shift catalyst section (3) within the suitable temperature range.

As mentioned above, the suitable temperature range of the shift catalyst section is from 200 to 350° C., while the suitable temperature range of the CO-selective oxidizing catalyst section (4) is from 120 to 200° C. In the reforming apparatus according to the twenty-ninth embodiment, the water passage (20) is arranged as follows: the water passage (20) disposed on the outer peripheral portion of the CO-selective oxidizing catalyst section (4) is connected to the second water passage (23) such that the water passage (20) is located on the side as to the water flow relative to the second water passage (23) on the outer peripheral portion of the shift catalyst section (3). Arranged thus, water having passed through the water passage (20) on the outer peripheral portion of the CO-selective oxidizing section (4) flows through the second water passage (23) on the outer peripheral portion of the shift catalyst section (3) to thereby feed such water to the evaporator (13) from the second water passage (23). In this way, water can be efficiently heated in the water passage (20) and the second water passage (23) to raise the temperature thereof.

Figure 14:
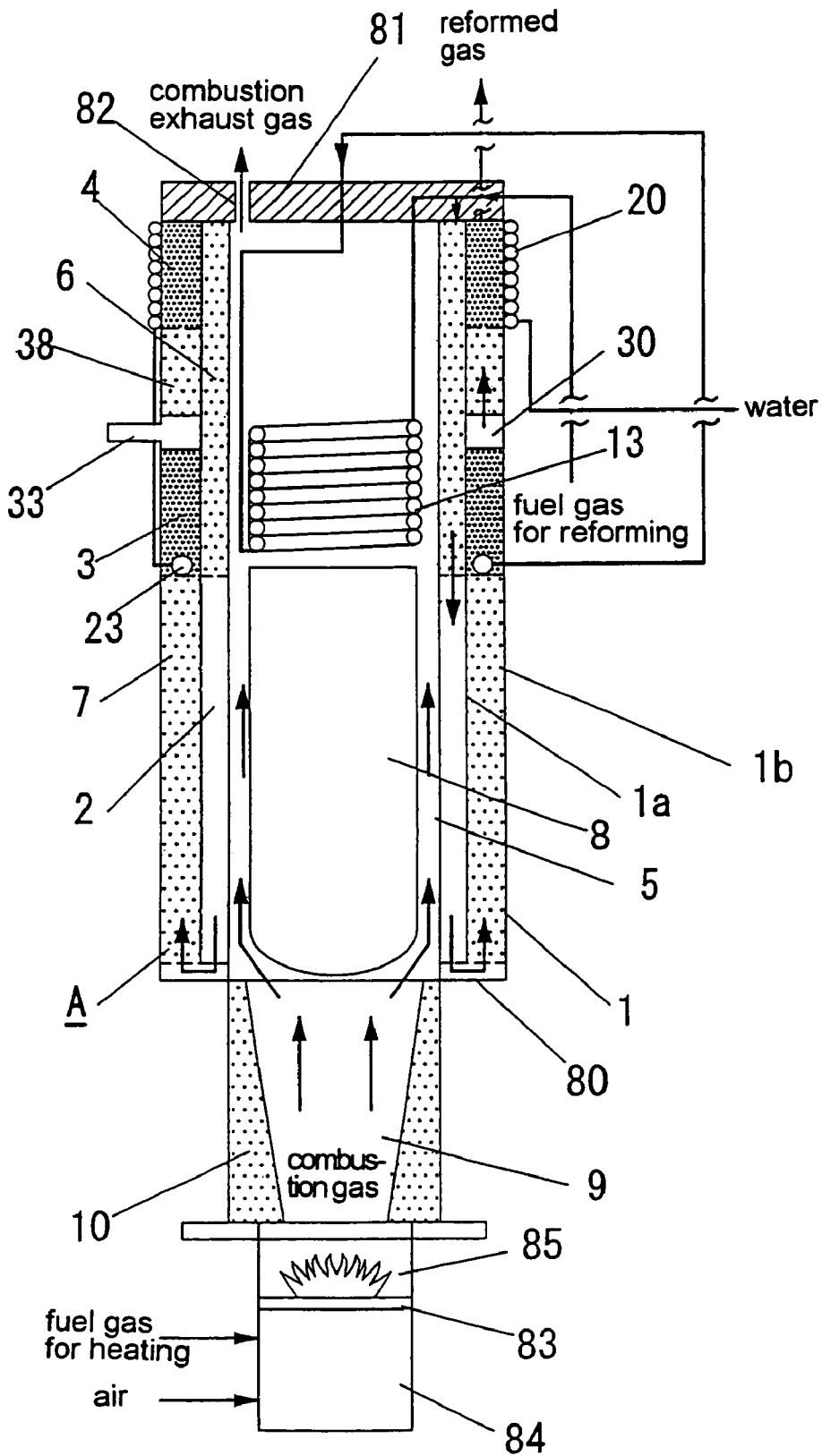
FIG. 14 is a schematic sectional view of an example of the embodiments of the present invention.

FIG. 14 shows an example of a reforming apparatus according to the twenty-fifth embodiment, in which the second water passage (23) is disposed between the first heat-recovering section (7) and the shift catalyst section (3) in the second passage (1b). For example, the second water passage (23) is made of an annulus pipe for allowing water to pass therethrough, and such a second water passage (23) may be arranged around the whole periphery of the second passage (1b). The features of this embodiment except for these points are the same as those shown in FIG. 12 or 13. As mentioned above, the temperature at the outlet of the reforming catalyst section (2) is from 650 to 750° C., while the suitable temperature range of the shift catalyst section (3) is from 200 to 350° C. To maintain such a large difference in temperature, the second water passage (23) is provided between the first heat-recovering section (7) and the shift catalyst section (3), so that the inlet portion of the shift catalyst section (3) is efficiently cooled by the water which is passing through the second water passage (23), whereby the temperature of the shift catalyst section (3) is maintained within the suitable temperature range.

Figure 15:
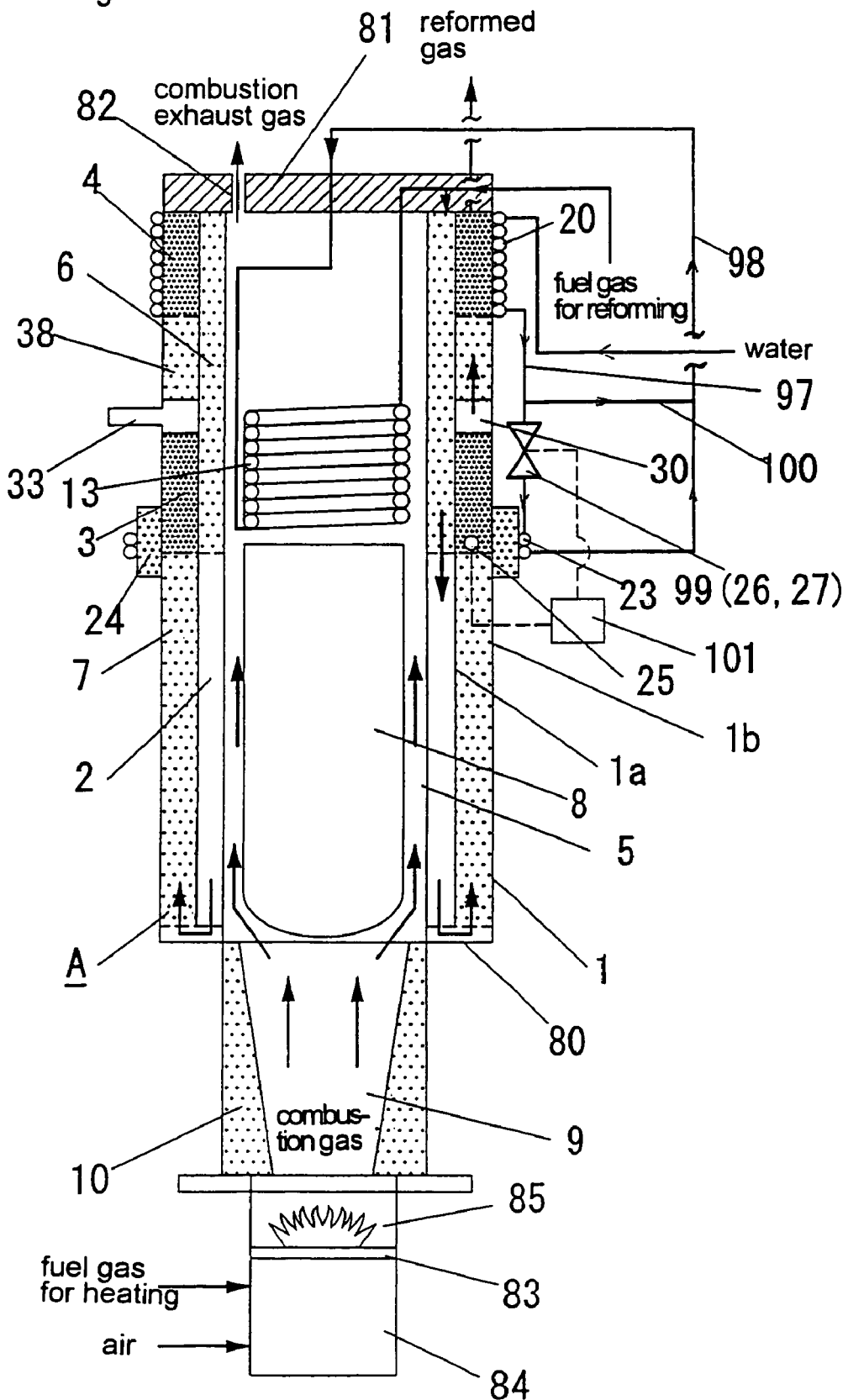
FIG. 15 is a schematic sectional view of an example of the embodiments of the present invention.

FIG. 15 shows an example of a reforming apparatus according to the twenty-sixth embodiment, in which a temperature sensor (25) for measuring the temperature of the shift catalyst section (3) is provided in the shift catalyst section (3). The water passage (20) is disposed on the outer peripheral portion of the CO-selective oxidizing catalyst section (4), and the second water passage (23) is disposed on the outer peripheral portion of the shift catalyst section (3). Water is passed from the water passage (20) to the second water passage (23) through a transit path (97). Water is further passed from the second water passage (23) to the evaporator (13) through a feeding path (98). A water flow-controlling means (99) is connected to the transit path (97). A bypass (100) is branched from the transit path (97) at a position on the side of the water passage (20) relative to the water flow-controlling means (99). This bypass (100) is connected to the feeding path (98). The temperature sensor (25) and the water flow-controlling means (99) are electrically connected to the control circuit unit (101) comprising a CPU, etc. The features of this embodiment except for these points are the same as those shown in FIG. 13.

The data of the temperature of the shift catalyst section (3) measured with the temperature sensor (25) is inputted to the control circuit unit (101). The data of the suitable temperature range of the shift catalyst section (3) are previously stored on the memory of the control circuit unit (101). The water flow rate to the second water passage (23) is controlled by opening or closing the water flow-controlling means (99) in accordance with the temperature of the shift catalyst section (3), so that the cooling of the shift catalyst section (3) by means of the second water passage (23) is controlled, whereby the shift catalyst section (3) is maintained within the suitable temperature range.

In a reforming apparatus according to the twenty-seventh embodiment, a shut-off valve (26) is used as the water flow-controlling means (99). When the temperature of the shift catalyst section (3) measured with the temperature sensor (25) is higher than the suitable temperature, the shut-off valve (26) is opened to allow water to pass through the second water passage (23) to thereby cool the shift catalyst section (3). On the contrary, when the temperature of the shift catalyst section (3) measured with the temperature sensor (25) is lower than the suitable temperature, the shut-off valve (26) is closed to allow water to pass through the bypass (100) and to inhibit water from passing through the second water passage (23), so as not to cool the shift catalyst section (3). In this way, the temperature of the shift catalyst section (3) is maintained within the suitable temperature range by controlling the water flow to the second water passage (23) by means of the shut-off valve (26), thereby controlling the cooling of the shift catalyst section (3) by means of the second water passage (23).

In a reforming apparatus according to the twenty-eighth embodiment, a flow rate control valve (27) is used as the water flow-controlling means (99). When the temperature of the shift catalyst section (3) measured with the temperature sensor (25) is higher than the suitable temperature, an opening ratio of the flow rate control valve (27) is increased to thereby increase an amount of water passing through the second water passage (23), so as to cool the shift catalyst section (3). On the contrary, when the temperature of the shift catalyst section (3) measured with the temperature sensor (25) is lower than the suitable temperature, the flow rate control valve (27) is throttled to thereby increase an amount of water flowing into the bypass (100) and to decrease the water flow rate to the second water passage (27), so that the shift catalyst section (3) is not likely to be cooled. In this way, the temperature of the shift catalyst section (3) is maintained within the suitable temperature range by controlling the water flow rate to the second water passage (23) by means of the flow rate control valve (27), thereby controlling the cooling of the shift catalyst section (3) by means of the second water passage (23).

Figure 16:
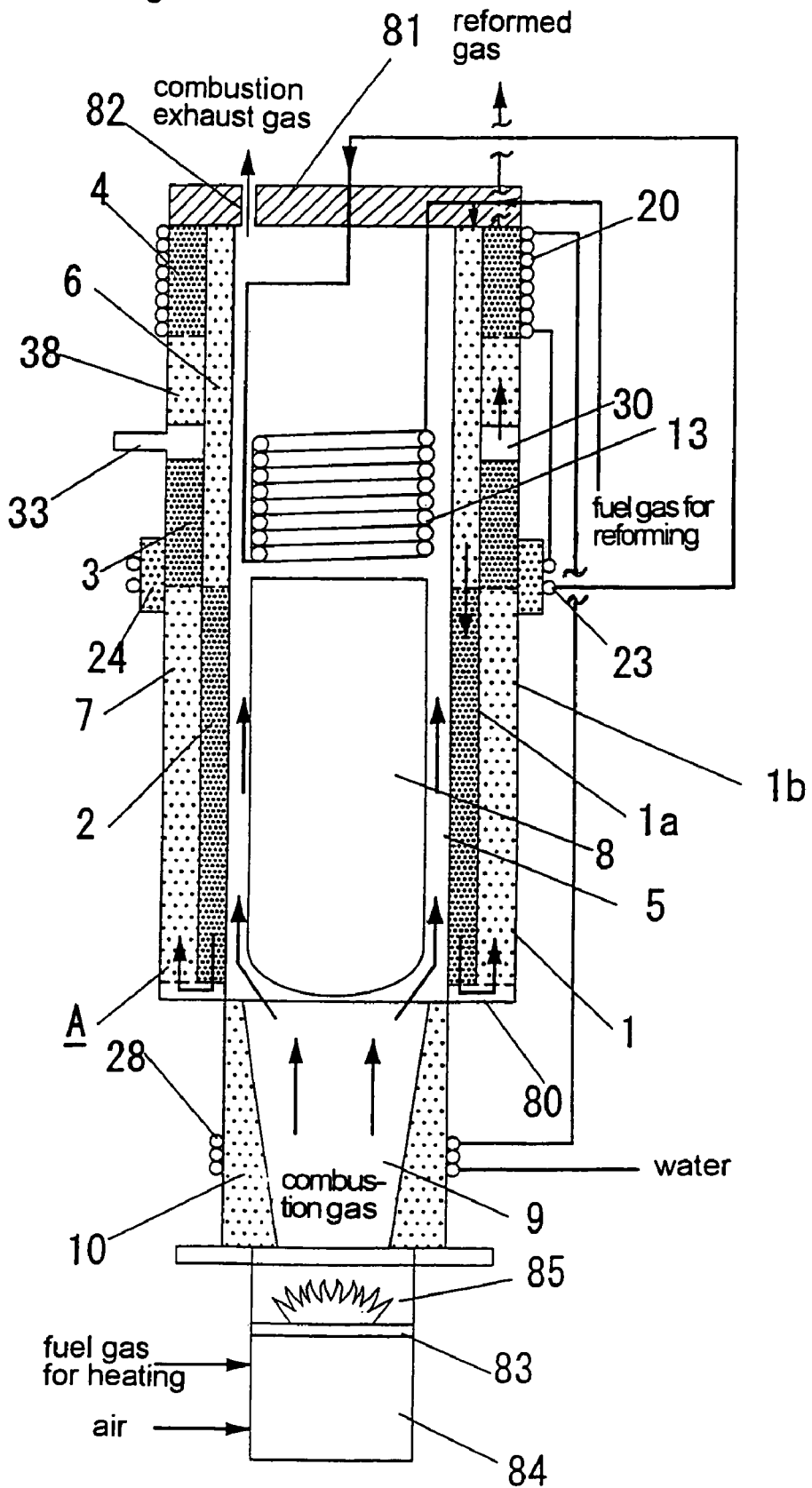
FIG. 16 is a schematic sectional view of an example of the embodiments of the present invention.

FIG. 16 shows an example of a reforming apparatus according to the thirtieth embodiment, in which a third water passage (28) is provided on the outer peripheral portion of the incombustible cylindrical body (10) having the combustion gas-introducing passage (9) formed therein. The third water passage (28) is formed by coil-like (or spirally) winding a pipe for allowing water to pass therethrough, onto the outer peripheral portion of the incombustible cylindrical body (10). Water is introduced into the third water passage (28) from the lower end portion thereof. Water having passed through the third water passage (28) may be fed to either of the water passage (20) disposed on the outer peripheral portion of the CO-selective oxidizing catalyst section (4) or the second water passage (23) disposed on the outer peripheral portion of the shift catalyst section (3). In the embodiment shown in FIG. 16, water having passed through the third water passage (28) is fed to the water passage (20) and allowed to pass therethrough, and the water is further fed from the water passage (20) to the second water passage (23), and then fed to the evaporator (13). The features of this embodiment except for these points are the same as those shown in FIG. 13.

In this way, water can be pre-heated by heat of the combustion gas passing through the combustion gas introducing passage (9) by allowing water to pass through the third water passage (28) disposed on the outer peripheral portion of the combustion gas introducing passage (9). Thus, the temperature of water fed to the water passage (20) on the outer peripheral portion of the CO-selective oxidizing section (4) and/or the second water passage (23) on the outer peripheral portion of the shift catalyst section (3) can be stabilized. The latent heat upon evaporation of water is large as compared with the sensible heat thereof. By heating water to about 100° C. in the third water passage (28), the temperature of water passing through the water passage (20) and/or the second water passage (23) can be kept at a constant temperature of about 100° C. Therefore, the temperatures of the shift catalyst section (3) and/or the CO-selective oxidizing catalyst section (4) are not influenced by a temperature change of water, and thus can be easily maintained at the suitable temperatures.

Figure 17:
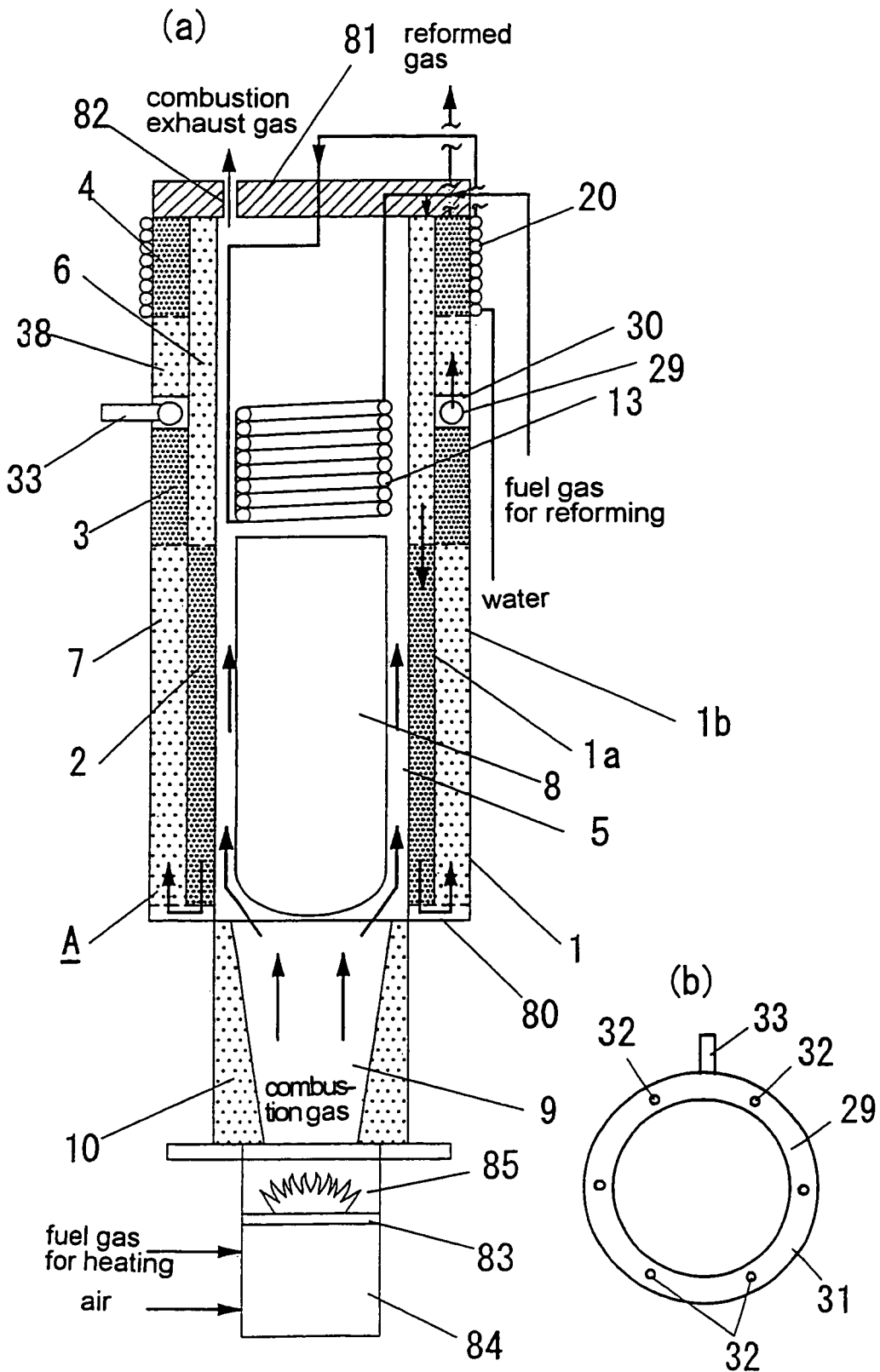

FIG. 17 shows an example of a reforming apparatus according to the thirty-first, thirty-second and thirty-third embodiments. An air-feeding passage (29) for feeding an air from the outside of the second passage (1b) is provided between the shift catalyst section (3) and the CO-selective oxidizing catalyst section (4). In addition, a gas-mixing chamber (30) for mixing the air fed through the air-feeding passage (29) with the reformed gas having passed through the shift catalyst section (3) is provided between the shift catalyst section (3) and the third heat-recovering section (38) in the second passage (1b). In the embodiment shown in FIG. 17, the air-feeding passage (29) is disposed in the gas-mixing chamber (30) between the shift catalyst section (3) and the third heat-recovering section (38). The features of this embodiment except for these points are the same as those shown in FIG. 13.

The air necessary for the CO-selective oxidization is fed through the air-feeding passage (29) into the reformed gas which has been subjected to the shift reaction in the shift catalyst section (3) and outflows therefrom, and the reformed gas and the air are mixed in the gas-mixing chamber (30). While the reformed gas thus mixed with the air is passing through the CO-selective oxidizing catalyst section (4), the CO-selective oxidizing reaction takes place to oxidize and remove carbon monoxide in the reformed gas. In this regard, the gas-mixing chamber (30) is located on the upstream side relative to the third heat-recovering section (38), and therefore, the mixing of the air and the reformed gas in the gas-mixing chamber (30) is accelerated by the pressure loss of the third heat-recovering section (38) which has a large flow resistance. Such mixing is further accelerated by the fluid agitating effect caused while the mixture of the reformed gas and the air is passing through the third heat-recovering section (38). Thus, the reformed gas and the air homogeneously mixed with each other can be uniformly subjected to the CO-selective oxidizing reaction.

In a reforming apparatus according to the thirty-second embodiment, the air-feeding passage (29) is provided by forming a plurality of air-injection holes (32) at a regular interval in the annulus tube (31) which is hollow inside, as shown in FIG. 17(b), and an air is fed to the tube (31) through the air-feeding port (33) connected to the tube (31), and the air is ejected out of the air-injection holes (32). The air-feeding passage (29) comprising this annulus tube (31) is disposed in the gas-mixing chamber (30) around its whole circumference with the air-feeding port (33) projecting outward therefrom. Thus, an air is uniformly fed to the gas-mixing chamber (30) by forming the air-feeding passage (29) of the annulus tube (31) having the plurality of air-injecting holes (32) therein. As a result, the reformed gas and the air can be uniformly mixed in the gas-mixing chamber (30), so that the reformed gas is homogeneously subjected to the CO-selective oxidizing reaction in the CO-selective oxidizing catalyst section (4).

Further, in a reforming apparatus according to the thirty-third embodiment, the air-injecting holes (32) are opened at the lower side of the tube (31) forming the air-feeding passage (29). Thus, the air is injected in a direction opposite to the reformed gas flowing direction. By doing so, the mixing of the reformed gas and the air in the gas-mixing chamber (30) is accelerated to form a homogeneous mixture. As a result, the reformed gas can be homogeneously subjected to the CO-selective oxidizing reaction in the CO-selective oxidizing catalyst section (4).

Figure 18:
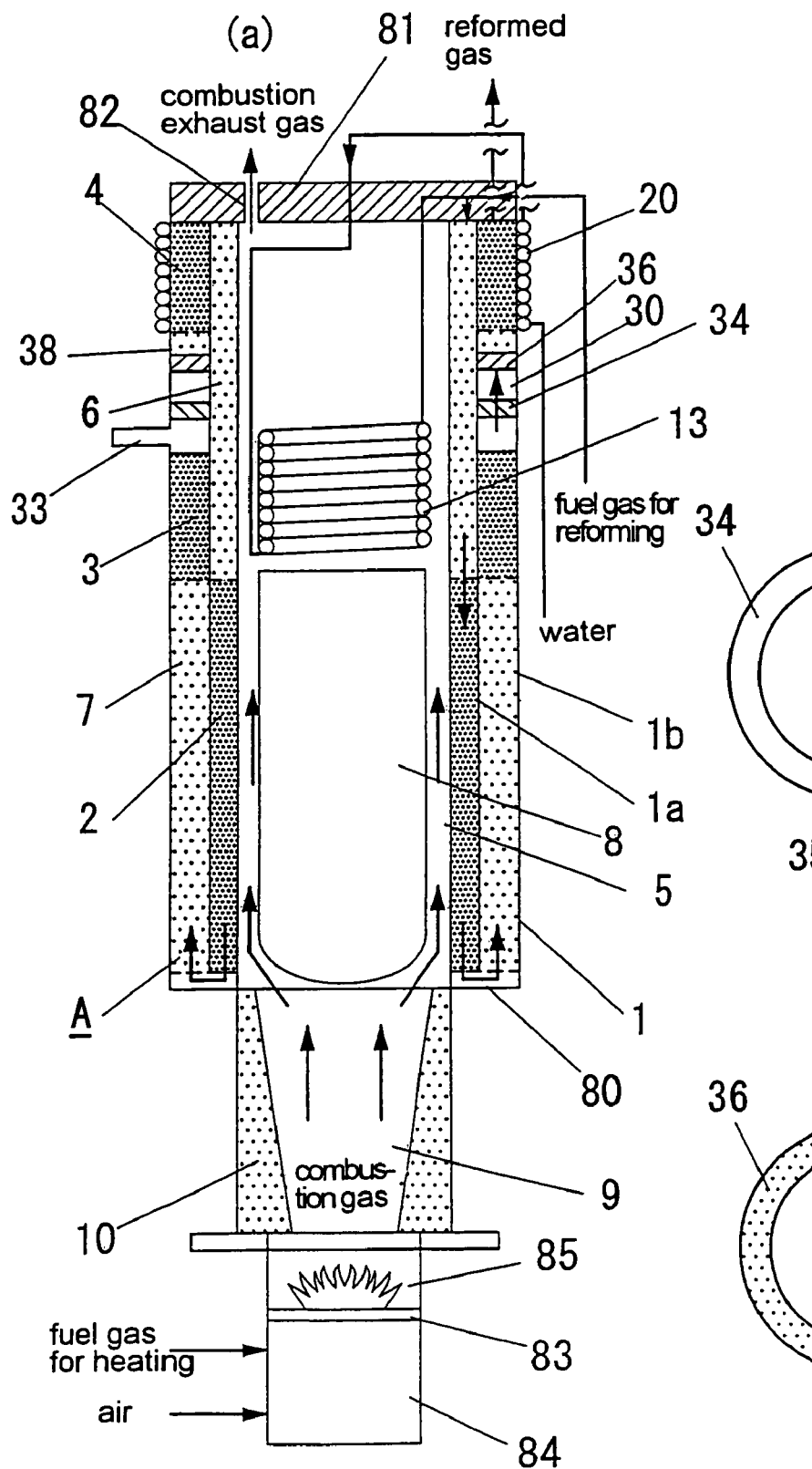

FIG. 18 shows an example of a reforming apparatus according to the thirty-fourth embodiment, the thirty-fifth embodiment and the thirty-sixth embodiment, in which a passage-limiting plate (34) is provided in the gas-mixing chamber (30). The air-feeding port (33) is connected to the gas-mixing chamber (30) on the upstream side of this passage-limiting plate (34) relative to the reformed gas flow, i.e., on the lower side of the passage-limiting plate in the drawing. The passage-limiting plate (34) is to narrow the passage through which the reformed gas flows within the gas-mixing chamber (30). As shown in FIG. 18(b), a gas-passing hole (35) is formed at a single position of the passage-limiting plate (34) made of an annular plate, and the passage-limiting plate (34) is disposed to partition the gas-mixing chamber (30) into the upper side portion and the lower side portion.

When the reformed gas having passed through the shift catalyst section (3) and the air fed through the air-feeding port (33) flow into the space under the passage-limiting plate (34) in the gas-mixing chamber (30), the reformed gas and the air pass through the gas-passing hole (35) of the passage-limiting plate (34) and flow into and spread in the space above the passage-limiting plate (34). As a result, the mixing of the reformed gas and the air is accelerated while they are gathering and spreading. Thus, it is possible to homogeneously mix the reformed gas and the air with a simple structure, and to homogeneously subject the reformed gas to the CO-selective oxidizing reaction in the CO-selective oxidizing catalyst section (4).

In a reforming apparatus according to the thirty-fifth embodiment, when the gas-passing hole (35) is formed at a single point of the passage-limiting plate (34) and the passage-limiting plate (34) is disposed in the gas-mixing chamber (30) so as to partition the chamber into the upper side portion and the lower side portion, the gas-passing hole (35) is located at a position which is farthest from the air-feeding port (33) connected to the gas-mixing chamber (30). Specifically, the passage-limiting plate (34) is disposed such that the gas-feeding port (33) is the remotest from the gas-passing hole (35) on the circumference of the gas-mixing chamber (30). By disposing the air-feeding port (33) and the gas-passing port (35) as described above, the reformed gas is well mixed with the air in the space under the passage-limiting plate (34) is further well mixed when passing through the gas-passing hole (35) of the passage-limiting plate (34), so that the reformed gas and the air are further better mixed. Thus, the reformed gas can be more homogeneously mixed with the air, and the mixture is homogeneously subjected to the CO-selective oxidizing reaction in the CO-selective oxidizing catalyst section (4).

In a reforming apparatus according to the thirty-sixth embodiment, a passage-resistant member (36) is provided between the gas-mixing chamber (30) and the CO-selective oxidizing catalyst section (4). As the passage-resistant member (36), a filler material such as particles or the like can be used. In another mode, an annular porous plate as shown in FIG. 18(*c*) (e.g. a mesh, a punched metal or the like) can be used. The passage-resistant member (36) can be provided by disposing the above annular porous plate so as to fully partition the gas-mixing chamber (30) from the CO-selective oxidizing catalyst section (4). By doing so, the reformed gas and the air can be uniformly distributed over the whole periphery of the gas-mixing chamber (30), so that the reformed gas and the air can be homogeneously mixed. Thus, the reformed gas can be homogeneously subjected to the CO-selective oxidizing reaction in the CO-selective oxidizing catalyst section (4). To uniformly distribute the reformed gas and the air over the whole periphery of the gas-mixing chamber (30), it is desirable that a ratio of a pressure loss across the passage-resistant member (36) (based on a pressure loss found when the chamber is empty) is 20 or more. If the pressure loss ratio is less than 20, there is a danger of causing a fluctuation in the distribution of the reformed gas and the air. The upper limit of the pressure loss is not particularly restricted. However, it is preferable that the pressure loss does not exceed 200, because, if the ratio of the pressure loss is so high, the passage of the reformed gas and the air becomes poor.

Figure 19:
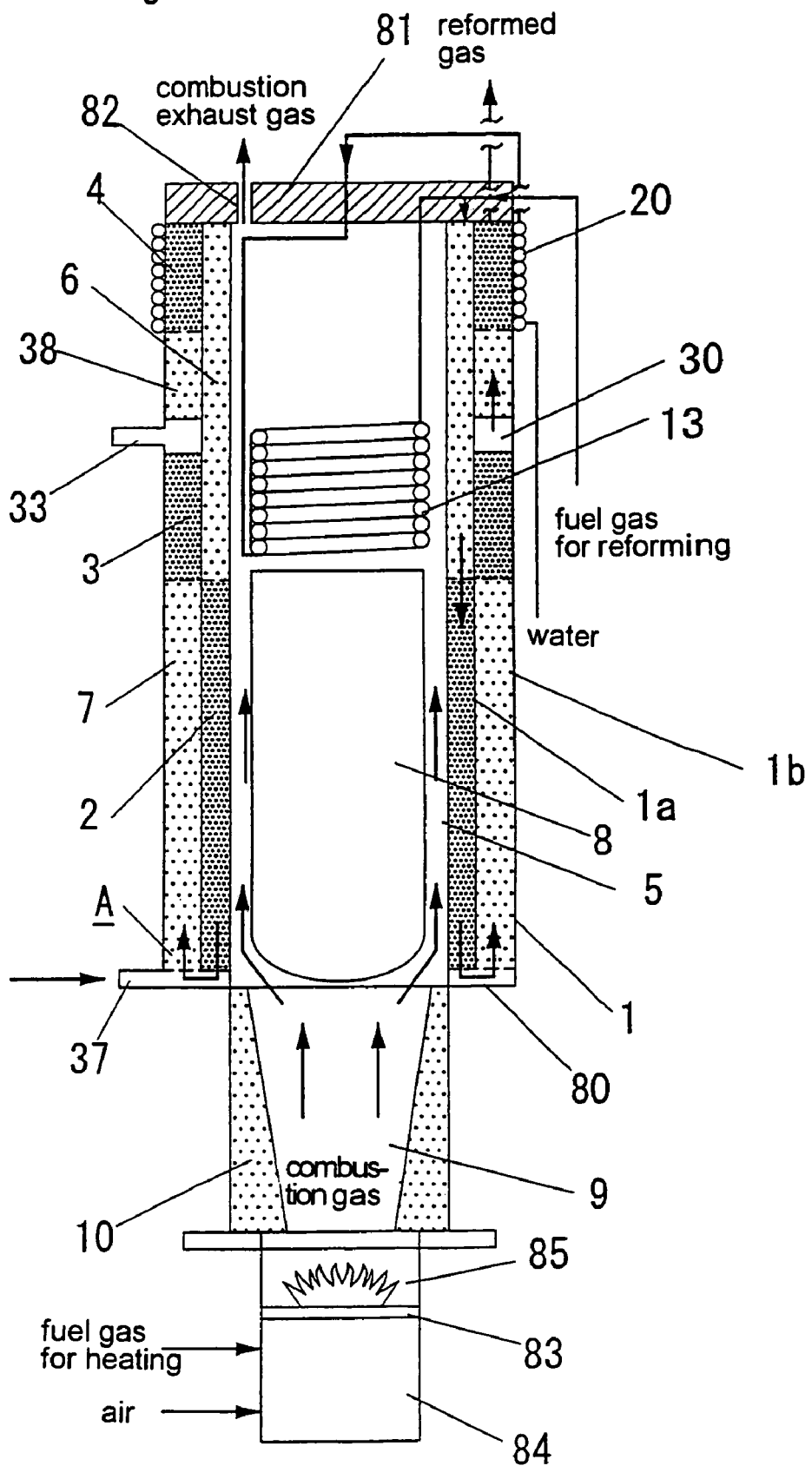
FIG. 19 is a schematic sectional view of an example of the embodiments of the present invention.
Figure 20:
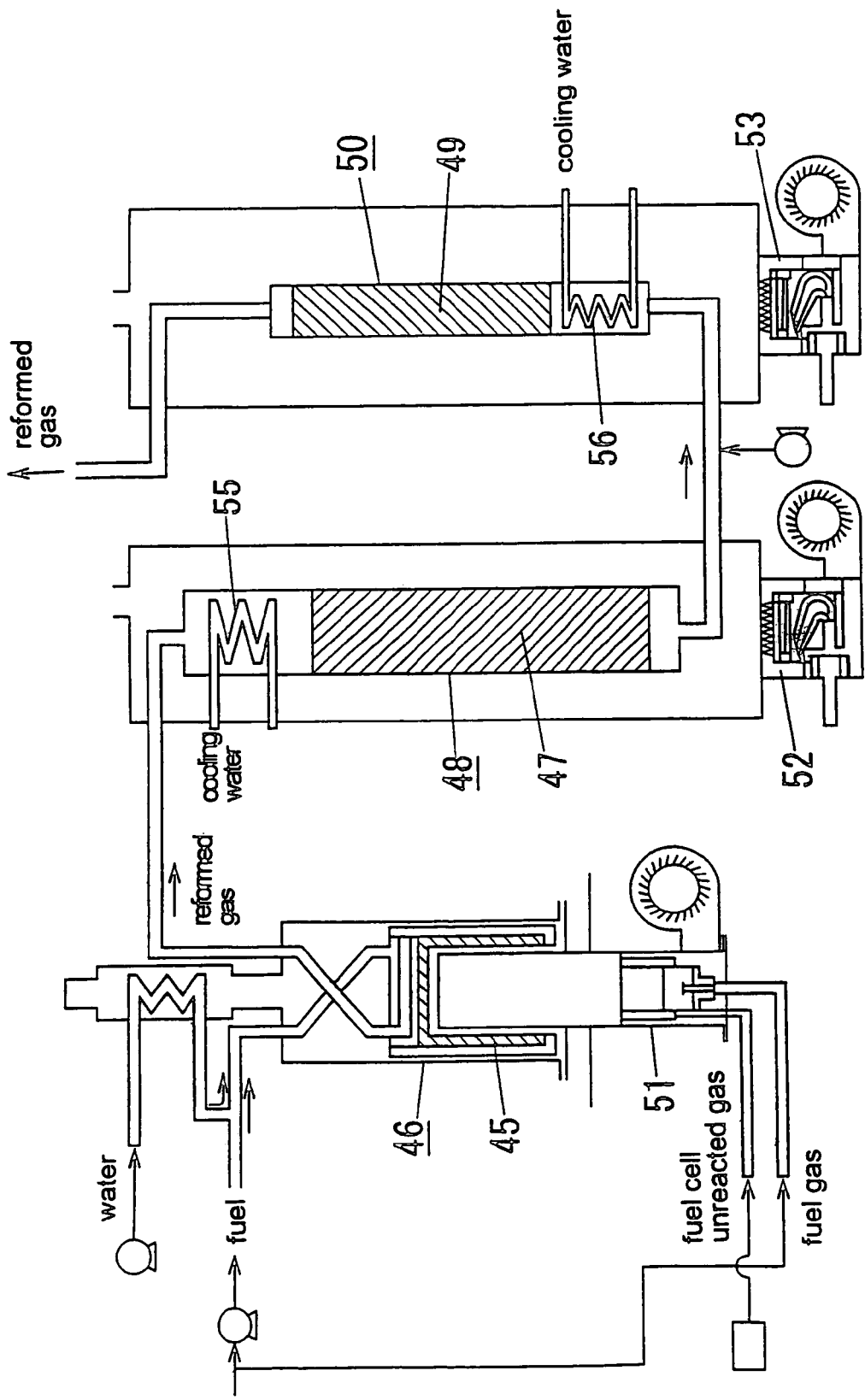
FIG. 20 is a schematic sectional view of an example of the prior art.
Figure 21:
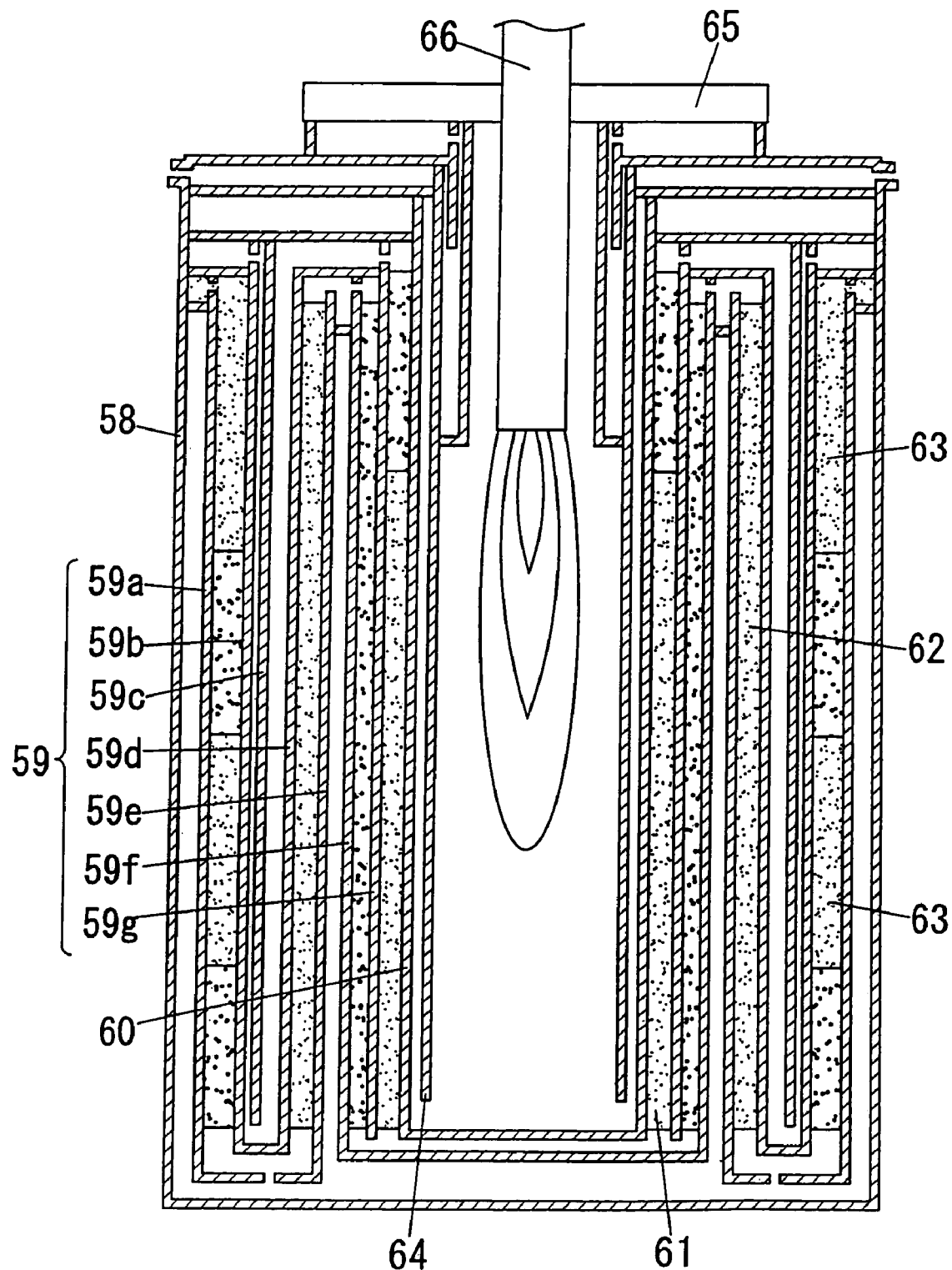
FIG. 21 is a schematic sectional view of an example of the prior art.
Figure 22:
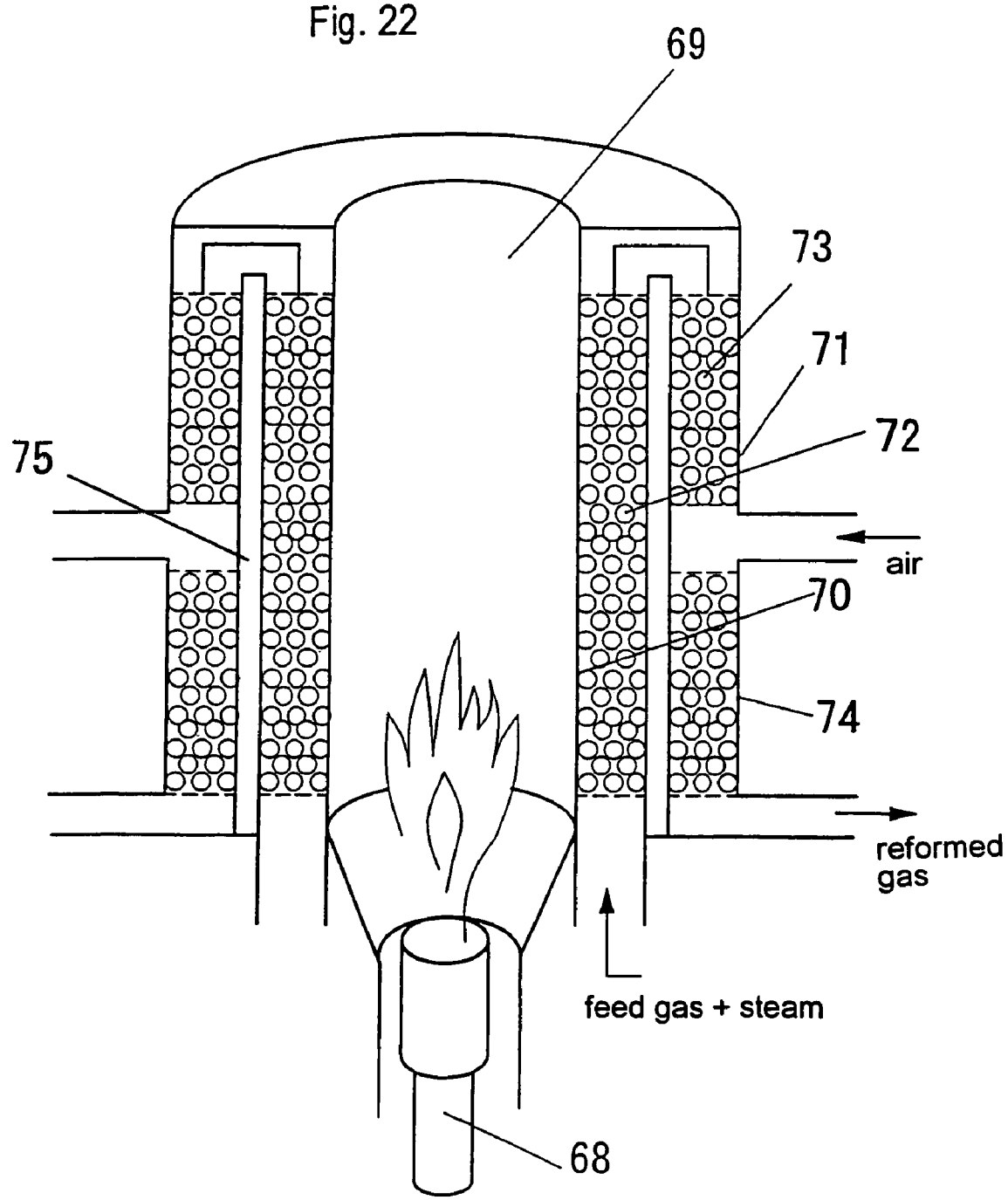
FIG. 22 is a schematic sectional view of an example of the prior art.

FIG. 19 shows an example of a reforming apparatus according to the thirty-seventh embodiment, in which a second air-feeding port (37) is connected to the reformed gas-producing passage (1) between the reforming catalyst section (2) and the shift catalyst section (3). When the operation of this reforming apparatus is started, an external air is fed to the shift catalyst section (3) through the second air-feeding port (37). By doing so, the air and the reformed gas react with each other to generate heat in the shift catalyst section (3), and this heat raises the temperature of the shift catalyst section (3) to the suitable temperature in a short time. As a result, quick start of the operation becomes possible. Therefore, the feeding of the air through the second air-feeding port has to be done only when the operation is started. In this case, to avoid the deterioration of the shift catalyst by the reaction of the air and the reformed gas, it is preferable to use a known noble metal catalyst as the shift catalyst.

A method of operating the reforming apparatus according to the thirty-eighth embodiment of the present invention is characterized in that when the reforming apparatus as described above is operated, a large amount of steam is formed by heating the evaporator (13) to 100° C. or higher is used to purge the reformed gas in the reformed gas-producing passage (1) upon stopping the operation.

When the operation of the fuel cell system is stopped, it is needed to purge the combustible reformed gases which remains in the reformed gas-producing passage (1), the stack of the fuel cell (86) and the conduits. To purge the reformed gas, an inert gas such as nitrogen gas or the like is charged in the reformed gas-producing passage (1), the stack of the fuel cell (86) and the conduits therebetween to thereby send out reformed gas from the stack of the fuel cell (86) to the burner (83) as shown in FIG. 2. However, it is needed to feed the nitrogen gas or the like from a bomb or the like, which makes the fuel cell system larger. Due to this problem, the fuel cell has not been widely used.

To overcome this problem, the method of operating the reforming apparatus according to the thirty-eighth embodiment, feeding of water to the evaporator (13) and the burning at the burner (83) are continued even after the feeding of the fuel gas for reforming is stopped for stopping the operation. By doing so, the temperature of the heated evaporator (13) is set at 100° C. or higher so as to form a large amount of steam. Thus formed large amount of steam is passed into the reformed gas-producing passage (1), the stack of the fuel cell (86) and the conduits to purge the reformed gases which remains therein. In the reforming apparatus according to the present invention, the evaporator (13) is located in the combustion gas passage (5) through which the combustion gas from the burner (83) flows, and therefore, a large amount of steam can be formed in the evaporator (13), which can be used as a gas for purging the reformed gas. Therefore, there is no need to install a bomb or the like, which is needed when the inert gas such a nitrogen gas or the like is used as a purging gas.

After the reformed gas has been purged by the steam formed in the evaporator (13), feeding of water is stopped, and then the evaporator (13) is heated at 100° C. or higher for a while so as to fully evaporate off water in the evaporator (13). By removing water in the evaporator (13) in this way, such a disadvantage can be eliminated that water remaining in the evaporator (13) is frozen while the reforming apparatus is in an unoperated condition. Although an upper limit of the heating temperature to which the evaporator (13) is heated is not particularly limited herein, it is possible to the evaporator up to about 500° C. In this regard, it is preferable to set the heating temperature to be heated at 200° C. or lower, because heat loss becomes larger when it exceeds 200° C.

A method of operating the reforming apparatus of the present invention according to the thirty-ninth embodiment is characterized in that when the foregoing reforming apparatus as described above is operated, water in a liquid state is fed to the reforming catalyst section (2) before the introduction of the fuel gas into the reformed gas-producing passage (1), and then the water in the reforming catalyst section (2) is heated by the heat from the combustion gas passage (5) and the resultant steam is used to heat the shift catalyst section (3) and the CO-selective oxidizing catalyst section (4).

When the burner (83) is ignited to start the operation of the reforming apparatus, the reforming catalyst section (2) is directly heated by the combustion gas since the reforming catalyst section (2) faces to the combustion gas passage (5), so that the temperature of the reforming catalyst section (2) reaches the suitable temperature in a short time. However, the shift catalyst section (3) and the CO-selective oxidizing catalyst section (4) are heated by the heat retained in the reformed gas in the reforming catalyst section (2) and indirectly by the heat of the combustion gas which is transferred through the second heat-recovering section (6), and therefore a longer time is required for the shift catalyst section (3) and the CO-selective oxidizing catalyst section (4) to reach the suitable temperatures. Since an amount of heat retained by the reformed gas is particularly small, the heating effect by the reformed gas is poor.

In the method of operating the reforming apparatus of the present invention according to the thirty-ninth embodiment, at the start of the operation of the reforming apparatus, water in a liquid phase is fed to the reforming catalyst section (2) before the introduction of a fuel gas to be reformed. The water fed to the reforming catalyst section (2) is directly heated and vaporized by the combustion gas in the reforming catalyst section (2), and further fed to the shift catalyst section (3) and the CO-selective oxidizing catalyst section (4). In this regard, it is possible to heat the shift catalyst section (3) and the CO-selective oxidizing catalyst section (4) in a short time because of the large latent heat of the water, so that the shift catalyst section (3) and the CO-selective oxidizing catalyst section (4) can be heated to the suitable temperatures in a short time. Thus, the operation of the apparatus can be quickly started. In this connection, feeding of the water in the liquid state to the reforming catalyst section (2) may be done by providing the reforming catalyst section (2) with a water-feeding port. In another mode, feeding of the water in the liquid state may be done through the evaporator (13).

In the foregoing reforming apparatus of the present invention, for example, the reformed gas-producing passage (1) comprises the outer cylindrical body (100), the inner cylindrical body (102) and the cylindrical partition wall (104), and the communicating portion (80) between the first passage (1a) and the second passage (1b) may be formed by welding the annular flat plate (106) to the end portion (108) of the inner cylindrical body and the end portion (110) of the outer cylindrical body so as to connect both end portions to each other as shown in FIG. 1 In case where the communication portion (80) is formed by welding, the tip of the end portion (108) of the inner cylindrical body and the tip of the end portion (110) of the outer cylindrical body are the welded portions. A thermal stress particularly concentrates on the welded portion (114) of the end portion (108) of the inner cylindrical body because of an influence of a high temperature combustion gas. In the reforming apparatus of the present invention, it is preferable that the end portion (108) of the inner cylindrical body (102) is curved and extended outwardly so as to avoid such an influence of the thermal stress, and it is more preferable that such a curved end portion is jointed to the end portion (110) of the outer cylindrical body to form the communicating portion.

Figure 23:
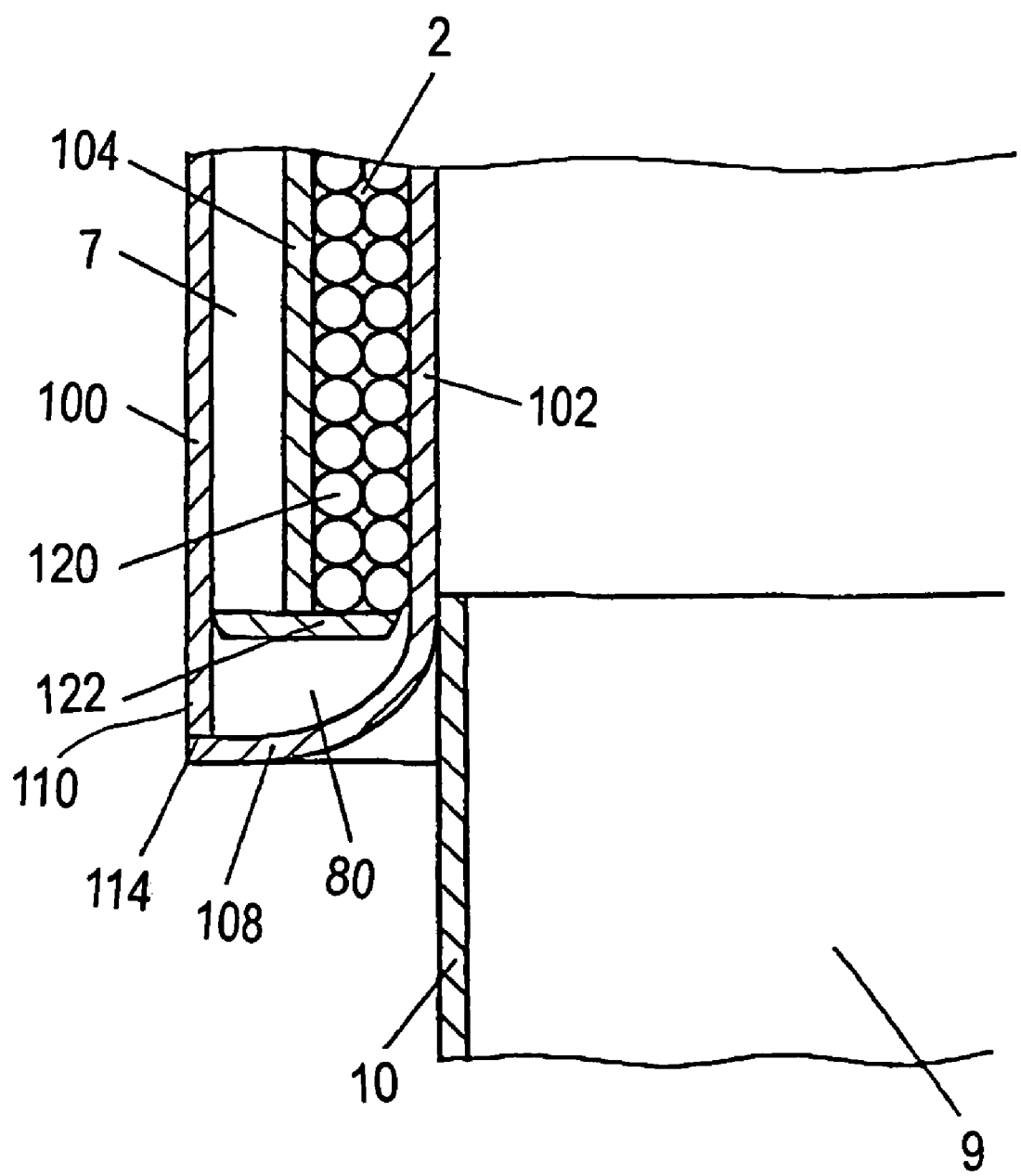
FIG. 23 is a schematic sectional view of an example of the embodiments of the present invention.

FIG. 23 shows an enlarged schematic drawing of such communicating portion (80). As shown therein, the end portion (108) of the inner cylindrical body (102) is formed as an extension which is curved and extended outwardly, and the tip of the extension is connected to the tip of the end portion (110) of the outer cylindrical body (100) by the welded portion (114) to thereby form the communicating portion (80). As is understood from FIG. 23, the welded portion (114) is shifted outwardly and becomes remote from the high temperature combustion gas by outwardly curving and extending the end portion (108) of the inner cylindrical body. As a result, the temperature of the welded portion (114) is not raised so high, and the effect of the thermal stress is suppressed. The connection between the end portion (108) and the end portion (110) may be done by any of appropriate manners such as butt welding, lap welding or the like. The shape of the curved portion of the end portion (108) of the inner cylindrical body may be any appropriate one, and it may extend to form a shape of a part of a circle, an ellipse or the like (for example, a quarter thereof as shown in FIG. 23, or a half thereof).

In the embodiment shown in FIG. 23, the incombustible cylindrical body (10) is connected to the inner cylindrical body (102) by being fitted therein. Also, FIG. 23 shows granular catalytic particles (120) charged in the reforming catalyst section (2). Those catalyst particles are held in the reforming catalyst section (2) by a member for preventing the catalyst from dropping, such as a mesh (122).

In any of the embodiments shown in FIGS. 1 to 19, the cylindrical body A is disposed on the incombustible cylindrical body (10), and they are connected to each other through the welded portion (109) by welding the outer periphery of the upper end face of the incombustible cylindrical body (10) to the lower end portion of the cylindrical body A.

It is possible to employ the following manner in the present invention, instead of the above described welding. That is, a flange is formed on the end portion of the cylindrical body A, and a flange is also formed on the incombustible cylindrical body (10), and these flanges are secured with bolts and nuts to thereby connect the incombustible cylindrical body to the cylindrical body A.

Figure 24:
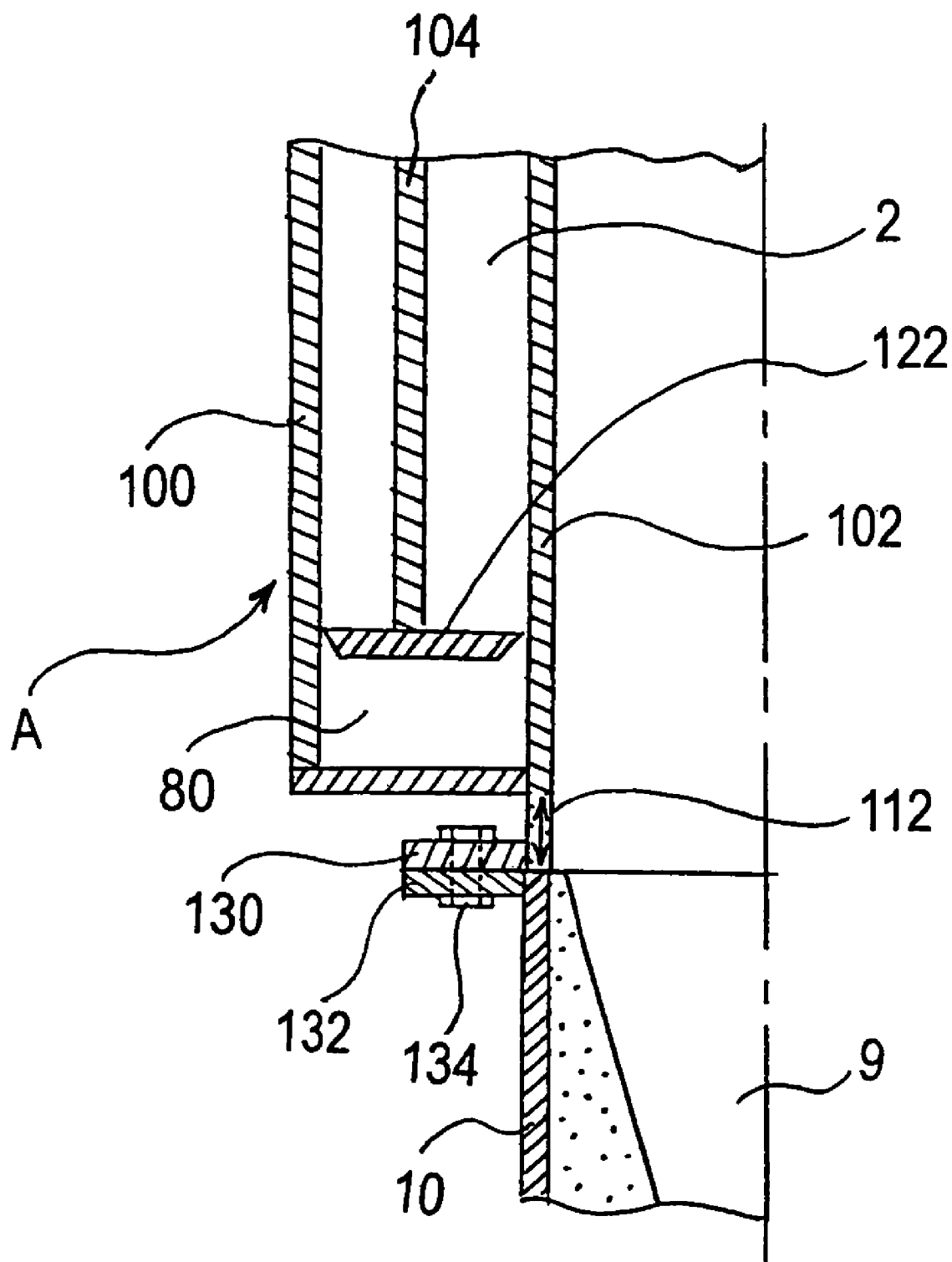
FIG. 24 is a schematic sectional view of an example of the embodiments of the present invention.

FIG. 24 specifically shows this manner. The lower end portion (112) of the inner cylindrical body of the reforming apparatus shown in FIG. 1 is extended downward, and a flange (130) is welded to the periphery of the above extended end portion. On the other hand, a flange (132) is welded to the upper end face of the incombustible cylindrical body (10). These flanges are secured to each other with bolts and nuts (134). In this case, a thermal stress tends to concentrate on the end portion (112) of the inner cylindrical body (the area indicated by the arrow notation) because of a high temperature combustion gas.

In the particularly preferable embodiment of the present invention, the communicating portion is not intentionally secured onto the incombustible cylindrical body, but it is formed as a free manner so as to avoid such concentration of the stress. Specifically, a cylindrical member is used to surround the outer peripheral portion of the lower portion of the outer cylindrical body, and one end portion (or the upper end portion) of the cylindrical member is connected to a portion of the outer surface of the outer cylindrical body which can tolerate a thermal influence of the combustion gas, and the other end portion (or the lower end portion) of the cylindrical member is connected to the incombustible cylindrical body, and preferably to a flange formed on the upper end of the incombustible cylindrical body.

Figure 25:
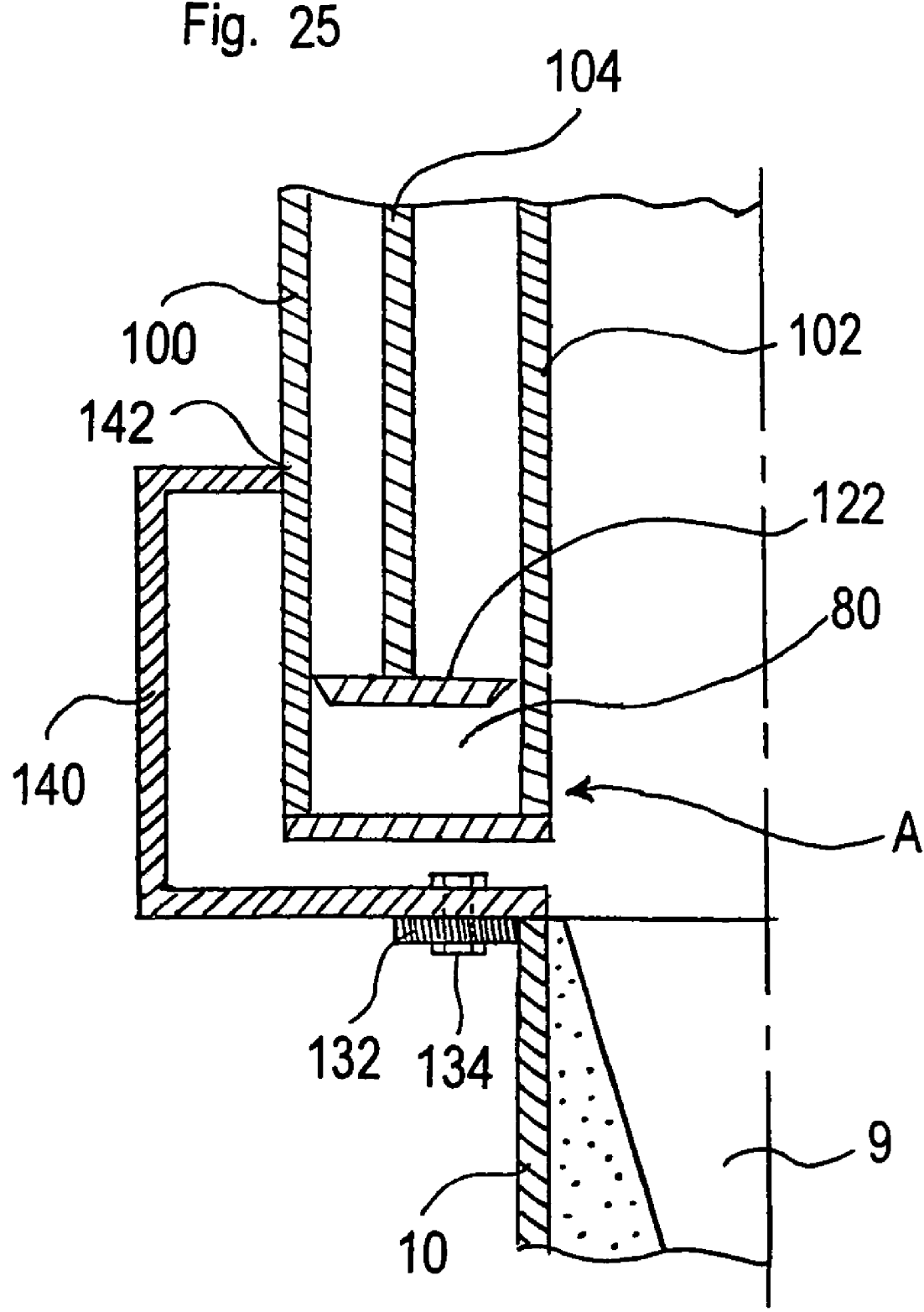
FIG. 25 is a schematic sectional view of an example of the embodiments of the present invention.

For example, a cylindrical member (140) is arranged around the outer peripheral portion of the outer cylindrical body so as to enclose the lower side of the outer cylindrical body (100) as shown in FIG. 25. One end of the cylindrical member (the upper end in the embodiment shown in FIG. 25) is connected to a portion (142) of the outer surface of the outer cylindrical body, which can tolerate the effect of the thermal stress of the combustion gas, for example, by welding. The other end of the cylindrical member (the lower end in the embodiment shown in FIG. 25) is secured to a flange (132) provided on the periphery of the upper end face of the incombustible cylindrical body (10) with bolts and nuts (134).

In the illustrated embodiment, the cylindrical body A is surrounded by the skirt like member while the communicating portion (80) is floating above the flange (132). In this embodiment, the cylindrical member (140) has in addition to the side wall, the top surface portion and the base portion, which are not always distinguished from each other, but they may be integrally formed into a curved surface or a folded surface. In this sense, the upper end portion of the cylindrical member (i.e., the end of the top surface portion of the cylindrical member) is connected to the outer surface of the outer cylindrical body, and the lower end of the cylindrical member (i.e., the end of the base portion of the cylindrical member) is connected to the incombustible cylindrical body.

As understood from FIG. 25, a stress is formed mainly in the inner cylindrical body (102) due to the high temperature combustion gas, so that a stress acts to expand outwardly a whole of the cylindrical body A including the inner cylindrical body (102) and the outer cylindrical body (100). However, such a stress can be absorbed by the deformation of the cylindrical member (140) (specifically, being likely to expand outwardly).

For the simplicity of the illustration, the catalytic particles (120) are not shown in FIGS. 24 and 25.

It is preferable that any of the reforming apparatuses of the present invention comprises the cylindrical body A having the double cylindrical structure as described above. In another preferable mode, a cylindrical body B having a triple cylindrical structure may be employed.

Figure 26:
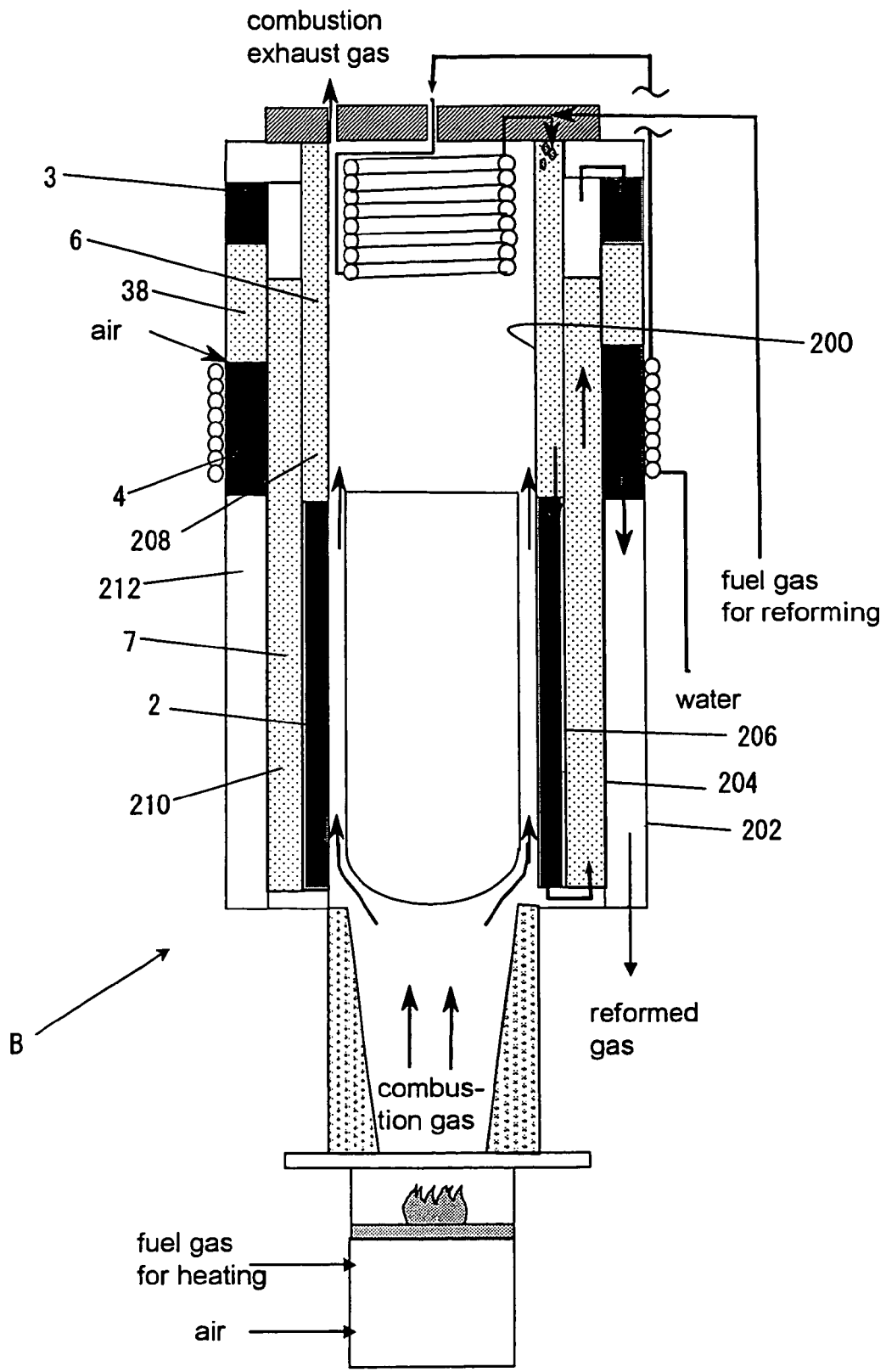
FIG. 26 is a schematic sectional view of an example of the embodiments of the present invention.

FIG. 26 shows a reforming apparatus of such an embodiment of the present invention. In the embodiment shown in FIG. 26, the cylindrical body B comprises an innermost cylinder (200), an outermost cylinder (202) and partition cylinders (204, 206). As shown in FIG. 26, the cylindrical body B has three layer-structural paths, i.e., the first path (208), the second path (210) and the third path (212). The first path (208) corresponds to the first passage (1a) in the cylindrical body A; and the second path (210), to the second passage (1b) in the cylindrical body A. Accordingly, the reformed gas-producing passage comprises the first path (208), the second path (210) and the third path (212).

In the embodiment shown in FIG. 26, the first path (208) includes a second heat-recovering section (6) and the reforming catalyst section (2); the second path (210) includes the first heat-recovering section (7); and the third path (212) includes the shift catalyst section (3) and the CO-selective oxidizing catalyst section (4), and the third heat-recovering section (38) between them. The third heat-recovering section (38) may be optionally disposed, and it may be omitted. An area of the second path (210) which is adjacent to the CO-selective oxidizing catalyst section (4) and the third heat-recovering section (38) and which is located on the downstream side of the second path (210) from the first heat-recovering section (7) along the reformed gas flow is provided with a fourth heat-recovering section (220) packed with a heat-transmission accelerating element. A fuel gas to be reformed and water as the raw materials may be fed by any of the appropriate manners described in the above embodiments employing the cylindrical body A and the respective embodiments. Thus, the explanations of the reforming apparatus comprising the cylindrical body A are similarly applicable to the embodiments illustrated in FIG. 26.

The fuel gas to be reformed and steam are fed to the upper end of the first path (208) and is allowed to flow down, so that the resultant reformed gas flows out from the reforming catalyst section (2). This reformed gas passes through the communicating portion (80) at the lower end of the first path (208) and the lower end of the second path (210), ascends through the second path (210) to pass through the first heat-recovering section (7) of the second path, and flows into the third path (212) through the communicating portion (218) at the upper end of the second path. Then, the reformed gas passes through the shift catalyst section (3) and the CO-selective oxidizing catalyst section (4) in the third path (212), and finally flows out, as the intended reformed gas, through the lower end of the third path (212).

In the illustrated embodiment, the water passage (20) is located outside the CO-selective oxidizing catalyst section (4). Water to be consumed for a reforming reaction is fed to the water passage (20), in which the water is heated to maintain the CO-selective oxidizing catalyst section (4) at a predetermined temperature, and then is fed to the evaporator (13).

Marked differences found in FIG. 26 are that the second passage is composed of the second path (210), and that the fourth heat-recovering section (220) in the second path (210) is located adjacent to the shift catalyst section (3), the reformed gas having passed through the shift catalyst section (3) (i.e., the third heat-recovering section (38)) and the CO-selective oxidizing catalyst section (4), and also adjacent, at the opposite side, to the second heat-recovering section (6). In the embodiment shown in FIG. 26, the fourth heat-recovering section (220) is adjacent to the shift catalyst section (3), however, the portion of the fourth heat-recovering section (220) which portion is adjacent to the shift catalyst section (3) may not function as a heat-recovering section and may be vacant inside. In addition, a portion of the third heat-recovering section (38) which portion is adjacent to such vacant portion may be also vacant inside. In such reforming apparatus, the second heat-recovering section (6) recovers heat from at least one of the shift catalyst section (3), the reformed gas having passed through the shift catalyst section (3) and the CO-selective oxidizing catalyst section (4) through the fourth heat-recovering section (220) provided in the second path (210) in accordance with their temperature conditions, and applies thus recovered heat to the fuel gas and steam which are fed to the reforming catalyst section (2). The first heat-recovering section (7) recovers heat from the reformed gas flowing out of the reforming catalyst section (2) and applies the heat to the reforming catalyst section (2), as in the case of the reforming apparatus comprising the cylindrical body A.

It is noted that in the embodiment shown in FIG. 26, the evaporator (13) is so located as to oppose to the shift catalyst section (3) through the second path (210).

Figure 27:
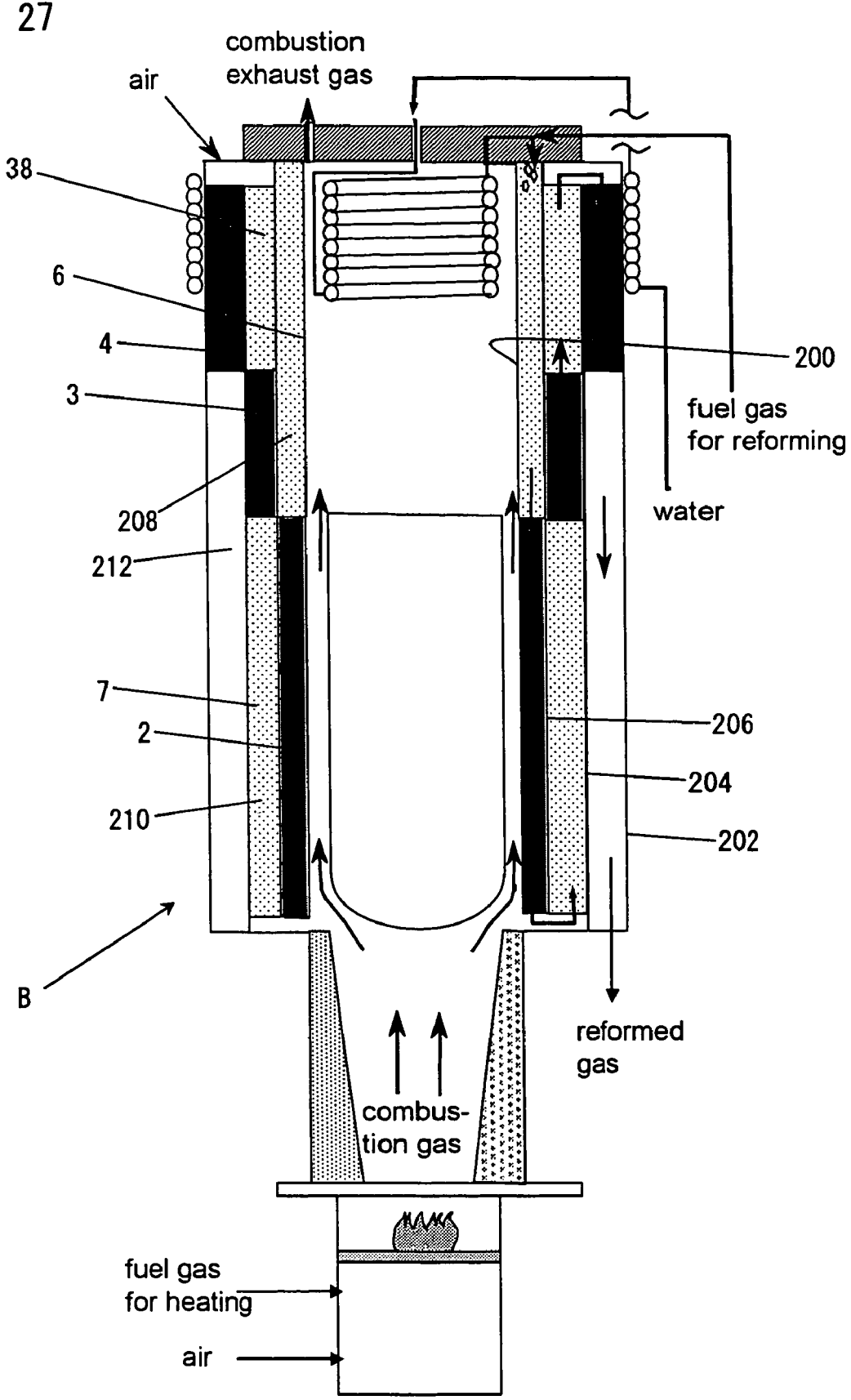
FIG. 27 is a schematic sectional view of an example of the embodiments of the present invention.

FIG. 27 shows another embodiment of the cylindrical body B having a triple cylindrical structure. This embodiment shown in FIG. 27 differs from the embodiment shown in FIG. 26 in the following points: in FIG. 27, the third path (212) includes only the CO-selective oxidizing catalyst section (4), and the second path (210) includes the first heat-recovering section (7) and the shift catalyst section (3) and, optionally, the third heat-recovering section (38). The second heat-recovering section (6) in the first path (208) is adjacent to the shift catalyst section (3) and the third heat-recovering section (38) in the second path (210). The side which is opposite to the side of the third heat-recovering section (38), adjacent to the second heat-recovering section (6), is adjacent to the CO-selective oxidizing catalyst section (4).

In the embodiment shown in FIG. 27, the second heat-recovering section (6) recovers heat from the shift catalyst section (3) and the reformed gas having passed through the shift catalyst section (3), and from the CO-selective oxidizing catalyst section (4) through the third heat-recovering section (38) in accordance with their temperature conditions, and supplies thus recovered heat to the fuel gas and steam which are fed to the reforming catalyst section (2). It is noted that the embodiment shown in FIG. 27 does not comprise the fourth heat-recovering section.

REFERENCE TO RELATED APPLICATION

The present application claims the priority based on the Japanese Patent Application No. 2002-72946 (filed on Mar. 15, 2002). By this reference, the contents disclosed in the above Japanese Patent Application are incorporated as a part of the present specification.

What is claimed is:

1. A reforming apparatus for producing a reformed gas from a fuel gas and steam, comprising:
   a combustion gas passage; and
   a reformed gas-producing passage configured to receive a fuel gas and steam, the reformed gas-producing passage comprising a first passage formed adjacent to the combustion gas passage and a second passage positioned downstream from the first passage and formed adjacent to the first passage,
   wherein the reformed gas-producing passage includes a second heat-recovering section in the first passage, a reforming catalyst section downstream from the second heat-recovering section in the first passage, a shift catalyst section downstream from the reforming catalyst section, a CO-selective oxidizing catalyst section downstream from the shift catalyst section, and a first heat-recovering section in the second passage adjacent to the reforming catalyst section, and the second heat-recovering section is positioned adjacent to at least one of the shift catalyst section, the CO-selective oxidizing catalyst section and a section of the reformed gas-producing passage between the shift catalyst section and the CO-selective oxidizing catalyst section.

2. The reforming apparatus according to claim 1, wherein the second passage further comprises the shift catalyst section.

3. The reforming apparatus according to claim 1, wherein the second passage further comprises the shift catalyst section and the CO-selective oxidizing catalyst section.

4. The reforming apparatus according to claim 3, further comprising a third heat-recovering section, which is located adjacent to the second heat-recovering section and between the shift catalyst section and the CO-selective oxidizing catalyst section.

5. A reforming apparatus comprising:
   a reformed gas-producing passage which includes a reforming catalyst section configured to produce reformed gas containing hydrogen as a main component through a steam reforming reaction between a fuel gas and steam, a shift catalyst section configured to reduce an amount of carbon monoxide (CO) in the reformed gas produced in the reforming catalyst section through water gas shift reaction and a CO-selective oxidizing catalyst section configured to further reduce an amount of carbon monoxide (CO) in the reformed gas subjected to the water gas shift reaction by reacting carbon monoxide in the reformed gas with oxygen; and
   a combustion gas passage positioned to heat the reforming catalyst section,
   wherein the reformed gas-producing passage includes a first passage and a second passage, the first passage includes the reforming catalyst section and a second heat-recovering section positioned to recover heat from at least one of the shift catalyst section, the CO-selective oxidizing catalyst section and a section of the reformed gas-producing passage between the shift catalyst section and the CO-selective oxidizing catalyst section, the second heat-recovering section is configured to supply the heat to the fuel gas and the steam fed to the reforming catalyst section, said second passage includes a first heat-recovering section positioned to recover heat from a section of the reformed gas-producing passage between the reforming catalyst section and the shift catalyst section and configured to supply the heat to the reforming catalyst section, the first passage is located adjacent to the combustion gas passage, and the second passage is located adjacent to the first passage.

6. The reforming apparatus according to claim 5, wherein the second passage further comprises the shift catalyst section.

7. The reforming apparatus according to claim 5, wherein the second passage further comprises the shift catalyst section and the CO-selective oxidizing catalyst section.

8. The reforming apparatus according to claim 7, wherein a third heat-recovering section for recovering heat from the gas having passed through the shift catalyst section and supplying the heat to the second heat-recovering section is disposed between the shift catalyst section and the CO-selective oxidizing catalyst section in the second passage.

9. The reforming apparatus according to claim 1 or 5, wherein at least one of the heat-recovering sections contains a heat-transfer accelerating element.

10. The reforming apparatus according to claim 1 or 5, wherein the reformed gas-producing passage is formed as a multi-cylindrical body by disposing a first cylindrical passage around an outer peripheral wall of the combustion gas passage, and disposing a second cylindrical passage around an outer peripheral wall of the first cylindrical passage.

11. The reforming apparatus according to claim 1 or 5, wherein a combustion gas flowing direction in the combustion gas passage is opposed to a gas flowing direction in the first passage in the reformed gas-producing passage.

12. The reforming apparatus according to claim 1 or 5, wherein a heat-radiant transmitter is disposed in the combustion gas passage such that it opposes to at least a part of the reforming catalyst section.

13. The reforming apparatus according to claim 1 or 5, wherein a water evaporator for evaporating water and introducing the resultant steam into the second heat-recovering section is disposed in the combustion gas passage such that it opposes to the shift catalyst section.

14. The reforming apparatus according to claim 13, wherein the water evaporator is disposed in the combustion gas passage such that it opposes to the shift catalyst section and the CO-selective oxidizing catalyst section.

15. The reforming apparatus according to claim 13, wherein the water evaporator is formed as a bottomed cylindrical body by closing one of the openings of the cylindrical portion with a bottom portion so as to have a heat-exchanging path formed in the cylindrical portion and the bottom portion through which the water or steam passes through; the evaporator is disposed in the combustion gas passage with the bottom portion thereof facing to the upstream side of the combustion gas flowing direction; a passage-throttle plate is disposed opposing to the bottom portion of the water evaporator in the combustion gas passage; and a through hole for allowing the combustion gas to pass through the passage-throttle plate is formed in the passage-throttle plate so as to oppose to a central portion of the bottom portion of the water evaporator.

16. The reforming apparatus according to claim 1 or 5, wherein a water passage for allowing the water necessary for the steam reforming reaction to pass therethrough is disposed around a part of an outer peripheral portion of the second passage such that it opposes to the CO-selective oxidizing catalyst section.

17. The reforming apparatus according to claim 16, wherein the water having passed through the water passage is fed to the water evaporator.

18. The reforming apparatus according to claim 1 or 5, wherein a second water passage for allowing the water necessary for the steam reforming reaction to pass therethrough is disposed around such a part of an outer peripheral portion of the second passage such that it opposes to the shift catalyst section.

19. The reforming apparatus according to claim 18, wherein a third water passage is disposed on an outer peripheral portion of a combustion gas-introducing passage which introduces the combustion gas into the combustion gas passage, and the water having passed through the third water passage is allowed to pass through either of the water passage disposed on the outer peripheral portion of the CO-selective oxidizing catalyst section and the second water passage disposed on the outer peripheral portion of the shift catalyst section.

20. The reforming apparatus according to claim 1 or 5, wherein an air-feeding passage for feeding air to the second passage from the outside, and a gas-mixing chamber for mixing the air fed from the air-feeding passage and the reformed gas having passed through the shift catalyst section are disposed between the shift catalyst section and the CO-selective oxidizing catalyst section in the second passage.

* * * * *